US006778968B1

(12) United States Patent
Gulati

(10) Patent No.: US 6,778,968 B1
(45) Date of Patent: Aug. 17, 2004

(54) METHOD AND SYSTEM FOR FACILITATING OPPORTUNISTIC TRANSACTIONS USING AUTO-PROBES

(75) Inventor: Sandeep Gulati, LaCanada, CA (US)

(73) Assignee: ViaLogy Corp., Altadena, CA (US)

( * ) Notice: Subject to any disclaimer, the term of this patent is extended or adjusted under 35 U.S.C. 154(b) by 0 days.

(21) Appl. No.: 09/271,096

(22) Filed: Mar. 17, 1999

(51) Int. Cl.[7] .............................................. G06F 17/60
(52) U.S. Cl. .............................. 705/37; 705/36; 705/35
(58) Field of Search ..................................... 705/37, 36

(56) References Cited

U.S. PATENT DOCUMENTS

| | | | |
|---|---|---|---|
| 4,903,201 A | | 2/1990 | Wagner |
| 5,077,665 A | | 12/1991 | Silverman et al. |
| 5,101,353 A | * | 3/1992 | Lupien et al. .............. 364/408 |
| 5,375,055 A | | 12/1994 | Togher et al. |
| 5,636,117 A | | 6/1997 | Rothstein |
| 5,673,402 A | * | 9/1997 | Ryan et al. ................. 395/238 |
| 5,774,880 A | * | 6/1998 | Ginsberg ..................... 705/36 |
| 5,794,207 A | | 8/1998 | Walker et al. |
| 5,794,210 A | | 8/1998 | Goldhaber et al. |
| 5,794,219 A | | 8/1998 | Brown |
| 5,794,234 A | | 8/1998 | Church et al. |
| 5,803,500 A | | 9/1998 | Mossberg |
| 5,812,669 A | | 9/1998 | Jenkins et al. |
| 5,818,914 A | | 10/1998 | Fujisaki |
| 5,819,230 A | | 10/1998 | Christie et al. |
| 5,826,244 A | | 10/1998 | Huberman |
| 5,832,461 A | | 11/1998 | Leon et al. |
| 5,835,896 A | | 11/1998 | Fisher et al. |
| 5,841,865 A | | 11/1998 | Sudia |
| 5,845,266 A | | 12/1998 | Lupien et al. |
| 5,857,176 A | * | 1/1999 | Ginsberg ..................... 705/36 |
| 5,870,720 A | | 2/1999 | Chusid et al. |
| 5,873,071 A | * | 2/1999 | Ferstenberg et al. .......... 705/37 |
| 5,875,437 A | | 2/1999 | Atkins |
| 5,890,138 A | | 3/1999 | Godin et al. |
| 5,911,122 A | | 6/1999 | Corriveau et al. |

FOREIGN PATENT DOCUMENTS

| | | | | |
|---|---|---|---|---|
| EP | 0 267 039 | * | 5/1987 | ........... G06F/17/60 |
| WO | WO 00/55754 | * | 9/2000 | ........... G06F/17/60 |

OTHER PUBLICATIONS

Freeman, M.; Automated MBS Trading—A First at First Boston; Wall Street & Technology; p10; May 1994.*
Sinnock, B.; MBS trade slows as benchmark bond yields spread prepays fears; National Mortgage News; v22; n13; p6; Dec. 1997.*
Keegan, J.; BSE joins State Street in new bond trading system; The Investment Dealers'Digest–IDD; Aug. 24, 1998.*
Finkelstein, Brad; Secondary market participants seek to do business on website; Origination News; v7; n9;; p100; 6/98.*

(List continued on next page.)

Primary Examiner—Vincent Millin
Assistant Examiner—Pedro R. Kanof
(74) Attorney, Agent, or Firm—Carl A. Kukkonen, III

(57) ABSTRACT

An automated internet based exchange system is described for controlling the exchanging of ownership interests in objects on a secondary market. The automated exchange includes one or more sub-exchanges for maintaining information representative of secondary market transactions and for controlling said transactions. The automated exchange includes a secondary portfolio auction sub-exchange, a pricing and valuation services sub-exchange, an electronic contract negotiation services sub-exchange and a delivery and auditing service sub-exchange. The automated exchange also includes a logic switch manager that creates opportunistic auctions from a transaction for a product or service so as to trigger further auctions or service sales on the same or different secondary markets.

42 Claims, 37 Drawing Sheets

OTHER PUBLICATIONS

Wightman, A. S.; Baez, J.C.; et al.; Irving Ezra Segal (1918–1998); Notices of the AMS; Jun.–Jul. 1999; pp. 659–668.*

Knight, A.; Whole loans on the Net; Wall Street & Technology; v16; p74; Jan. 1998.*

Brockman J.; Whole–Loan Traders Find Marketplace on Web Site; American Banker, V163; n36; p10; Feb. 24, 1998.*

Setala, J.; The future of ag lending part III: Ag lender perspectives; Agri Finanve; v2;n4;p6; Apr. 1998.*

* cited by examiner

STRUCTURE APPLIES TO $SA^x$, $PV^x$, $DA^x$ and $CN^x$ SUB-EXCHANGES

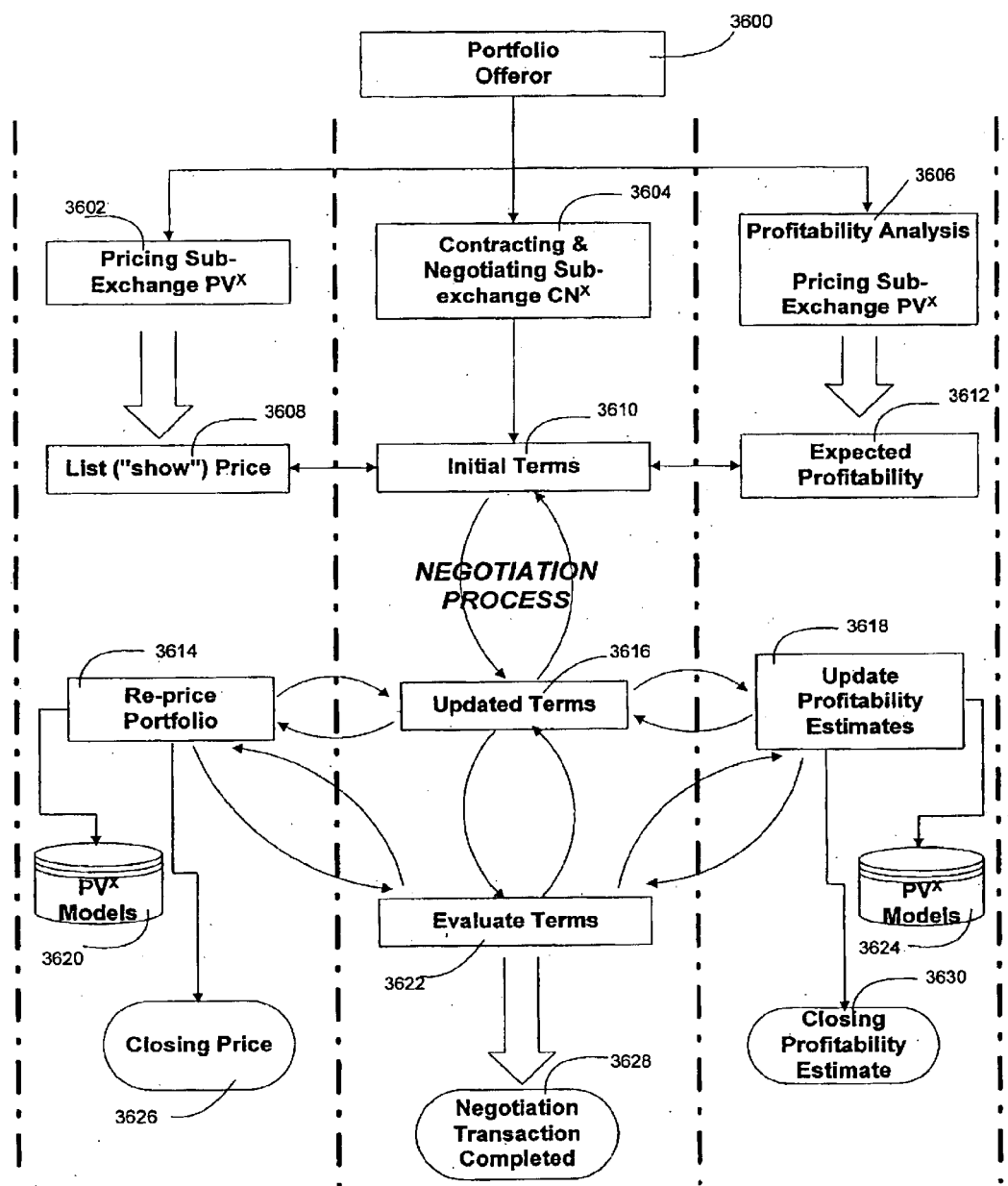

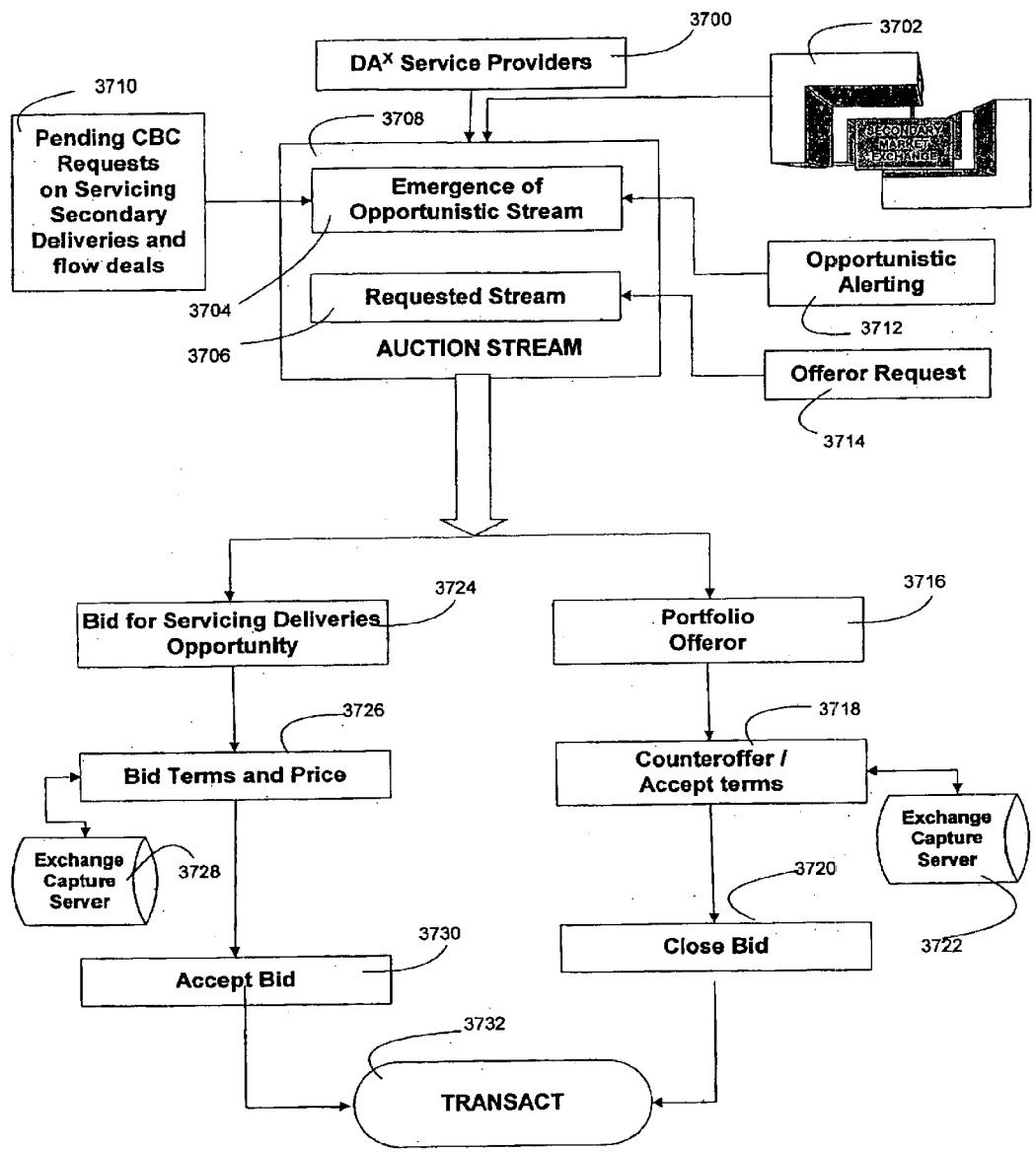

METHOD AND SYSTEM FOR FACILITATING OPPORTUNISTIC TRANSACTIONS USING AUTO-PROBES

BACKGROUND OF THE INVENTION

I. Field of the Invention

The invention is directed to online auctioning systems and methods, and more particularly to an online opportunistic auction system and method for use in commercial secondary markets.

II. General Background of the Invention

When a person or entity borrows money from a lender, the borrower must sign a promissory note promising to repay the home loan and a mortgage note (or deed of trust) to serve as collateral for the loan. The bearer of such notes has a legal claim to the underlying property until the mortgage loan is either paid in full or refinanced. When a lender has distributed all of its available funds, the lender will often raise money by selling groups of notes (mortgage loans) to investors. The selling of mortgage loans to investors is referred to as the secondary mortgage market.

Loans sold on the secondary markets are often bundled and securitized. Securitization is the repackaging of non-negotiable securities into negotiable securities (e.g., issuing securities against future cash flows such as mortgage backed securities). Complete securitization of a financial intermediary's assets removes the need for deposits as funds that would be recouped when the assets were securitized. In pure form, securities remove default risk and interest rate risk from balance sheets.

For example, mortgage backed securities are created when loans are packaged, or "pooled", by issuers or servicers for sale to investors. As underlying mortgage loans are paid off by homeowners, investors receive payments of interest and principal. Investors may purchase mortgage securities when issued or afterward in the secondary market. Investments in mortgage securities are typically made by large institutions when securities are issued. These issued securities may ultimately be redistributed by dealers in the secondary market. Similarly, asset-backed securities are created when student loans, credit card debt or other forms of consumer or corporate debt are pooled.

Mortgage securities play a crucial role in the availability and cost of housing in the United States. The ability to securitize mortgage loans enables mortgage lenders and mortgage bankers to access a larger reservoir of capital, to make financing available to home buyers at lower costs, and to spread the flow of funds to areas of the country (or other countries) where capital may be scarce.

Buying and selling of mortgage notes takes place on the secondary mortgage market among sophisticated investors such as commercial banks, insurance companies, governmental agencies, savings and loans institutions, Wall Street firms and other high volume mortgagees. Unlike the primary mortgage market, secondary market investors do not necessarily service loans purchased and they do not collect monies owed directly from the borrowers.

Primary lenders such as commercial banks and thrifts generally keep their loans in a portfolio and exploit the secondary market to maintain portfolio liquidity and to accomplish any strategic restructuring. Two operational categories exist: First there are purchasers of portfolios from retail lenders, that create a secondary market with a balance-sheet transfer of loans, passing some related risks from originators to investors. These types of transfers are funded by issued securities. Default risks usually are not passed to the final investors of securities, and are assumed by the facility or retained by originators through recourse purchases. Cash-flow risks are initially absorbed by the facility but may be passed to investors through issuance of pass-through securities. Examples of such portfolio purchasers are Fannie Mae and Freddie Mac. Second, there are lenders that act as liquidity facilities to primary institutions, with loans backed by mortgage portfolios, and funded by issued bonds or borrowed external refinancing lines. The default risk remains with the originator but the facility can offer a variety of loan terms to meet primary lender liquidity and cash-flow needs. On example of such a lender is U.S. Federal Home Loan Banks.

Secondary mortgage market mechanisms typically used to deliver loans can be categorized as "bulk" and "flow delivery" arrangements. Bulk deliveries are one-time agreements to deliver a specific group of loans to a purchaser and are offered on the market either directly by the lender or through a loan broker. In non-brokered transactions, the lender sends the loan specifics to each purchaser and receives back bids individually, as the purchasers evaluate the loans. If offered through a broker, the lender delivers the loan information to the broker, who prepares an analysis and advertises the loan to prospective purchasers. The process of compiling up to date loan specifics and advertisements for possible purchasers is typically a time consuming and expensive task. The reliability of pricing information also suffers because mortgage pricing is not static and as such, mechanisms for updated pricing are required.

Loans may also enter the secondary mortgage market as part of a flow deal. Flow deals are contracts spanning a period of time (generally six months) where the lender or broker (collectively "seller") agrees to provide a negotiated minimum amount of loans (typically several million per month). Conventional transaction methods and systems require each lender to apply to sell loans to a number of purchasers, find purchasers willing to buy the loan(s) and negotiate the best possible deal. In situations where there is more than one interested purchaser, the lender can compare different deals. Evaluating multiple possible deals unfortunately is an extremely complex task because there are no standard sets of terms and formulas among purchasers when buying loans. The non-uniformity among purchasers in the secondary market for flow deals currently requires lenders to develop profiles of average loans offered and run the profile against models built for each deal analyzed. Typically, only a few flow deal scenarios are employed resulting in non-optimum mortgage transfers. Furthermore, the actual process is characterized by intense negotiations that may necessitate high commissions to expensive salespersons. The transaction costs for a flow deal using past methods is therefore both time consuming and expensive.

Notwithstanding the high capital volume involved, the secondary mortgage market suffers from many problems associated with the above described transactions. Purchasers must create situation specific contracts for each seller and agree upon delivery mechanisms resulting in a portfolio of non-standard contracts and contract terms requiring individual attention be paid to each loan. Rather than fixed transaction costs regardless of loan size, operating expenses can vary from each transaction and typically increase with transaction volume. Deals are often contingent upon salespeople and their contacts at various lenders and purchasers. Further, there can be a lag of several weeks to months for changes in portfolio and delivery pricing models to be effected. Price changes are often manually handled by technical staff, thus increasing the likelihood of human error and associated auditing costs.

With reference to FIG. 1, the secondary mortgage market involves transactions conducted between entities originating mortgage loans 100, 102, 104 (which may or may not be banks), banks, thrifts (savings and loan associations, saving banks, and credit unions), mortgage companies or similar entities that act as primary lenders 110, 112, 114, mortgage brokers 106, 108 acting as an intermediaries between originators and lending agencies, and secondary purchasers, 122, 124. Commercial banks and thrifts may hold mortgages in their portfolios and also participate in the secondary market as purchasers. In contrast, mortgage banks are rarely mortgage investors: the loans they originate are generally sold to more permanent investors in the secondary market. Typically, originating banks and brokers act as sellers on the secondary market 110, 112, 114 and pool individual loans 116, 118, 120 in a portfolio or bundle for sale to secondary purchasers based on factors such as the geographic location of the asset secured by the loan, the borrowers creditworthiness and the type of loan (30 year fixed mortgage, adjustable interest rate, etc.). Conventionally, pooled loans are then individually sold to secondary purchasers.

A typical life cycle of a loan begins (see FIG. 2) with an origination step where a bank 200, a broker 202, or other lending agency completes a transaction with an individual or entity that results in an asset (usually real property) becoming encumbered by a secured interest from the lending agency. The process by which loans are granted is known as loan origination 204. The mortgage rate that investors will set on loans is dependent on the mortgage rate required by secondary investors who purchase mortgages. Mortgage originators can either (a) hold a new mortgage in their portfolio, (b) sell the mortgage to an investor or conduit in the secondary market, or (c) use the mortgage as collateral for the issuance of a security. As stated above multiple compatible mortgages are then pooled together to form a portfolio or bundle in a process known as portfolio consolidation 206. The seller of the mortgage may then link external dynamic computational models to any one of numerous linked external markets and to individual variables within those markets for their pricing models. Once the pricing model determines an offering price for the mortgage portfolio or bundle, the bundle is offered for sale on the secondary mortgage market 210 with the seller's purchasing conditions publicized in some manner. If the seller's purchasing conditions are met by a secondary purchaser's bid or offer, the loan is transferred to a secondary purchaser 212.

When a mortgage is included in a pool of mortgages acting as collateral for a security, the mortgage is said to be securitized. Investors may then create mortgage-backed securities based on purchased mortgage bundles in whole or in part (known as securitization 214). These type of mortgage-backed securities often traded in secondary markets 216 similar to the secondary mortgage market. In addition, securitization of non-mortgage instruments, such as consumer debt, student loans, corporate leases leads to instruments in the asset-backed securities market 218.

FIG. 3 is an overview of the loan pass through process in secondary markets from the perspective of secondary mortgage purchasers 300, 302 desiring to purchase a specific portfolio (or purchasers in the case of multiple investors) and factors which may affect mortgage purchases in secondary markets. Purchasers often design desired target secondary portfolios 304 that are functions of securitization market demands 306, investor requirements, regulations, actions of other secondary purchasers, and other external factors. Once portfolio requirements are determined, a portfolio purchase offer is submitted to sellers of loans 312, 314. Purchasers have the option to permit bid pooling 310 that allows multiple parties to pool bids cooperatively or independently, to fulfill the criteria of the purchaser's portfolio bidded upon. Pooling may be done using simultaneous bids or bids may be accumulated until all of the portfolio requirements are met. Similarly, a large portfolio purchase offer may be split or decomposed into smaller offers which can then be individually filled by multiple sellers. Pooled or split bids are then submitted to the purchaser 316 and may be accepted 318 or rejected (bids are iterated 316 until an acceptable bid is received) depending on whether they meet desired target portfolio requirements. Once bids are accepted, a transaction specific transfer contract 320 is negotiated resulting in delivery of the loan bundle and associating compliance tracking 322. In the case of bulk deals, compliance tracking typically entails verification that delivered portfolios are in accordance with the terms of the negotiated secondary purchase. In the case of flow deals, 322 verification of delivery schedules is also required.

Presently, transactions in secondary markets such as the secondary mortgage market are slow and inefficient. As advances in computing have permitted higher levels of automation within various industries, secondary markets have yet to embrace such improvements. Increasing automation levels within traditional secondary markets such as the secondary mortgage market (which includes home equity loans, personal real estate loans, commercial real estate loans), consumer credit (credit cards and direct financing), student loans, automobile leasing, and equipment leasing, can serve to increase accessibility to markets and minimize inefficiencies inherent in these high volume capital intensive markets. The buying and selling of mortgages is currently done in a fragmented and inefficient manner— often by hand and rarely aided by computer tools. Each seller maintains a list of authorized buyers, uses non-standard contracts and contract terms, and own delivery mechanisms. Buyers and sellers employ large technical staffs to handle delivery formats and price formulas. There is minimal automation, a very limited market of buyers, and inherent inefficiencies in this extremely high volume capital-intensive secondary mortgage market. As illustrated in FIG. 4, the conventional method of conducting secondary market transactions described above requires sellers 400, 402, 404 of bundled mortgages (or other secondary market objects) to individually contact multiple possible secondary purchasers 406, 408, 410, 412 for each desired sale. Primary lenders, 706, 714, can also act as secondary purchasers from other originating entities. Unfortunately, this method of transferring mortgages is time consuming, costly and depends too greatly on human factors as previously described. Separate sales pitches and negotiations need to be transacted between sellers and the plurality of potential buyers.

A key reason why the secondary mortgage market is so fragmented is that it is difficult to qualify sellers. The origination lender (sellers 400, 401, 402) must meet certain qualifying criteria in order to be approved as a seller to a particular investor (the purchaser 406–414). These stringent criteria are designed to help protect investors from fraud. Typically, an investor sends a prospective lender an application, which the lender completes and returns to the investor. The investor then checks the seller's information against certain internal standards and external sources (such as Dunne & Bradstreet), determines whether the seller qualifies to sell loans to the investor, and if so, how much, what types of loans, etc.

Conventional transaction processes limit the number of potential sellers a particular investor is willing to interact with, and vice versa. Sellers are thus forced to go through the tedious and expensive process of individually qualifying with each potential purchaser. When a seller submits a portfolio for sale to a purchaser, the purchaser first verifies that the seller is qualified to deal, as shown in step 414, 420. In the event the seller is not qualified, the purchaser can either reject the offer 418, 422 or initiate a qualification process 416, 424. This limitation can be quite restrictive to time sensitive transactions or during volatile secondary market activity. Time delays caused by qualifications can immediately impact the price and profitability of deals transacted under those conditions. Often, purchasers are forced to accept sub-optimal price offers due to lack of competitive bids from multiple qualified sellers. In addition, the qualification status needs to be periodically updated and maintained. Under nominal conditions, update period ranges from six months to three years. If however, a seller's status changes due to an increase in bankruptcies, foreclosures, delinquencies, etc., the previous qualification status is often null and void and needs to be updated.

FIG. 5 amplifies the complexity and unique nature of secondary capital markets and how that impacts the exchange design in a business-to-business e-commerce context. In a person-to-person e-commerce auction business model, the seller and purchaser determine the pricing and utility associated with the auctioned object. There is a visible, predictable and direct relationship to elasticity in demand and supply. Since secondary market is primarily a pass-through conduit, the financial instruments are strongly coupled to external forces. Consequently, transactions and pricing in the secondary market are connected to derivatives in primary origination and securitization markets.

With reference to FIG. 5, secondary markets 504 are necessarily influenced and coupled to primary origination markets 402 and securitization markets 406. Unlike conventional auction transactions, pricing of secondary market objects as disclosed by the invention, is neither purchaser 400 dictated, nor seller 406 dictated, but is dynamically coupled to external markets as will be described below. Depending on types of objects being transferred from seller to purchaser, the secondary market may be coupled to variables such as foreign currency rates, coupon yields, bond yields, treasuries, money supplies, the prime rate, security rates etc. The relationship between pricing a secondary market object to external primary and secondary markets such as the origination market and the securitization markets cannot be extricated because of the co-dependency of the market relationships and dynamic coupling allows for simultaneous trading in multiple markets. (Note that not all features of FIGS. 1–5 are necessarily prior art to the invention).

Accordingly, there is a need to provide increased visibility of loans to the market resulting in a greater number of potential purchasers. There is also a need to allow purchasers and lenders to easily compare contracts against proforma or existing loan portfolios to rapidly determine the effects of changing contract terms on loan prices by using advanced models to allow sellers to optimize their deliveries and to allow customers to run proprietary models. There is also a need to permit complete customization of delivery terms, loan purchase contracts and sales contracts. There is also a need for a greater level of pricing accuracy in secondary markets according to existing contracts. Furthermore, there is a need for an automated compliance tracking and longitudinal loan analysis system to enable small parties to contract the delivering and servicing requirements of secondary market transactions to outside parties. There is also a need to allow for parties to employ an automated negotiating agent utilizing a pool of contract terms.

SUMMARY OF THE INVENTION

In accordance with one aspect of the invention, an automated exchange system is provided for controlling the exchanging of ownership interests in objects on a secondary market, wherein the objects have a dynamic value affected by time-varying external factors. The automated exchange includes one or more sub-exchanges for maintaining information representative of secondary market transactions and for controlling said transactions. The automated exchange includes one or more of: a secondary portfolio auction sub-exchange; a pricing and valuation services sub-exchange; an electronic contract negotiation services sub-exchange; and a delivery and auditing service sub-exchange.

Optionally, each sub-exchange includes transaction data storage means for storing transaction information representative of the persistent, active and updated state of each of a plurality of transactions controlled by the exchange; auctioning means for auctioning the secondary market objects among subscribers to the exchange based upon the information provided in the transaction datastore; costing means for costing services provided to the subscribers based upon the information provided in the transaction datastore; portfolio encoding means for parameterizing portfolio sale or purchase offers provided by subscribers for storage by the transaction data storage means; and means for identifying transaction opportunities based upon the transaction information maintained by said sub-exchanges. The means for identifying includes logic switch means for selectively controlling information flow among said sub-exchanges based upon said transaction information so as to exploit information maintained in separate sub-exchanges. The auction means includes means for accessing an auto-probes database storing information pertaining to a plurality of conditional alert subscriptions and conditional portfolio purchase/sale offers and means for arbitrating among conflicting conditional alert subscriptions and conditional portfolio purchase/sale offers. The costing means includes means for modeling revenue using subscriber-provided models and means for modeling revenue using exchange-provided models. The transaction data storage means of the invention includes active auto-probe means for communicating said transaction data and dynamic bid state means for storing information pertaining to most recent bids offered by subscribers.

Another aspect of the invention relates to a system for controlling an auction directed to secondary market objects. The system comprises: means for inputting parameters from a participant in the auction identifying an object to be sold, the object being a secondary market object having a dynamic value affected by time-varying external factors; means for inputting parameters representative of the external factors; means for estimating a value of the secondary object based on the external factors; means for selectively providing the estimate of the value to participants in the auction; means for auctioning the object among the participants; means for inputting parameters representative of an object to be purchased from a participant in the auction; and means for determining whether there are any objects offered for sale that conform to the parameters.

Yet another aspect of the invention relates to a system for pricing a secondary market object for a transaction. The system comprises means for inputting parameters from a seller in the transaction identifying an object to be sold, the object being a secondary market object having a dynamic value affected by time-varying external factors; means for inputting parameters representative of the external factors; means for estimating a value of the secondary object based on the external factors; means for selectively providing the estimate of the value to at least one participants in the transaction; means for inputting parameters representative of an object to be purchased from a participant in the auction; and means for determining whether there are any objects offered for sale that conform to the parameters.

Still other aspects of the invention are directed to a method of conducting a transaction to transfer an ownership interest in an object having a dynamic value affected by time-varying external factors in a secondary market object between a seller and at least one buyer comprising the following steps: inputting seller and buyer parameters specific to the object to be sold; estimating the value of the secondary object based on the external factors; selectively providing the estimate of the value of the secondary object to a series of buyers in the transaction so that the buyer may take it into account when placing a bid; receiving bid information from the buyers; determining whether the bid information meets seller transaction criteria based on the dynamically priced object; and finalizing the transaction when the buyers bid information meets seller's transaction criteria based on the dynamically priced object.

Another feature of the invention relates to a method of notifying a participant on an exchange of a possible business opportunity comprising the steps of: allowing the participant to enter desired portfolio or service information; parameterizing said information; transforming said information into an augmented Gelfand-Naimark-Segal (GNS) construction; inserting the GNS construction into an active auction stream; detecting whether the GNS construction locates a suitable match; and alerting the participant when a suitable match is detected.

Accordingly, in its various embodiments the invention provides increased visibility of loans to the market resulting in a greater number of potential purchasers. It also allows purchasers and lenders to easily compare contracts against pro-forma or existing loan portfolios to rapidly determine the effects of changing contract terms on loan prices by using advanced models to allow sellers to optimize their deliveries and to allow customers to run proprietary models. The invention also allows complete customization of delivery terms, loan purchase contracts and sales contracts. The invention further fulfills the need for greater levels of pricing accuracy in secondary markets according to existing contracts. Furthermore, the invention employs an automated compliance tracking and longitudinal loan analysis system to enable small parties to contract delivering and servicing requirements of secondary market transactions to outside parties. An automated negotiating agent is also provided allowing parties to employ an automated negotiating agent utilizing a pool of contract terms.

The electronic exchange provides increased visibility of secondary loan products to the potential investors, increased profitability for buyers and sellers, more flexibility and accuracy, and improved tracking of loans. Importantly, the central market area of the exchange for offering and bidding for secondary loans reduces the need for loan servicing brokers, commissioned sales staffs and loan acquisition personnel. The electronic exchange counters the weaknesses in current secondary market mechanisms in several ways including: increasing visibility of loans to the market; increasing lender availability to a broader pool of potential purchasers rather than only being exposed to those submitted by the lender's direct marketing; by allowing for higher profitability yields; by offering the ability to compare contracts against pro-forma or existing loan portfolios to rapidly determine the effects of changing contract terms on loan prices; by offering the ability to optimize seller deliveries via advanced models; by offering the ability for customers to run their own proprietary models; by offering increased accuracy through complete customization of delivery terms, loan purchase and sale contracts; and by facilitating precise pricing of loans according to terms of contracts on file that ensure accurate compliance tracking and longitudinal analyses of all loans. Specifically, the exchange allows sophisticated buyers and sellers of secondary loans and loan servicing rights to: offer secondary loans for auction in a central electronic exchange; bid for secondary loans in the exchange; negotiate and contract to buy and sell secondary loans manually and by computer; stratify, price, and value complex secondary loan portfolios online, according to proprietary models, participant proprietary models and contract terms; register secondary loan portfolios deliver secondary loans under a bulk or flow contract; and track compliance of loan deliveries with contracts.

BRIEF DESCRIPTION OF THE DRAWINGS

FIG. 36 illustrates coupling of various auction streams and their relationship to the transaction negotiation for an object on the secondary market exchange of FIG. 8.

FIG. 37 details a delivery and auditing services sub-exchange pictured in FIG. 10.

DETAILED DESCRIPTION OF EXEMPLARY EMBODIMENTS

Exemplary embodiments of a secondary market object exchange of the invention will now be described with reference to the remaining Figures. The secondary market exchange utilizes a wide-area computer network such as the Internet which permits multiple remote users to access a central computer. All commands and requests sent to the exchange are handled by an automated computer based exchange manager, referred to interchangeably herein as the exchange, secondary exchange and the exchange manager.

Figure 1:
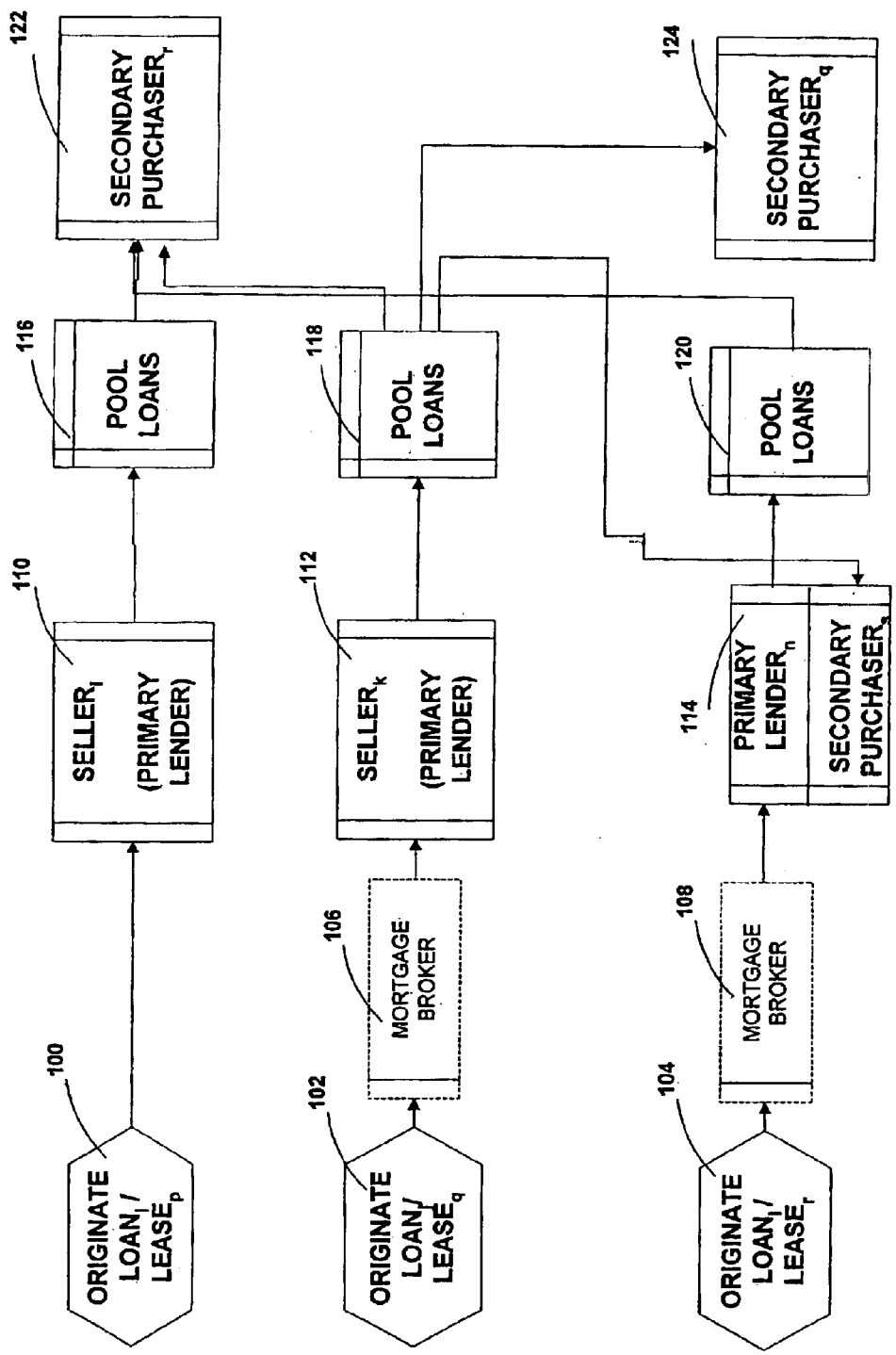
FIG. 1 illustrates the relationship between various participants of secondary markets.
Figure 2:
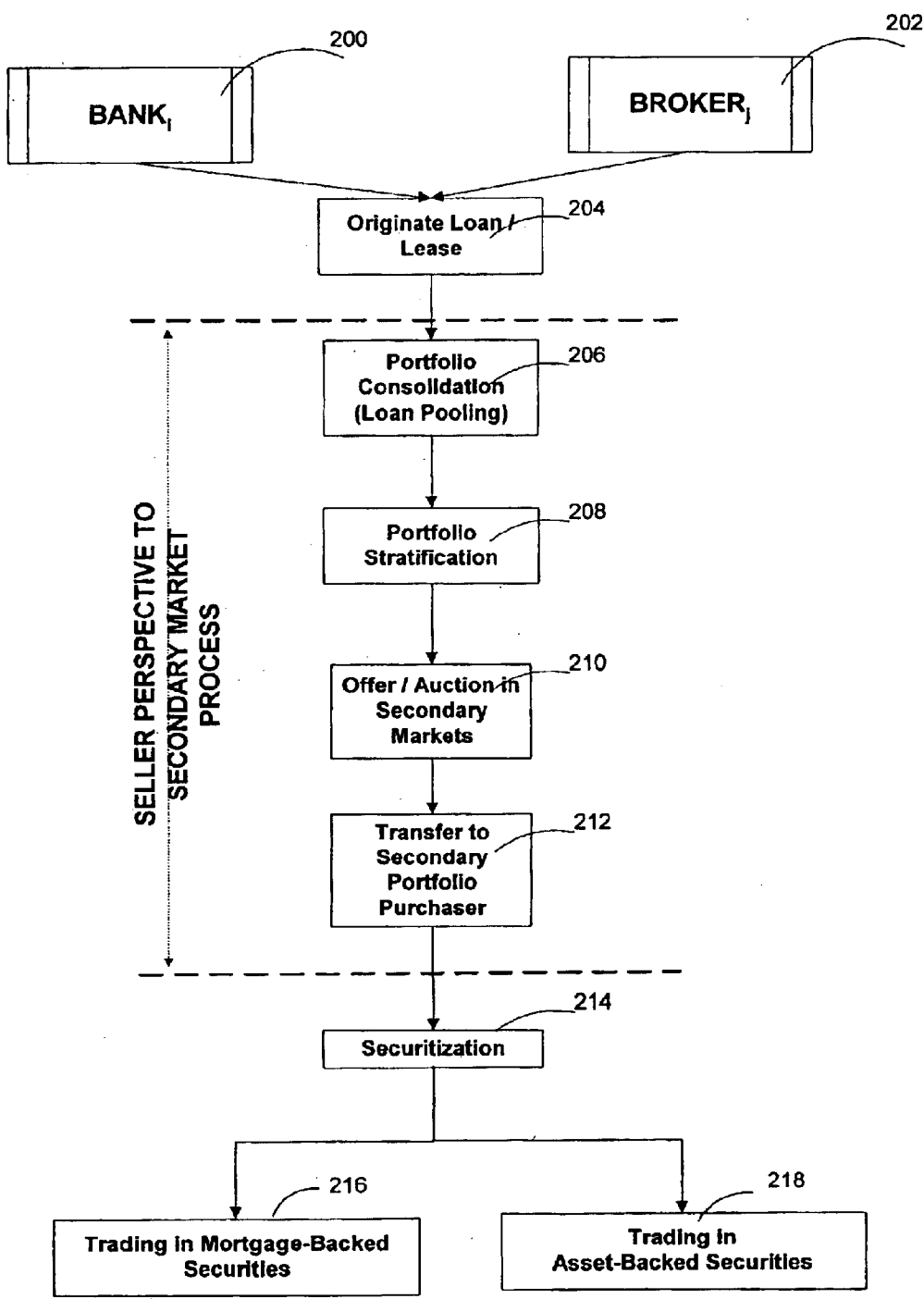
FIG. 2 illustrates the life cycle of a loan or lease from the seller's perspective as sold in a secondary market as seen in FIG. 1
Figure 3:
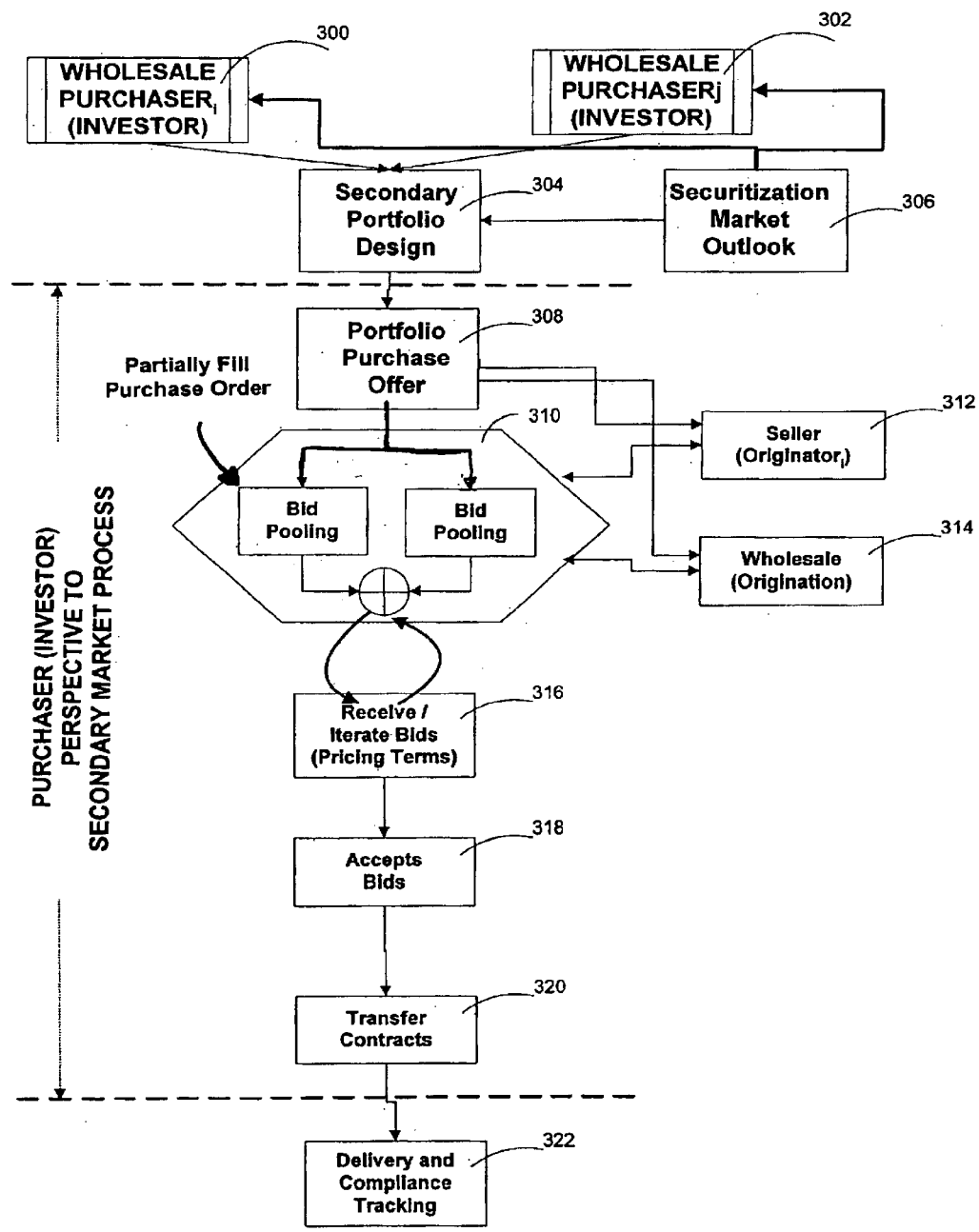
FIG. 3 illustrates the secondary market process of FIG. 1 from the perspective of a purchaser or investor.
Figure 4:
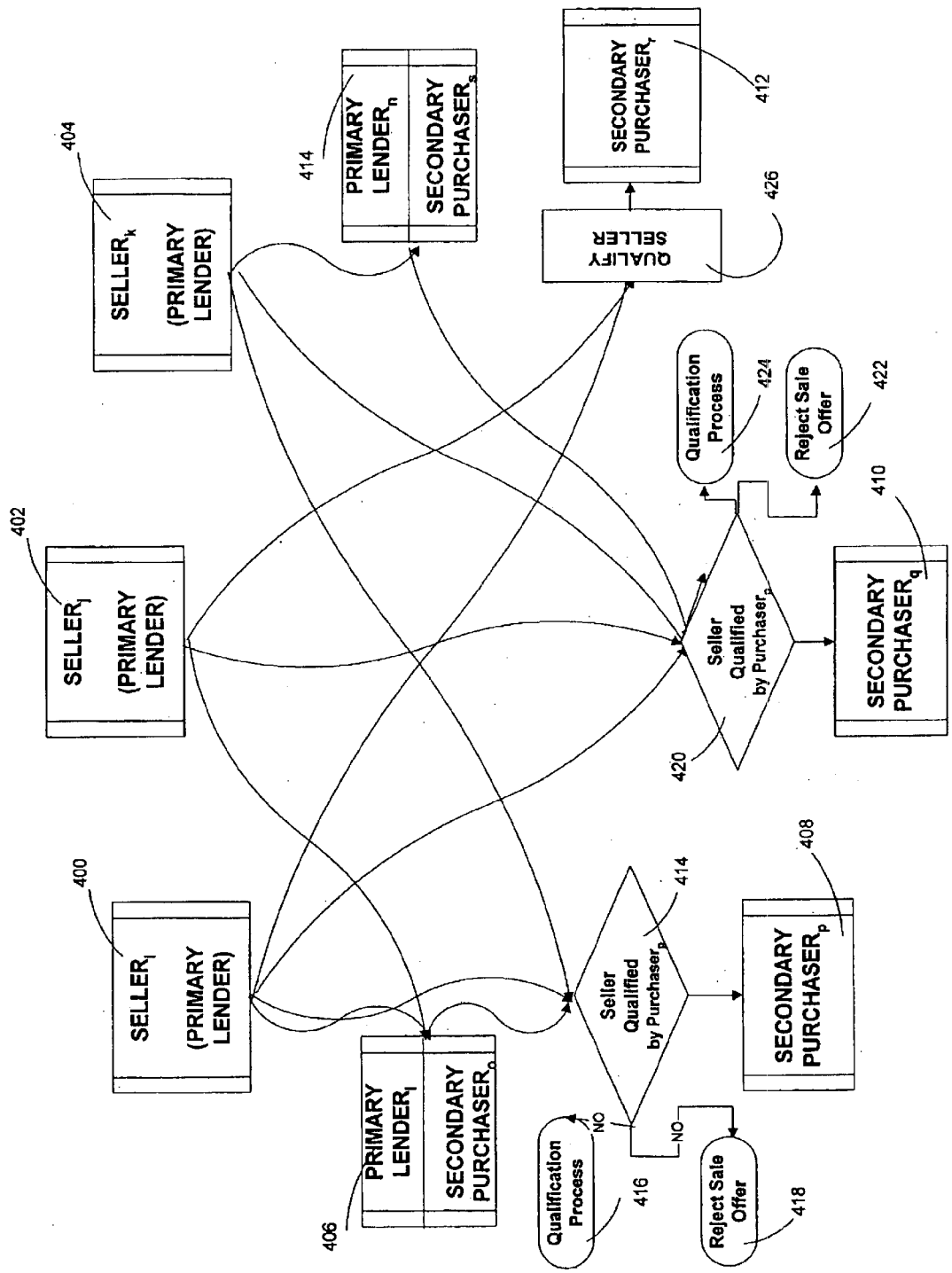
FIG. 4 illustrates conventional interactions needed to transfer secondary objects in secondary markets as seen in FIG. 1.
Figure 5:
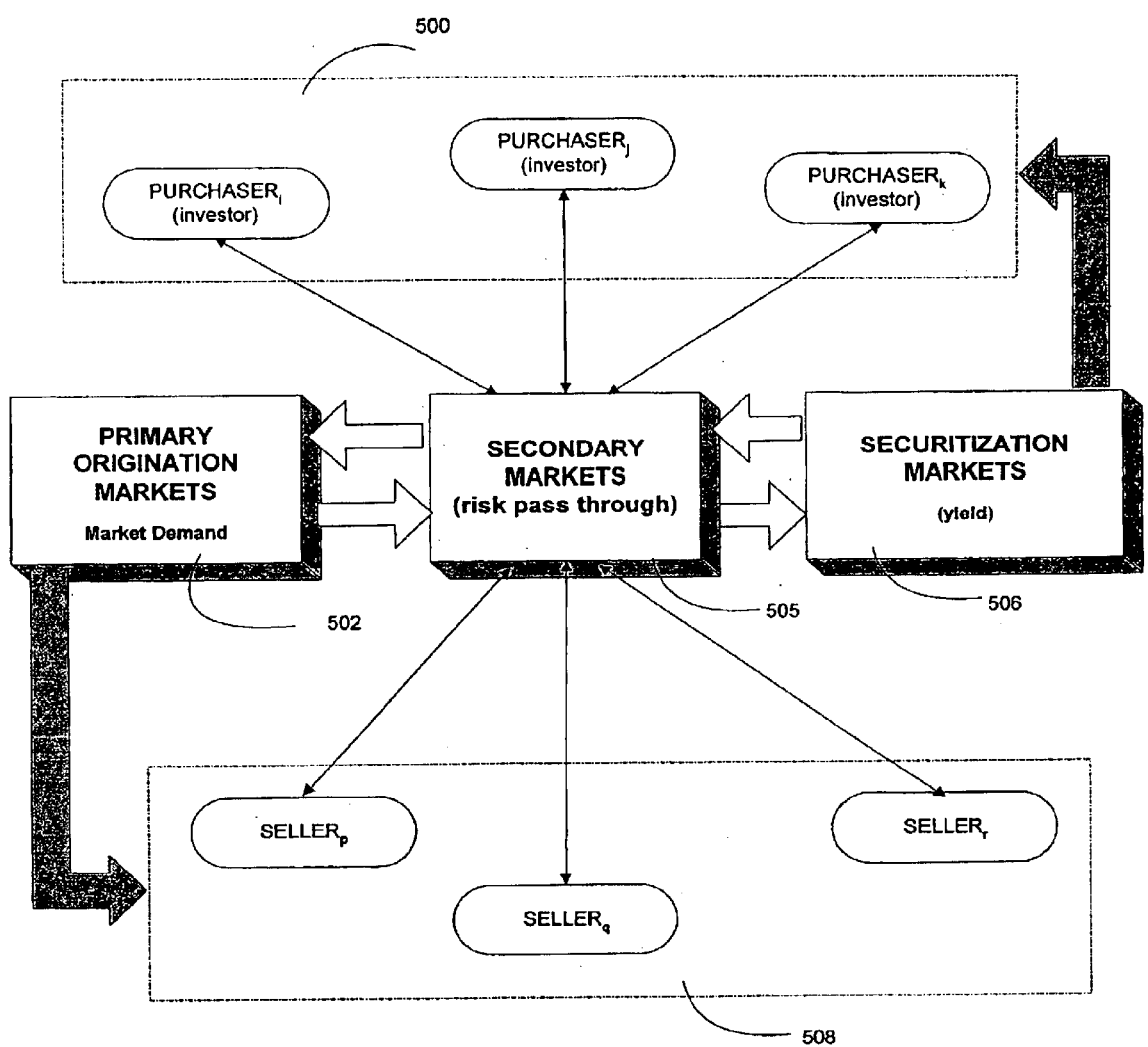
FIG. 5 illustrates the relationship between secondary markets as seen in FIG. 1 and the securitization markets and the primary origination markets.
Figure 6:
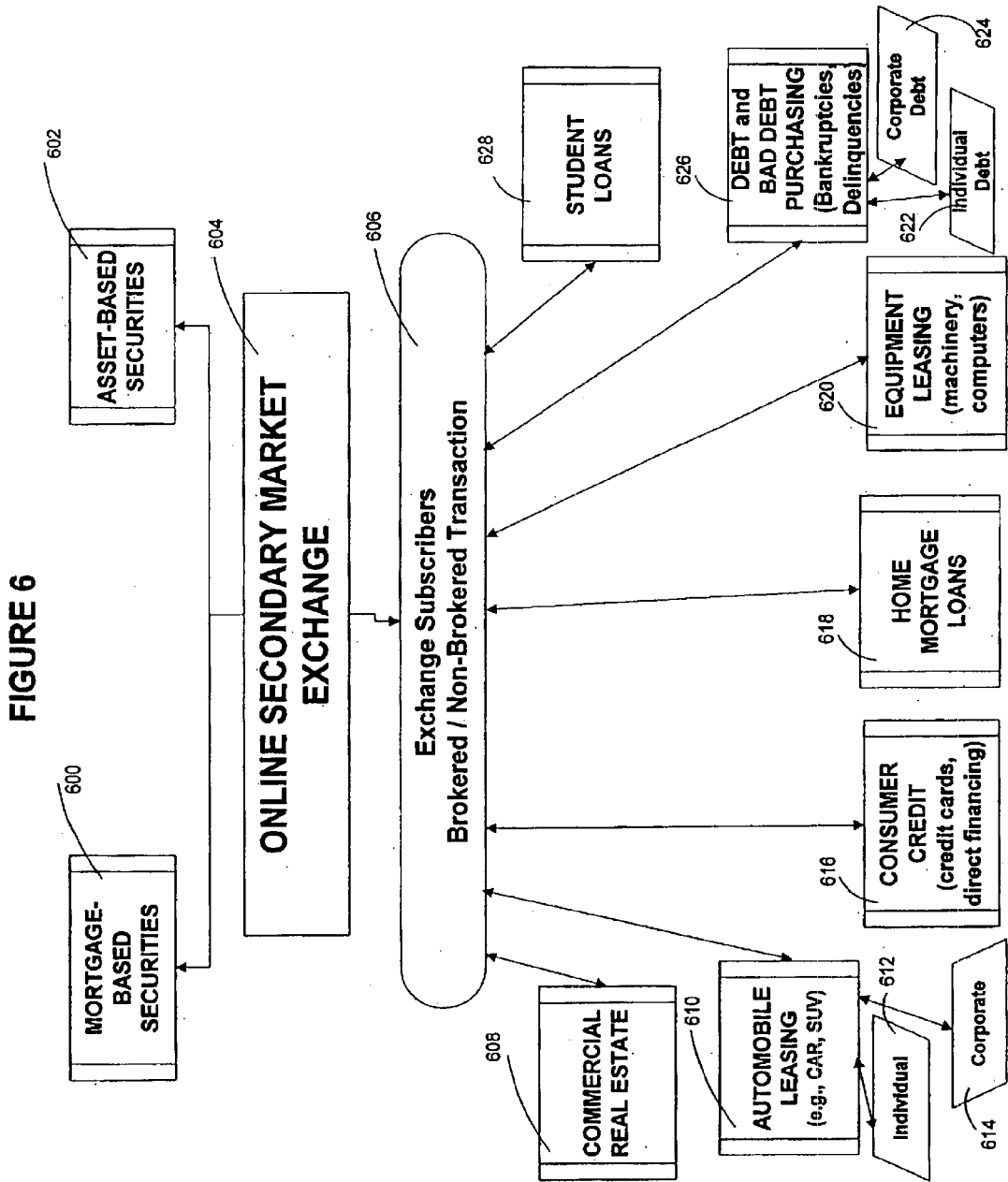
FIG. 6 illustrates the online secondary market exchange of the invention and its relationship to exemplary secondary market objects.

FIG. 6 illustrates an exchange 604 which can independently or simultaneously be applied to numerous different secondary market objects including commercial real estate loans 608, automobile leases 610 (both individual 612 and corporate 614), consumer credit 616 (including direct financing and credit cards), home mortgages 618, equipment leasing 620, bad debt purchasing 626 (both individual and corporate 614), and student loans 628. As with mortgage bundles placed on the exchange, the pricing of the above enumerated exemplary objects is dynamically coupled to the securitization market (both mortgage backed securities 600 and asset backed securities 602) and the origination markets. Brokers 606 acting as intermediaries between originators and purchasers in secondary markets may purchase and sell objects for parties without capabilities to enter such transactions.

Figure 7:
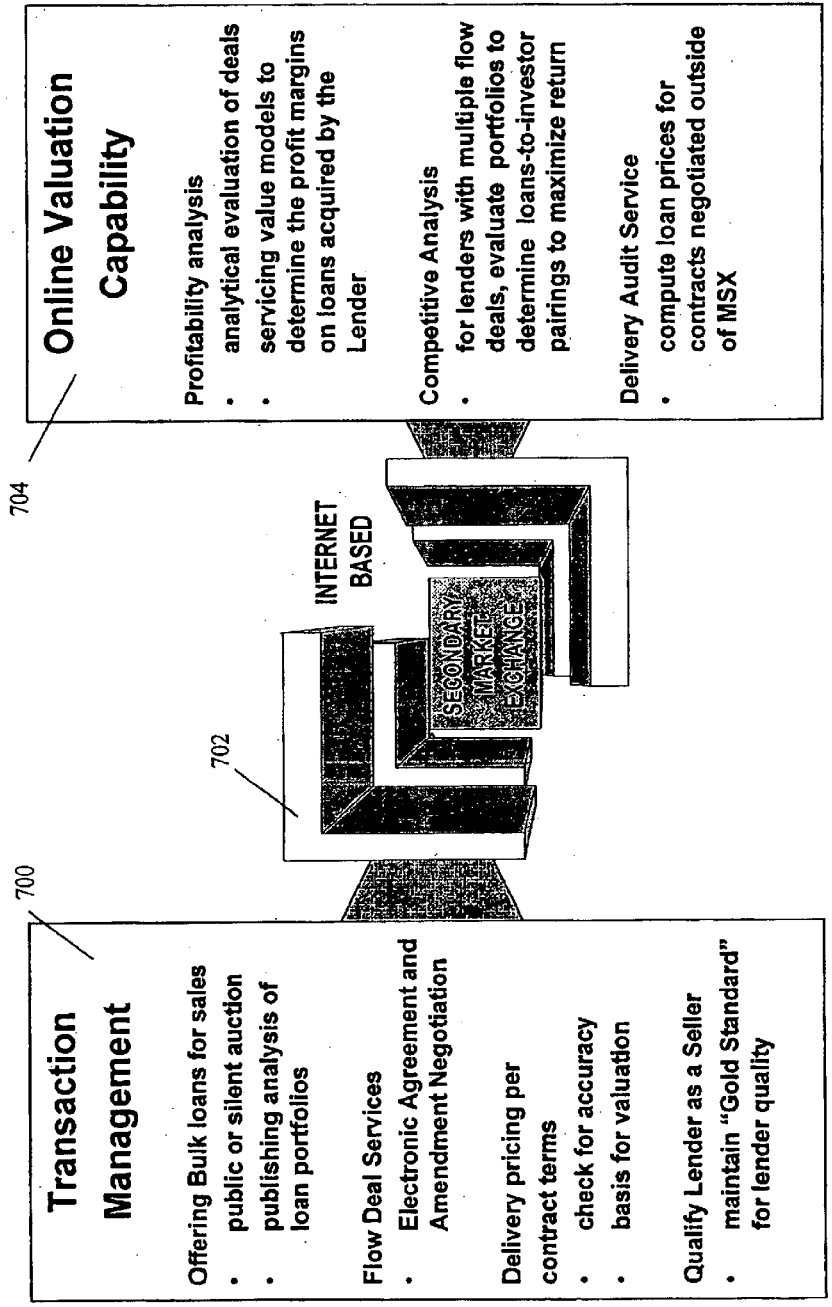
FIG. 7 illustrates the transaction management and online valuation capabilities of the secondary market exchange of FIG. 6.

The trading place for all of the above secondary market objects and other objects with similar attributes will herein be collectively referred to as the secondary market exchange. As seen in FIG. 7, the secondary market exchange 702 has two main features not fully integrated into existing secondary markets, namely transaction management 700 and online valuation capability 704. Transaction management features include the ability for a participant on the exchange to offer bulk loans for sale using public or silent auctions. Analysis services associated with bulk loans may also be published for exchange participants (entities utilizing the exchange and the exchange's services). Flow deal services are also incorporated into the flow deal services allowing for electronic agreements and automated contract amendments. Transaction management also permits accurate pricing and valuation of the delivery costs associated with the portfolio based on the underlying contract terms. In addition, mechanisms exist on the exchange to qualify and rate lenders and rank them accordingly (i.e., gold, silver, bronze etc.).

The online valuation capabilities 704 of the secondary market exchange include profitability analysis. Such analysis allows for analytical evaluation of details and servicing of value models to determine profit margins on acquired loans. Sellers with multiple flow deals may utilize exchange valuation capabilities to evaluate portfolios to determine loans-to-investor pairings to maximize return. The exchange may also be used as a delivery audit service that computes loan prices for contracts negotiated external to the exchange.

Figure 8:
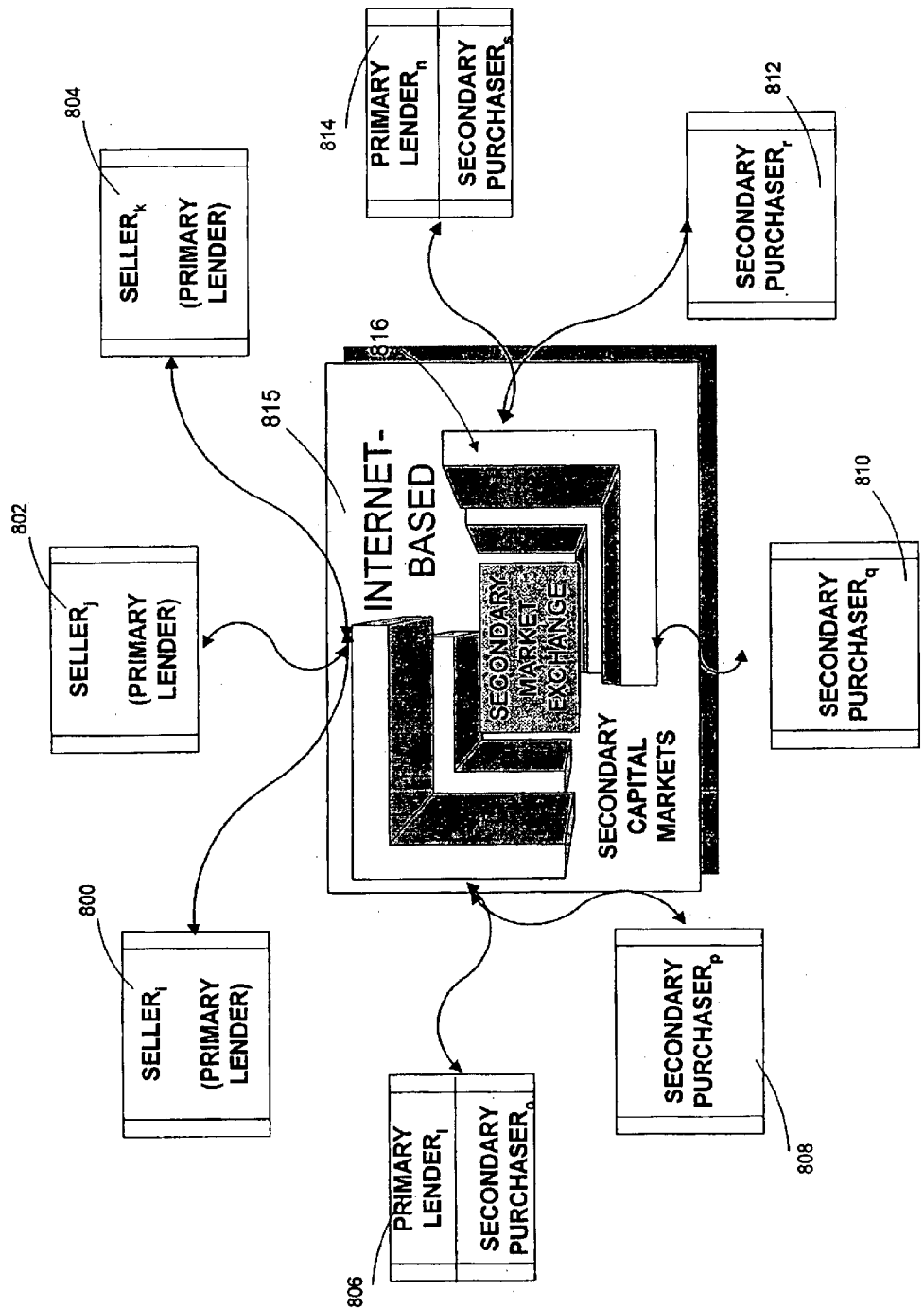
FIG. 8 further illustrates the online secondary market exchange of FIG. 6.

The centralized Internet-based online exchange of FIG. 6 is pictured in FIG. 8 in relation to secondary market sellers and purchasers. Rather than conventional entity to entity transactions, a plurality of sellers 800, 802, 804 and a plurality of secondary purchasers 808, 810, 812 (primary lenders may also act as secondary purchasers 806, 814 to supplement a soon to be listed portfolio or for investment purposes) with the supervision of an automated exchange manager, participate in the transfer of multiple seller/multiple purchaser automated transactions on an exchange 816. In the exemplary embodiment, the secondary market (central) exchange is internet based. Entities wishing to sell a portfolio or purchase a portfolio with specific criteria submit the desired price and accompanying date to the exchange and have the opportunity to alter the offering price dependent on many factors to be explained below. Also, a single qualification layer 815 is mandated for all subscribers trading as sellers to the secondary purchasers. The actual qualification mechanism is described in FIG. 9. Before any bids submitted via the exchange are shown to purchasers, the exchange automatically checks to ensure that seller has met the appropriate qualification criteria. Also, all purchasers will be aware of a particular sellers's qualification status.

Figure 9:
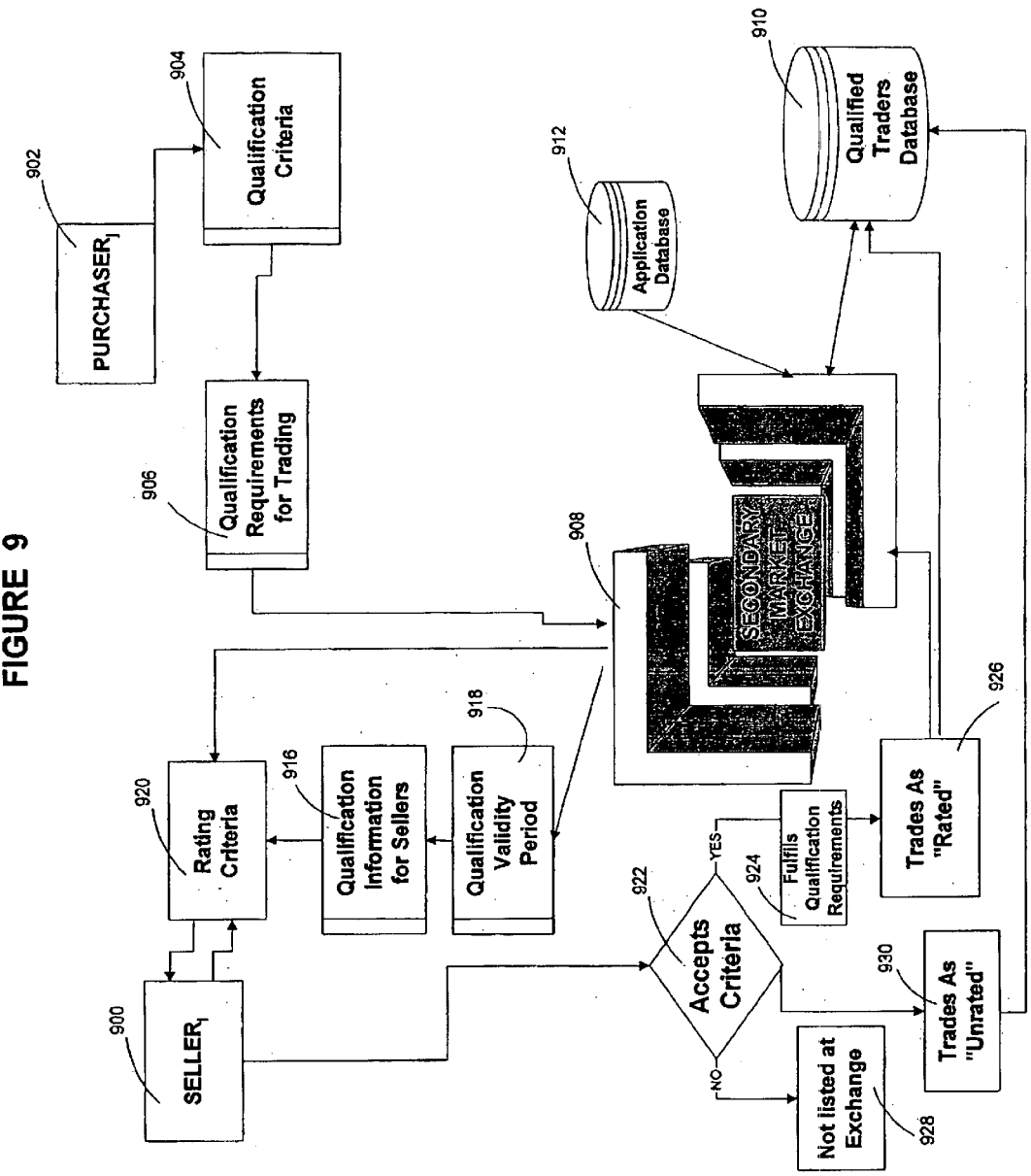
FIG. 9 illustrates the qualification process for participants on the online secondary market exchange of FIG. 8.

As shown in FIG. 9, the exchange of FIG. 6 facilitates the qualification process by allowing portfolio sellers to maintain files at the exchange with their qualifying information 910. In addition, the exchange maintains applications used by investors in a database 912 and automatically fills them in when the investor and lender agree to deal. The storage of applications saves several days in the qualification process, which can be critical when lenders have portfolios of loans for immediate sale and the lenders are not yet qualified for a particular investor. The purchasers 902 communicate their qualification criteria to the exchange 904 which is formalized as explicit paperwork requirements by the exchange 908 in step 906. The exchange updates the qualification database 912 with the information required by a purchaser. The exchange also permits a transaction to be completed without the seller fully being aware of a particular purchaser's requirements. It categorizes criteria 920 and forces sellers to provide information 916 that automatically positions them in rated categories. Also, for qualification information whose validity needs to be periodically updated, the exchange solicits periodic updates from the subscribers 918. If sellers do not provide necessary qualification information 922, they will not be allowed to trade on the exchange 928 or they will be permitted to trade as an unrated entity 930. The actual qualification steps needed to complete all required paperwork 924 can also involve an external agency to certify the rating.

The exchange will maintain a "Gold" standard for lender (seller) quality. To qualify as a Gold lender, the seller must pass rigid financial tests as well as maintain a high standard for loans delivered through the exchange as reported by the investors of that seller. A Gold lender may obtain higher prices for his loans based on higher servicing values and decreased risk to investors. Lenders would be encouraged to deliver only high quality loans through the exchange because of financial rewards associated with maintaining their Gold status.

Figure 10:
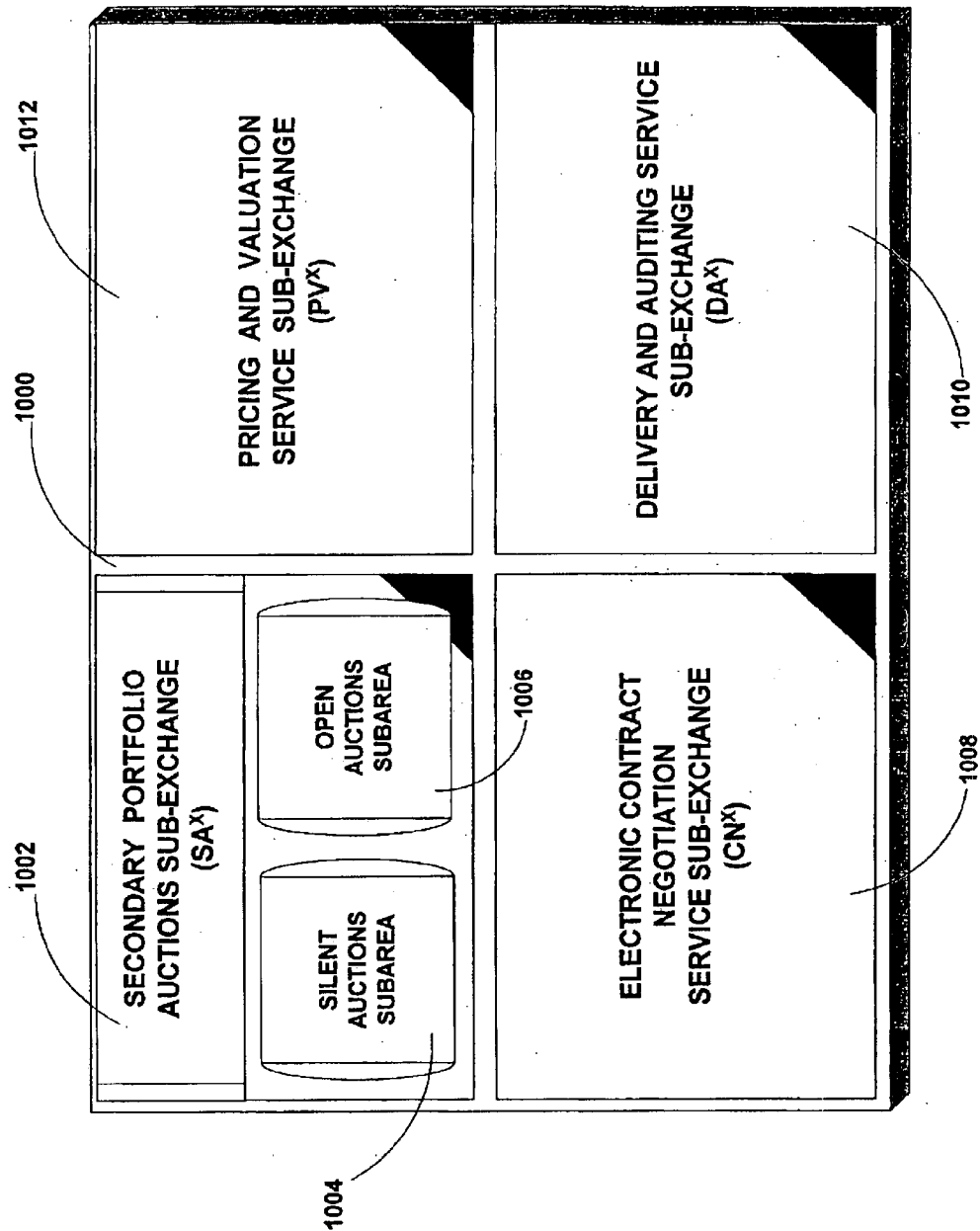
FIG. 10 illustrates exemplary four sub-exchanges of the secondary market exchange of FIG. 8.

The internal components of the electronic secondary market exchange of FIG. 6 are shown in a master organization chart 1000 of FIG. 10, which illustrates how the exchange is functionally delineated into four main electronic areas or sub-exchanges (and revenue creation models). This delineation provides a new dimension to business-to-business e-commerce transactions. Not only does it capture the classical concept of product auctions but provides an electronic forum where value-added service providers can auction their services/capabilities 1008–1012, but also pay for the selective suppression of services offered by others. By providing a competitive basket of cradle-to-grave services, the exchange delivers efficiency and openness in transactions.

More specifically, FIG. 10 provides a specific embodiment of an online exchange 1000 expressed as a combination of partially or fully separable product and services sub-exchanges. The components of the exemplary embodiment are the secondary portfolio auctions sub-exchange ($SA^X$) 1002, the pricing and valuation services sub-exchange ($PV^X$) 1008, the electronic contracting and negotiation services sub-exchange ($CN^X$) 1010, and the delivery and valuation services sub-exchange ($DA^X$) 1012. The functional decomposition of sub-exchanges is generic and recursive. The enumerated sub-exchanges are particularly germane and illustrative of secondary mortgage markets. A differentiation in electronic services increases any of the three services sub-exchanges 1008–1012 can be further delineated into more sub-exchanges. In this invention these are automatically created.

With further reference to FIG. 10, additional clarification on the embodiment follows. First, there is the secondary portfolio auctions sub-exchange ("$SA^X$") 1002 as described above which may be silent 1004 or open 1006 in format (the respective formats will be discussed below). Second, the portfolio pricing and valuation services sub-exchange ("$PV^X$") 1012 offers portfolio pricing and valuation services for objects that are not necessarily listed for sale/auction on the exchange. Parties without sophisticated pricing capabilities and/or computing power can employ the exchange manager to price the object (optionally as part of an auction). Also, for a fee, outside vendors may offer their own pricing models as services on the exchange. Third, the exchange manager may be employed as an electronic contract and negotiation services sub-exchange ("$CN^X$") 1008 to formalize sales agreements and transfer mortgages. Fourth, the exchange may be used as a delivery and auditing servicing sub-exchange ("$DA^X$") 1010 permitting smaller companies without sufficient infrastructures to verify all contract terms, to transfer the mortgages, and/or to collect owed monies from borrowers, can still participate in the secondary market.

Figure 11:
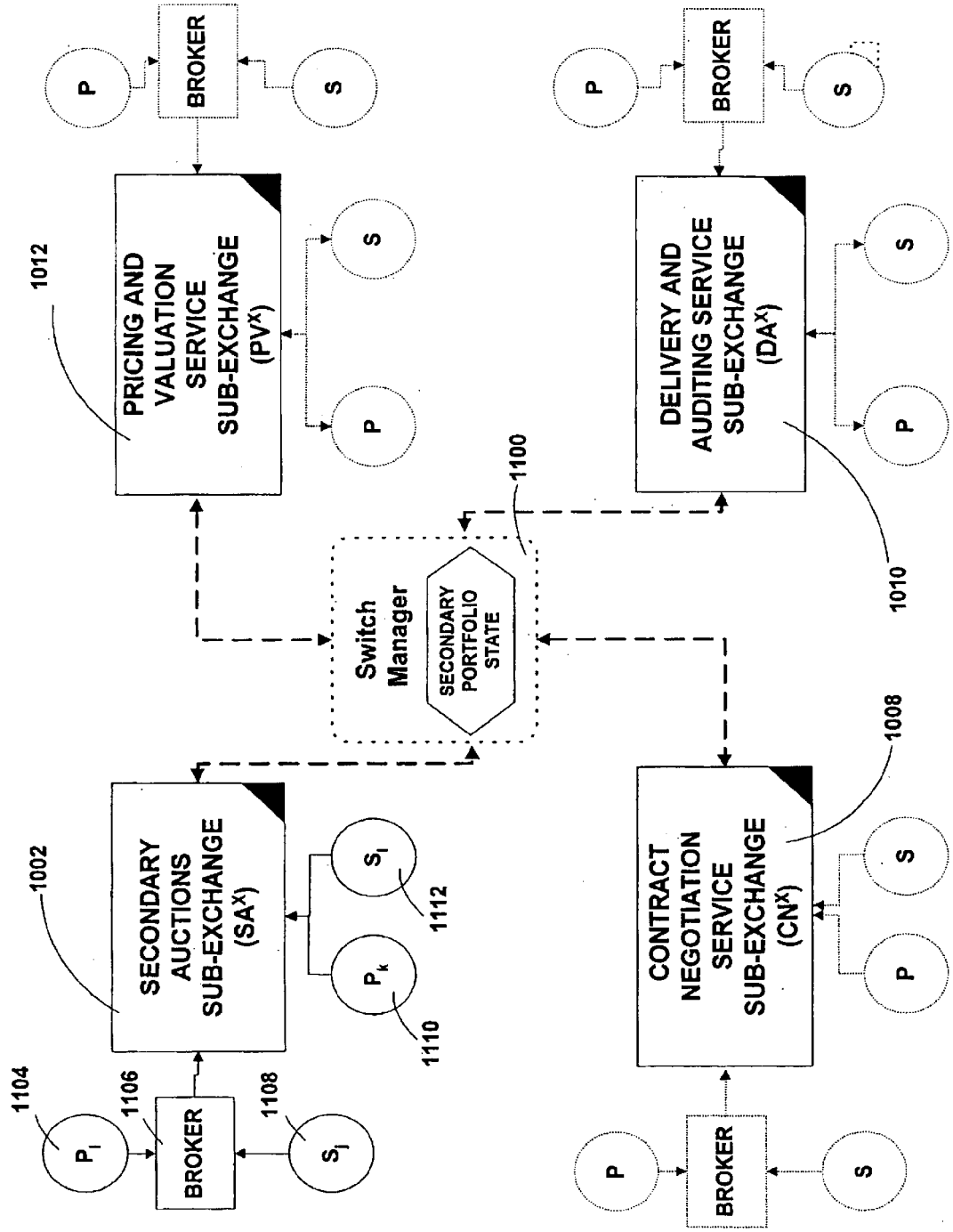
FIG. 11 illustrates a switch manager and its relationship to the four exemplary sub-exchanges of FIG. 10.

FIG. 11 integrates the four main revenue creating features of the online exchange specifically illustrated in FIG. 10 into a single chart and delineates their interrelationships as controlled by logic switch manager 1100, also known as the ViaChange™ switch (a trademark of ViaSpace Technologies, LLC). The secondary auctions sub-exchange 1002 with direct purchasers 1110 and direct sellers 1112 and with sellers 1108 and purchasers 1104 conducting transactions through a broker 1106, is one revenue producing component of the sub-exchange. Similarly, the pricing and valuation services exchange 1012, the electronic contract negotiation services sub-exchange 1008, and the delivery and auditing services sub-exchange 1010 act as separate sub-exchanges which may in turn interact with offered secondary portfolios. FIG. 11 shows various possible entry points to the auction mechanisms implemented by the exchange and managed by the switch manager. A brokered or non-brokered product portfolio offered for sale by a seller or a purchaser offer from a secondary purchaser on $SA^X$, triggers potentially new service opportunities for the exchange and $3^{rd}$ party service offers on the $PV^X$ sub-exchange. These are accepted, rejected, suppressed and surfaced via the mechanisms of auctions. The separation of sub-exchanges implies that not all of the sub-exchanges are active or manifested in each transaction. One or more of the sub-exchanges may be a factor in a specific portfolio transaction. In fact, a specific sub-exchange activation stream (a set of services that are active with respect to a specific portfolio offered for auction a specific secondary market) may not persist or be active for the entire portfolio auction. It may become activated at some point in the transaction process and then deactivated. Regardless, the transaction is persistent through the sub-exchanges, implying that an exchange state is retained in the memory and all four sub-exchanges share the same state. When a particular sub-exchange is activated directly or indirectly from the action of one of the auction participants, the specific sub-exchange participates in an intelligent manner (discussed in greater detail below). No additional effort is required on part of sellers, purchasers, and services offerors to continuously maintain full visibility into the transaction state, the auction stream, as well as the opportunistic stream. Exchange participants enter with full knowledge of events provided and maintained by the exchange.

The decomposition shown in FIG. 11 is generic and each of the sub-exchanges can be further delineated to accommodate functional specifics of particular secondary markets. The recursive decomposition driver and multiplicity of entry points are fundamental properties of the invention.

Figure 12:
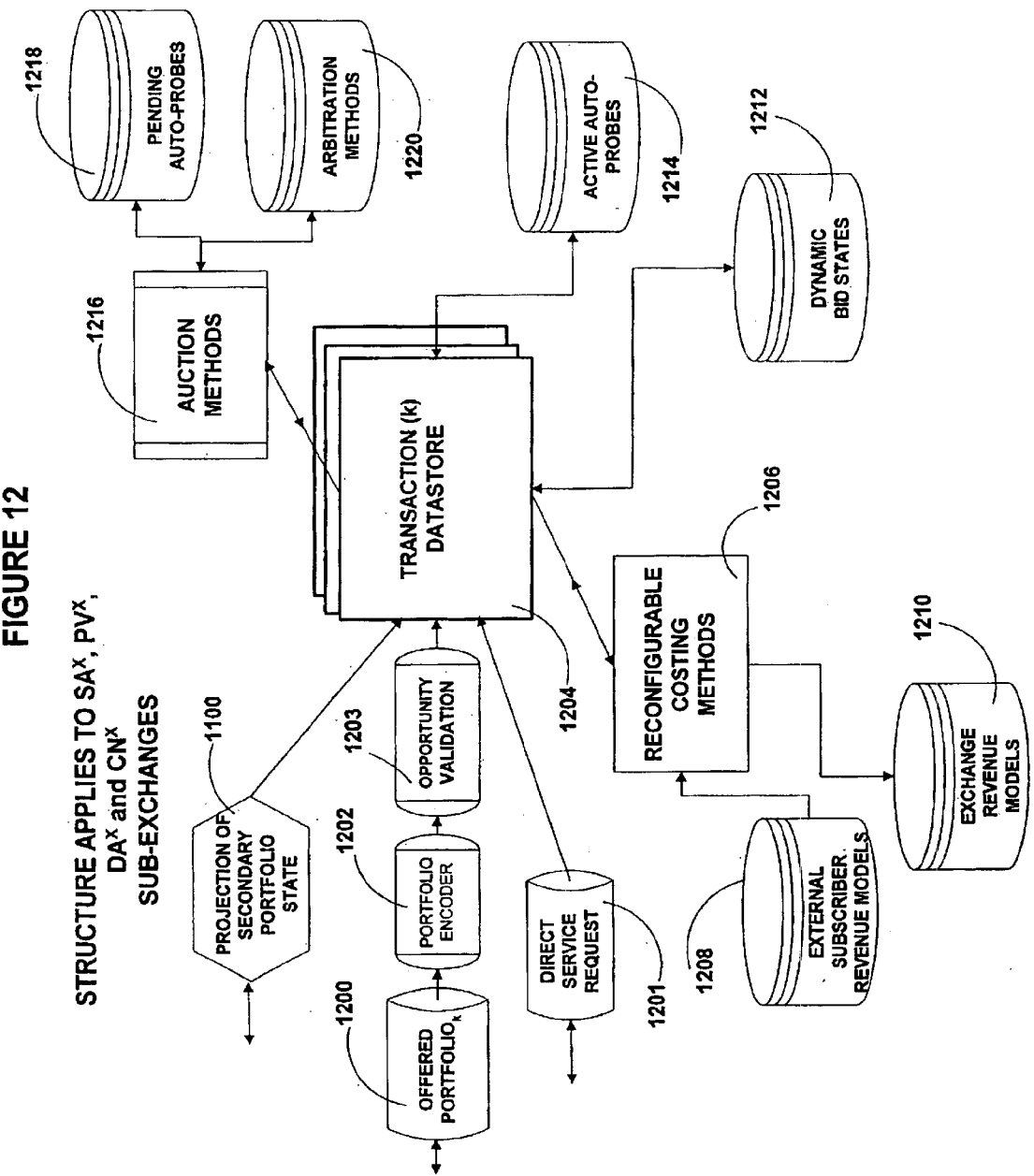
FIG. 12 illustrates an exemplary internal structure of one of the sub-exchanges of FIG. 10.

FIG. 12 illustrates the internal building-block architecture of one of the online sub-exchanges of FIG. 10. There are three central elements to a sub-exchange: (1) a collection of computational mechanisms 1216 ("auction mechanisms") that receives, manages, arbitrates on bids for a particular product or a service; (2) a collection of customizable revenue and costing mechanisms 1206 implemented by the exchange used to estimate billing charges for the services offerors and subscribers; and (3) a transaction datastore 1204 that provides the memory or information management data structure for all transactions pending or active at the sub-exchange.

Computationally, the sub-exchange mechanisms are invoked by active and shared state variables that capture, abstract and project the transaction state to establish properties that validate activation of entities. The "opportunistic" e-commerce aspects of the invention are discussed in greater detail below. The sub-exchange activation may be entered indirectly through a portfolio offeror 1200 resulting from a portfolio sale or purchase offer at the $SA^X$ sub-exchange. The portfolio information provided is appropriately translated and encoded to parameterize the activation of a component sub-exchange in step 1202 after passing through an "opportunity validation" step 1203. The opportunity validation step ensures that information security is maintained, only legitimate current sub-exchange subscribers are informed about a specific transaction and all relevant parameters are provided. If the transaction is not fully parameterized, the exchange fills in the gaps with appropriate applicable defaults. The validation step converts a transaction external to the particular sub-exchange to parameters that subscribers on this sub-exchange will be able to translate to as an opportunity. The sub-exchange may also be entered through a direct opportunity that results from a parameterized service subscription request at one of the three service sub-exchanges. For example, activation agents 1104a, 1106a, 1108a, 1110a and 1112a in FIG. 11 all present direct opportunities to $PV^X$ subscribers. On the other hand, subscribers become indirect activation agents for the $DA^X$ sub-exchange and $CN^X$ sub-exchange.

The transaction datastore 1204 reflects the persistent, active and updated state of a transaction that enables subscribers to provide best bid/service within a sub-exchange. The datastore is directly derived from step 1100 in FIG. 11. Internal to the sub-exchanges, the methods rely on memory/database models that capture transaction specifics and arbitration mechanisms. For example, the auto-probes database in 1218 contains the results of all conditional alert subscriptions and condition portfolio purchase/sale offers and how they might present a future service opportunity for sub-exchange subscribers (to be discussed below). The arbitration method 1220 pertains to bid management strategies implemented via price increments/decrements. Bid arbitration concepts such as locking (refer FIGS. 24, 25), lock release (refer FIG. 26), and bid quashing (refer FIG. 21) are discussed below. Active auto-probes 1214 refers to a collection of conditionals that are germane to an ongoing transaction at that instance (developed in detail in FIGS. 16, 22 and 23). Dynamic bid states 1212 summarize the last bids provided by offerors. The revenue models that form the basis of cost estimates for services are provided in 1208 and 1210. Updating these models is the responsibility of services offerors whether it be the exchange or a third party vendor providing services through one of the sub-exchanges. The exchange may also provide means for communicating the underlying auto-probe information and charge a fee to the receiving party.

Figure 13:
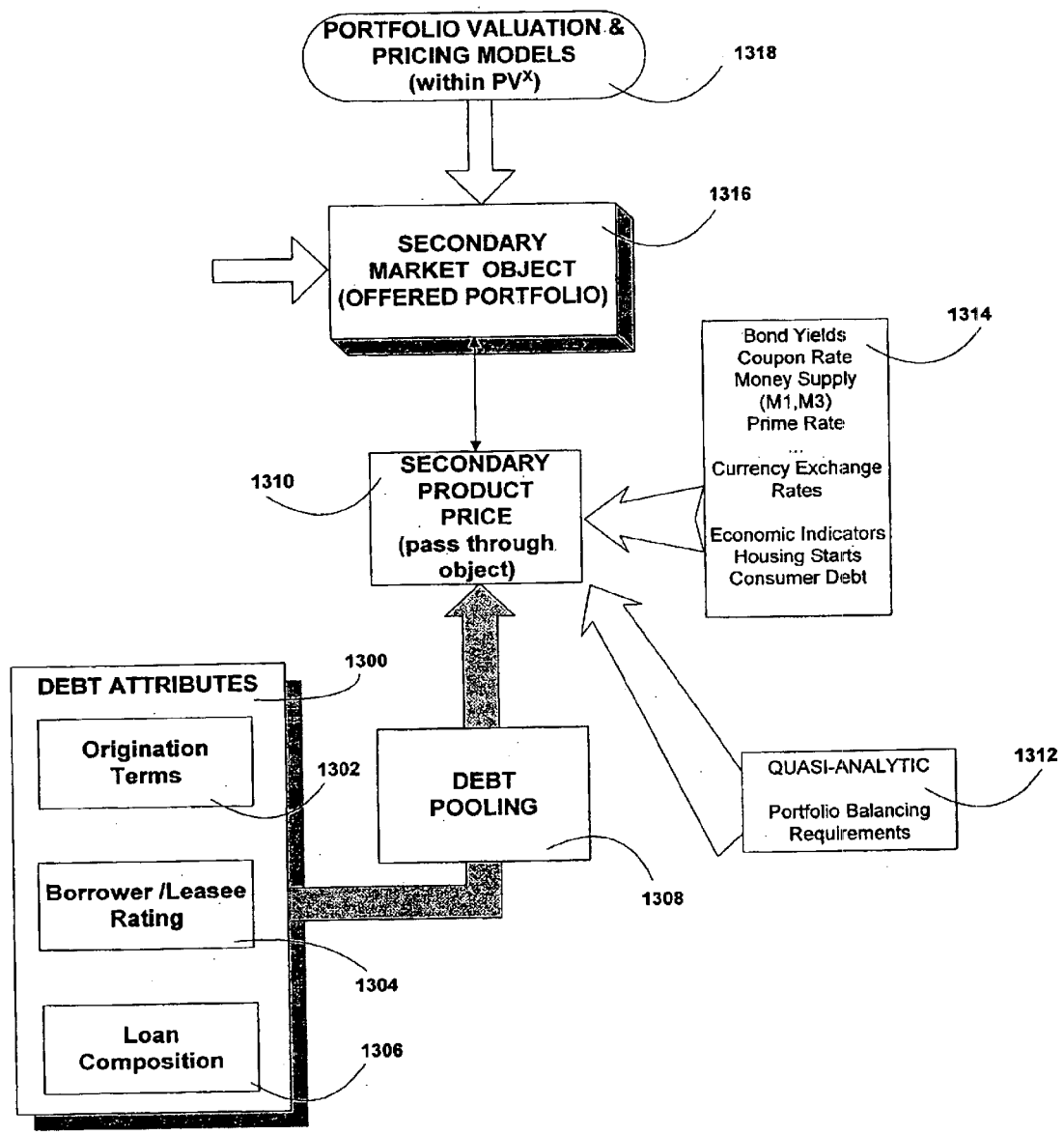
FIG. 13 illustrates the factors that can affect the secondary product price of a secondary market object on the secondary market exchange of FIG. 8.

Secondary -objects offered for auction are characterized by a complex dynamic coupling, generally not associated with person-to-person direct and reverse auctions for things such as airline tickets, hotel rooms, computers, toys, antiques, etc. A secondary object (portfolio) offered for auction at an exchange exhibits price fluctuations and dynamics that is related to a number of analytical, quasi-analytical and anecdotal factors. For example, FIG. 13 illustrates steps performed by pricing and valuation sub-exchange 1012 of FIG. 10. The pricing 1310 of a product on a secondary exchange can be dependent on a variety of external dynamic factors 1314 such as bond yields, the coupon rate, various money supplies, the prime rate, currency exchange rates, economic indicators, housing starts, and consumer debt among many others. The process by which pricing is linked to these external factors, and how it translates into downstream financial instrument profitability, is known as stratification. The pricing of an object on the exchange may also vary based on its inherent characteristics such as the debt attributes 1300 which include the origination terms 1302 for the underlying product, the borrower/leasee rating 1304, and the composition of the loan 1306. Quasi-analytics 1312 including portfolio balancing requirements may also factor into secondary product prices. Typically, institutional investors and Wall Street firms require financial institutions such as banks and thrifts to hold certain portfolios of financial instruments. The rating and valuation of such institutions is dependent upon the composition of their holdings. When market fluctuations and other factors cause institutional portfolios to be imbalanced, institutions commonly acquire and or offload certain secondary instruments to compensate for the imbalances. Such balancing related market movements catalyze a large number of transactions in this otherwise nonvolatile market. The secondary product price acts as a pass through object for these external variables and directly influences the price and composition of secondary market objects as part of offered portfolios 1316 which in turn are valued and priced 1318. This coupling of secondary objects to a large spectrum of external variables is very relevant to trading in secondary capital markets and introduces new dynamics. For example, appropriately priced secondary objects will show changes in price independent of any action on the part of potential bidders. Reverse auctions preclude this feature and current consumer-to-consumer online auctions can embody only explicit price changes resulting from actions of offerors and bidders.

A major advance of the invention is the automatic coupling of secondary product price 1310 to relevant variables 1314 and 1312 so that active persistent sub-portfolio/portfolio state 1100 will capture an accurate price. The $PV^X$ sub-exchange implements a pricing function that continually updates the secondary price based on the variable set identified in 1314 and 1312. The updated price, albeit available in the $PV^X$ sub-exchange transaction datastore, is not made available to all subscribers and auction participants. Only the results of subscribed updating services are made available to the applicable subscribers. Details of available update pricing update options are given in FIGS. 29, 39 and 31. The impact of coupling on the visible price or the "show price" is provided in FIG. 32.

The price updating function frequency in this model ranges from 0.5 seconds to 30 days for a collection of up to 1000 external variables. The actual pricing update performance is a function of throughput rates of input variable 1314 to the $PV^X$ sub-exchange. It is recognized with the increasing speeds at which computers operate, the updating frequency can be increased as well as the number of analyzed variables. Revenue models that will make the updated price available to subscribers are discussed below. Another feature of the exemplary embodiment permits the buyer and seller to link their external computational models to any of the above enumerated external markets and individual variables within those markets to help determine a secondary product price. For example, a seller with a $100 million secondary mortgage bundle can request the exchange manager to continually update the pricing of the bundle using the seller's computational pricing models based on any number of variables, for instance, five hundred. On the other hand, any of one a plurality of buyers may request the exchange manager for the option to link their own proprietary computational model a differing stratification level that may include a thousand external variables to value the listed bundle.

External computational models utilized by buyers and sellers do not necessarily correlate to the pricing of a certain secondary market object. A participant in the exchange using various stratification levels may add a delta to the price or otherwise take the received information into account with their personalized pricing models. The actual bidding and discounting strategies are left to the participating agents: human buyers and sellers, computerized trading programs and the electronic sub-exchange manager. The auction participants are provided flexibility to compute portfolio prices and then modulate them to show a visible price that may be different from the actual computed price. A reserve price that is not visible to market participants may also be employed that is different from the initial list price.

It is important to note that among a pool of competing buyers utilizing different stratification levels, the purchaser with the highest stratification level does not necessarily pay the lowest amount in absolute terms. A five hundred variable stratification level and a two thousand variable stratification level simultaneously evaluating the pricing of a certain secondary market objects can result in dramatically different values based on the specific non-linearity and sensitivity of the particular variables chosen by the purchasers' models at a particular time. Optionally, the seller may make the stratification level that is driving the pricing of the object visible to the purchasers. Purchasers can then input those variables into their own computational models if desired. Both purchasers and sellers have the option of altering the frequency at which their bids or selling prices are updated as based on their own computational models which are in turn dependent on stratification levels employed.

On the other hand, a seller may wish to sell their secondary market objects by silent auction where neither the updated price of the object nor the stratification level used by the seller are visible to buyers. Buyers can still utilize varying stratification levels for input into their personalized computational models and bid for the mortgage bundles. Models may be altered to take into account the silent auction method of selling an object so that the purchaser's models will more accurately estimate the price at which an object might be sold in a multiple-purchaser scenario.

Figure 14:
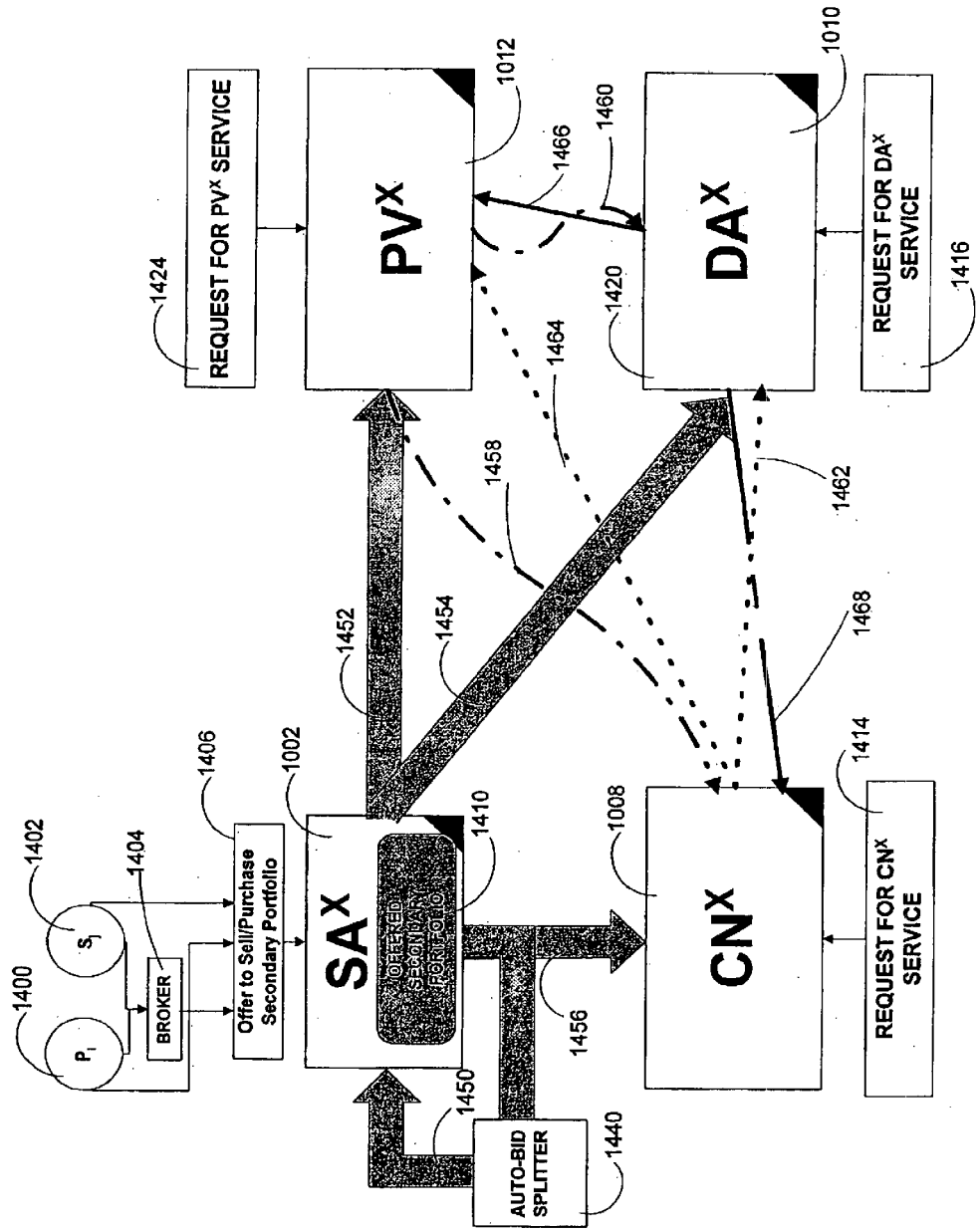
FIG. 14 illustrates the opportunity creating interrelationships between the four sub-exchanges of FIG. 10.

FIG. 14 illustrates the operation logic switch manager 1100 of FIG. 11 that is the heart of the method and system for online opportunistic auctions in secondary markets. The switch controls information flow states of the transactional stream captured by the matrix [1450, 1452, 1454, 1456, 1458, 1460, 1462, 1464, 1466, 1468]. Each element such as 1452 comprises sub-exchange queue vectors of the form [on/off, ((transaction id, transaction state, portfolio id) . . . )]. The intra-exchange switching or inter-sub-exchange switching captured by matrix [1450, 1452, 1454, 1456, 1458, 1460, 1462, 1464, 1466, 1468] could be manifested in one of two ways. First, it may manifest as focal attentive when the activation of any link 1450, 1452, 1454, 1456, 1458, 1460, 1462, 1464, 1466, 1468 results from an explicit conditional alert requested by an exchange or sub-exchange subscriber. Second, it may manifest through preattentive activation, where the exchange's inherent intelligent opportunistic operators identifies an opportunity that is then communicated to subscribers in same secondary market or a different secondary market.

The switch allows for new servicing and revenue creation opportunities for transactions that in traditional formats would be self contained and isolated from the features integrated into the exchange. Blocks 1002, 1012, 1008, 1010 respectively represent the secondary auctions sub-exchange, the electronic contract negotiation services sub-exchange, the pricing and valuation services sub-exchange, and the delivery and auditing service sub-exchange as seen in FIG. 10 and their interrelationships. There are four entry points to the secondary market exchange. First, purchasers 1400 or sellers 1402 may enter the exchange directly or through a broker 1404 to offer, purchase, or sell a secondary portfolio 1406 to be placed on the secondary auctions sub-exchange. Second, transactions on the secondary market exchange may be initiated through a request for pricing and valuation services 1424 that take place on the pricing and valuation services sub-exchange. Third, a request may be made for contract negotiation services 1414 that activates the electronic contract negotiation services sub-exchange. Fourth, a request for delivery and auditing services 1416 that activates the delivery and auditing services sub-exchange may be submitted.

The opportunistic features of the secondary market exchange can best be understood in conjunction with FIG. 14. When an object or an offer to purchase is placed for auction on the secondary auctions exchange 1002, such object may require the seller or any potential purchasers (collectively, "the participants") to use external pricing and valuation services. This need for pricing creates a new opportunity for raising revenue for both the exchange and any vendors offering their services on the pricing and valuation services sub-exchange. If the services of the exchange are utilized directly, then a fee is assessed to the party receiving such services. If the services of an outside party listed on the pricing and valuation services sub-exchange are purchased, then the exchange receives revenue from the listing commission for said services.

Furthermore, the secondary auction exchange employs an auto-bid splitter 1440 that breaks up large portfolios into smaller components, wherein each component may be individually auctioned on the sub-exchange. The auto-bid splitter determines proper ways to split up portfolios to achieve desired end results as defined by conditional requirements and validates (i.e., automatically excludes bids which could not possibly fit within the desired criteria before presentation to the purchaser) and rejects bids in furtherance of that goal. For example, a $100 million portfolio may be split up into ten $10 million portfolios each of which may then create needs for participants on the exchange to utilize any of the remaining three sub-exchanges.

A secondary portfolio 1410 listed on the secondary auctions sub-exchange 1002, 1002 (FIG. 10) may also create a need for a participant to utilize either the exchange's electronic contract negotiation services and/or employ the services of outside vendors listing their services on the electronic contract negotiation services sub-exchange 1008. Similar to the pricing and valuation services sub-exchange 1012, 1010, the exchange receives revenues from listing commissions for outside vendors offering contract negotiation services on the electronic contract negotiation services sub-exchange.

Once a purchaser 1400 and a seller 1402 complete a transaction for an offered secondary portfolio 1410, a need for delivery and auditing services may arise. The exchange further creates revenue from offering delivery and auditing services and by charging commissions for listings by outside vendors on the delivery and auditing services exchange 1010 (FIG. 10). This is a particularly attractive feature to smaller businesses without the capabilities to scour through pooled loans for compliance with the contract terms. The delivery feature also permits loan monitoring such as money collection, finalizing the secured interest, and servicing the loan directly with the borrower to be conducted by an outside party.

A request for pricing and valuation services 1424 on the pricing and valuation services sub-exchange 1012 (FIG. 10), a participant utilizing the exchange's pricing and evaluation services, or a participant purchasing the pricing and evaluation services of a third party, may all individually catalyze an opportunity for revenue creation on the electronic contract negotiations services sub-exchange 1008 and the delivery and auditing services sub-exchange 1010. Pricing of a secondary market product not listed on the exchange may create the need for automated contract negotiation services from either the exchange or an external vendor listed on the electronic contract negotiation services sub-exchange 1008. Situations may also arise where a party seeking pricing and valuation services does not need contract negotiation services but does require delivery and auditing services. Revenue is then created for the exchange either by the exchange directly selling its services or through commissions received from listed outside vendors.

A participant utilizing the exchange's electronic contract negotiation services or a participant purchasing the electronic and contract negotiation services of a third party on the electronic contract and negotiations exchange 1008 may create money raising opportunities for the exchange on the pricing and valuation services exchange 1012 and the delivery and auditing and services exchange 1010. Pricing and valuation information may be required to determine whether specific contracts terms have been met and whether delivery and auditing services are needed to monitor the portfolios after they have been serviced.

One example of the interrelationships between the sub-exchanges includes a seller placing a student loan bundle, a secondary credit card bundle, or a mortgage portfolio on the secondary auctions sub-exchange 1002 (FIG. 10). First, the exchange receives revenues associated with the listing fees from the seller. Once this offered secondary portfolio 1410 is listed, potential purchasers or even the seller may employ the services of the exchange or an outside vendor listing on the pricing and valuation services sub-exchange 1012 to price the portfolio. A potential purchaser with its own pricing models may still need to employ the contracting services of the exchange or an outside vendor offering services through the electronic contract negotiation services sub-exchange 1008, thus creating another revenue creating opportunity. It should be understood that parties utilizing contract negotiation services may not necessarily reach an agreement, whereupon the contracting parties may change and the services may again be needed. Furthermore, the parties that close the transaction may need the exchange's delivery and auditing services or it may utilize an outside party listing on the delivery and auditing services exchange 1010 to take care of the delivery and servicing requirements. Each of the above enumerated transactions create revenue for the exchange.

Figure 15:
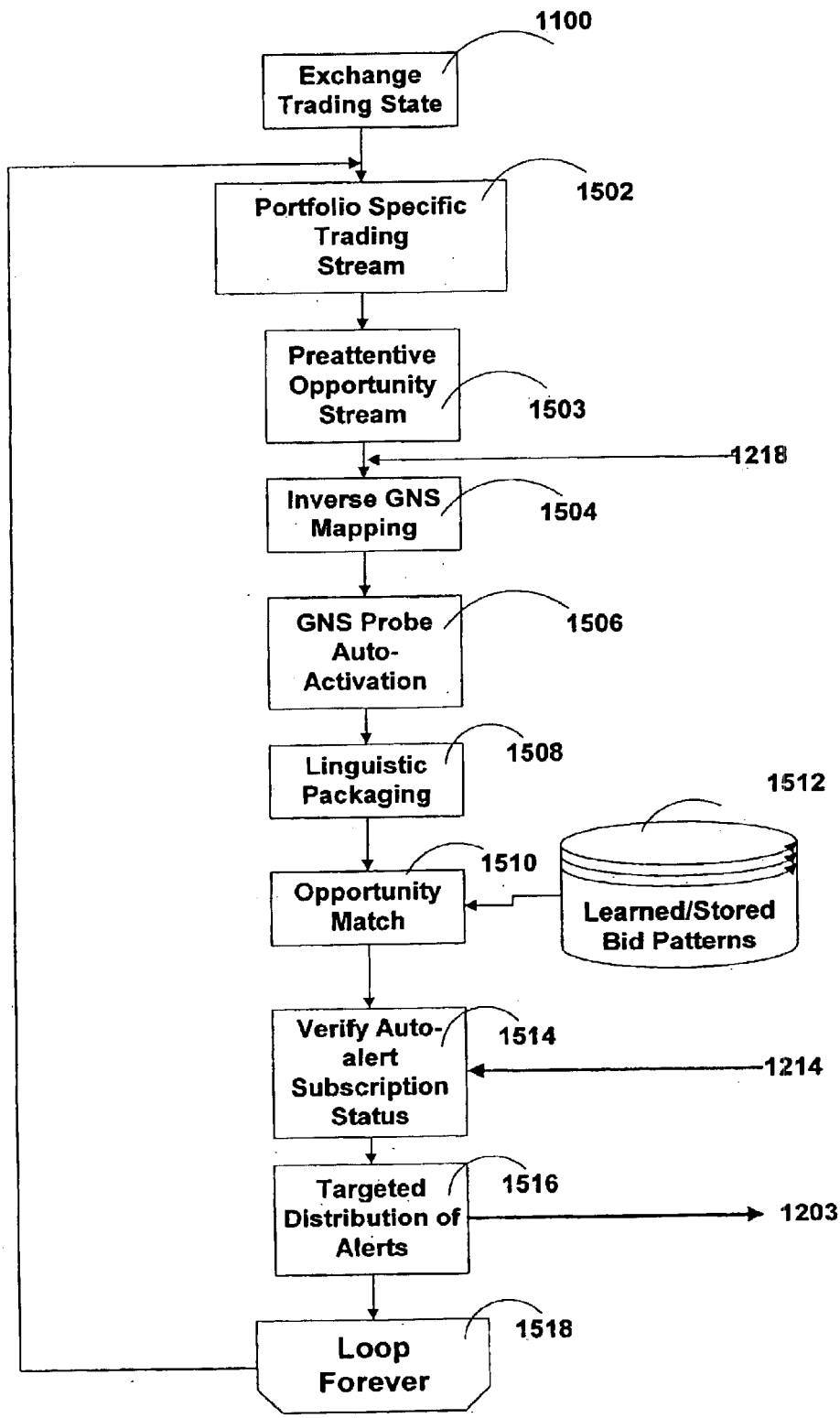
FIG. 15 details the steps required for the insertion of auto-probes into various auction streams for auctions conducted on the secondary market exchange of FIG. 8.

The generation of preattentive and focal attentive opportunistic alerts as illustrated above by switch manager 1100 in FIG. 11 in an secondary market e-commerce transaction context is shown in greater detail in FIG. 15. The active, persistent (k-th) portfolio trading state previously shown as 1100 in FIG. 11 is automatically and continuously updated and projected into the sub-exchange trading state 1500. This state is then inserted into the sub-exchange state space also denoted by portfolio trading stream 1502. Please note that reference 1502 represents a list (stream) of transactions associated with a specific portfolio/service auction. The entire sub-exchange specific transaction data stream is maintained within the transaction datastore shown in 1204 in FIG. 12. The stream denoted by 1502 is continuously analyzed to determine the state space 1503 that provides opportunistic activation of sub-exchange subscribers. The process is algorithmically implemented by convolving a list of requirements and interests provided by service subscribers to the exchange and encoded as autoprobes within the probe datastore 1218.

Figure 18:
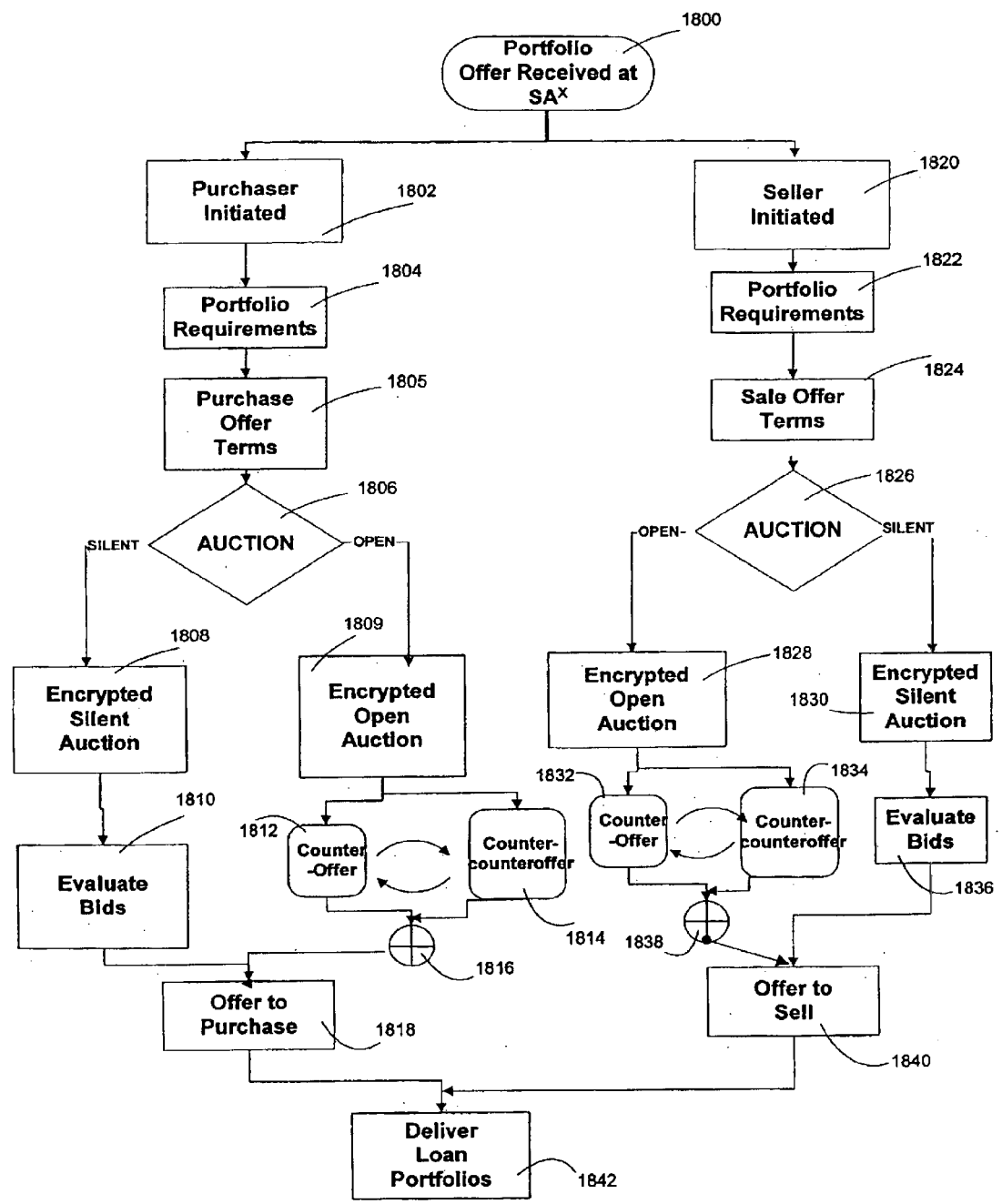
FIG. 18 illustrates the steps by which a portfolio for sale or for purchase is listed on the secondary market exchange of FIG. 8.

The detailed discussion of computational methodology pertaining to the to generation of auto-probes, which provide a subsequent mathematical criteria for efficiently recognizing and routing revenue opportunities within the exchange is presented later with the discussion for FIG. 18. The invention relies upon a very efficient representation and abstraction to portfolio requirements expressed by sellers and purchasers listing with the exchange. These requests are encoded to form "active auto-probes" using an augmented Gelfand-Naimark Segal (GNS) construction. In FIG. 18 emphasis is on inverse GNS mapping, where by the state space is analyzed to match pending opportunistic auto-probes.

Functionally, GNS construction is one efficient way of achieving and implementing satisfiability of conditionals for auto-probes, but it should be recognized by one of ordinary skill in the art that functions or any other model which yields an explicit or implicit enumerative decomposition of complex conditionals can be employed. The exemplary auto-probe design is inspired by techniques in state space analysis in statistical mechanics and quantum mechanics. In this context, GNS construction is used to decompose portfolios and operate upon portfolio decomposition products without explicitly enumerating each sub-element. Conventional mathematical satisfiability constructions and algorithms may be used to achieve the same, but the notion of extracting opportunity in computational and information services markets from pending and incipient auctions in secondary product markets is novel, particularly because the paradigm of person-to-person auctions in consumer products and primary products does not carry over. Thus, the augmented GNS provides a closed form expression for recursively capturing an entire class of portfolio decomposition products. The generator space and properties of the generator space resulting from the closed expression for the GNS construction is useful when applied to a stratified loan portfolio. Mathematically, Gelfand-Naimark Segal (GNS) construction is a special case of combinatorial Hopf algebra for random walks. Co-product construct of the Hopf algebra plays the role of 'sharing out' possible explanations of a fact. The method exploits Hopf algebras or quantum groups. This provides a generalization to ordinary groups and random walk algorithms applied in classical and neoclassical portfolio analysis. This analogy is necessary to capture the essence of auctions in secondary instruments where the complex coupling between primary origination markets, securitization markets, and external variables forbids or reduces the attractiveness of certain decomposition. Two broad mechanisms provide a vehicle for capturing these time-dependent exclusions (1) constructive simulations: explicit enumerations in terms of i.e., classical algorithmic structures such as graph-theory, probabilistic networks, or stochastic transition networks (STNs); or (2) generalized group theory: an entire class of compact, closed-form portfolio state space analysis and management operators (expressed via tensor products) which can accommodate secondary market dynamics. The invention has chosen the latter approach to be maximally inclusive of all and any independent and dependent sub-portfolio configurations allowable upon the secondary object transaction.

The above enumeration transformation based on is mathematically defined as follows:

For a vector space spanned with a basis set with length $|\Omega|=n$, a binomial bialgebra can be identified with a commutative Hopf algebra $k[x_1, x_2, \ldots, x_n]$ of polynomials in n variables and coproduct given by $$\Delta x_i = x_i \otimes 1 + 1 \otimes x_i$$

extended to products an algebra homomorphism. This is analogous to the commutative Hopf algebra of coordinate functions in n-dimensional plane. The counts and antipode are given by $\epsilon\, x_i = 0$ and $Sx_i = -x_i$. This expansion of secondary capital instrument sub-portfolio coproducts or sub-portfolios can be analytically expressed as $$\Delta x_1^{a_1} \ldots x_n^{a_n} = (x_1 \otimes 1 + 1 \otimes x_1)^{a_1} \ldots (x_n \otimes 1 + 1 \otimes x_n)^{a_n}$$

$$= \sum_{b_1 \leq a_1} \binom{a_1}{b_1} \ldots \binom{a_n}{b_n} x^{b_1} \ldots x^{b_n} \otimes x^{a_1 - b_1 \ldots a_n - b_n}$$

The preceding coefficients $$\binom{a_1}{b_1}$$

are just the number of ways of partitioning a specific subportfolio of type i. Thus in this invention, a mathematical representation that transforms a portfolio into an algebra of subportfolios corresponding to polynomial functions in $|\Omega|$ independent variables, reflecting the multiplicity in the coproduct, is used for designing the auto-alerts and probes. This abstract way of thinking about sub-portfolio partitions as binomial coefficients allows the exchange to generalize them and their properties to a variety of combinatorial situations. The actual combinatorics of explicit enumeration makes listing every allowable combination untractable.

In general, classical group-theoretic algebras permit invertible transformations on all subspaces, but the Hopf algebra assumes a weaker structure, the antipode, which provides and allows nonlocal 'linearized inverse'. It means that instead of individual sub-portfolios, certain linear combinations are invertible.

More importantly, a closed form (tensor product operators) is required to automate the opportunistic switching implemented by the exchange across sub-exchanges and secondary markets. Also, the logarithm of the number of partitions leading to a given sub-portfolio configuration defines the entropy of that configuration. As discussed below the sub-portfolio configuration entropy is used as a decision metric to determine optimal portfolio decompositions.

An augmented GNS construction of a generalization to the above algebra provides a state transition operator whereby a state $\phi$ on some abstract Hopf *-algebra with left regular representation $A \subset \text{Lin}\,(h)$ can be given by $$T_{100}(a) = (\phi \otimes id)(W(a \triangleright \otimes 1)W^{-1})$$

where the joint evolution operator W is some unitary operator in $L$ in $(h \otimes h)$. Also, "A" is a copy of an operator algebra state by left multiplication. $a \triangleright$ and element a acting in the left regular representation on state $h$. For auto-probe design we force "A" to be a bialgebra so it has one natural invariant linear functional $\int$, the integral on "A". Note that this structure is symmetric only to an isomorphism, which is not given by the usual transposition but by a weaker structure called a quasisymmetry or braiding.

The net effect of the construction is to embed sub-portfolio configuration sets $a \in A$ as $(S\{\Gamma_i\},t)$: $a \otimes 1 \in A \otimes A$, where the A denotes combinatoric portfolio algebra of subportfolios at instants $t_1, t_2, \ldots t_n$.

In step 1504, the inverse GNS construction is used to determine if the states in a pending auction stream, denoted by $A \otimes A$ can actually be translated into bidding opportunities.

Compute $\aleph^{-1}(S\{\Gamma_i\},t)$ for all i.
where $\aleph^{-1}$ denotes the inverse GNS constructor
and $S(\Gamma_i)$ denotes the state of one portfolio in the sub-exchange trading stream.

The sub-portfolio decomposition analytic obtained using an inverse GNS constructor in n-steps is given by $$\Delta^{n-1} X^p = \sum_{i_1 + \ldots + i_n = p} \frac{[p; q^2]!}{[i_1; q^2]! \ldots [i_n; q^2]!} X_1^{i_1} \ldots X_n^{i_n}$$

where $$[i; q^2] = \frac{1 - q^{2i}}{1 - q^2}$$

In the above equation $\chi_i$ denote n random variables (basis sub-portfolio) embedded in $A \otimes^n$ with q-independence.

The factual (realization) generated by the inverse GNS constructor, where the cofactors correspond to the pending transaction stream is given by the closed form:

$$\mapsto vx = \begin{pmatrix} v^1 x_1 & \ldots & v^1 x_n \\ \vdots & \ddots & \vdots \\ v^n x_1 & \ldots & v^n x_n \end{pmatrix}$$

where $A(R) \to V_L(R,\lambda) \otimes V^*_L(\lambda,R)$ and the assignment is covariant under the left and right coactions of the R-matrix A(R). The normalization constant, λ, corresponds to the eigenvalue of PR where P is a permutation matrix such that PR obeys a minimal polynomial of the form $\Pi_i (PR-\lambda_i)=0$ The n sub-portfolio elements $v=(v^i)$ correspond to generators of the matrix algebra represented by the secondary portfolio.

Step 1508 maps the factual to a linguistic expression ("a $20 M–$30 M portfolio with IRR 10.27%+/−0.03% and hold period of 6 months")

The linguistic translations are then posted on the sub-exchange and used to match offerors and requesters of portfolio and services.

The opportunity matching step additionally relies upon previously captured offer and bid patterns stored and maintained in database 1512. For transaction traceability and legal requirements, the exchange keeps a permanent electronic readable record of all transactions. Also, the exchange implements maximal opportunistic expansions matching as many offerors and requestors which may or may not be alerted depending on whether they have explicitly subscribed to the opportunistic alerting service.

The actual match process may be achieved by conventional means that includes probabilistic, soft-computing techniques (neural networks, fuzzy logic) and classical AI and formal logic. The matches are then used to instantaneously auto-alert subscribers as given by 1514. This information is transferred to block 1214. The exchange further provides a targeted distribution of alerts 1516 to update the active probe list in 1203. This computation is repeated in an infinite repeat loop in the background, and is dependent upon the presence of at least one transaction in the auction stream and sub-exchange state space.

Figure 16:
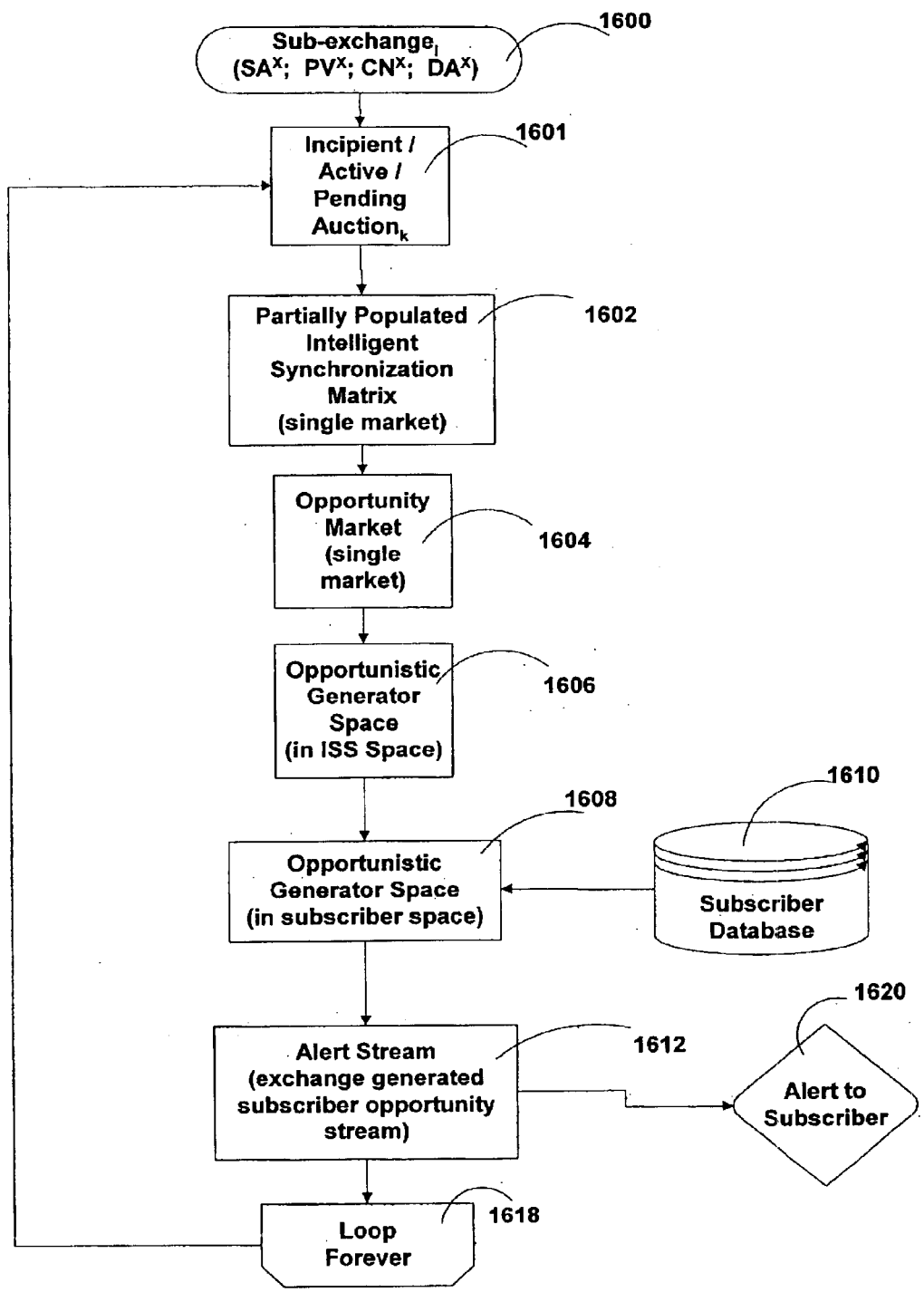
FIG. 16 illustrates the exchange generated subscriber opportunity stream process of alerting subscribers of incipient/active/pending opportunistic auctions on the secondary market exchange of FIG. 8.

FIG. 16 expands upon the targeted alerting service offered by the exchange and component sub-exchange to subscribers. This process is independently repeated in all the four sub-exchanges. The exchange manager 1100 maintains a state of all active and incipient auction streams in the sub-exchanges. The linkage of sub-exchanges to support a specific portfolio transaction (all associated activities) is maintained in a structure referred to as intelligent synchronization matrix ("ISM") 1602. The ISM embodies the ViaChange™ switch state. A query to ISM can instantaneously provide up to date, real-time information about any and all aspects of the transaction. ISM is considered partially-populated when the transaction is in progress in a specific secondary market. Restricting opportunistic expansions to within a single market (e.g., secondary mortgage market, educational loans market) 1604, the opportunistic generator space is computed 1606. This state space analysis essentially yields the sub-state space 1608 that will be used to further apply augmented forward GNS to determine relevant expansion space. A subscriber database 1610 receives alerts from the opportunistic generator space computations 1608. The mathematical steps capturing the process are given by:

1. Examine the transaction state space:
   previously defined sub-portfolio $v^i$ is an element of t
   $\mapsto vx$.
2. Extract the opportunistic sub-state space
   $\Delta v^i$
   $$\Delta v^i = \sum_{splittings} v^i_j \otimes v^i_k$$
   $\subseteq \Delta v^i_n$ and $\otimes$ denotes the tensor product.

3. Extract subscriber criteria from database 1610
   Select on: fn(sup(v(yield,t,risk)))
4. Parameterize forward GNS constructor 1608
   min(λ): $V_L(R,\lambda) \otimes V^*_L(\lambda,R)$ for all L.
5. Package results of application of GNS constructor 1612
6. Send alert to subsrciber 1620

The process is repeated indefinitely, provided ISS is not empty (i.e. nothing to auction on the exchange).

Figure 17:
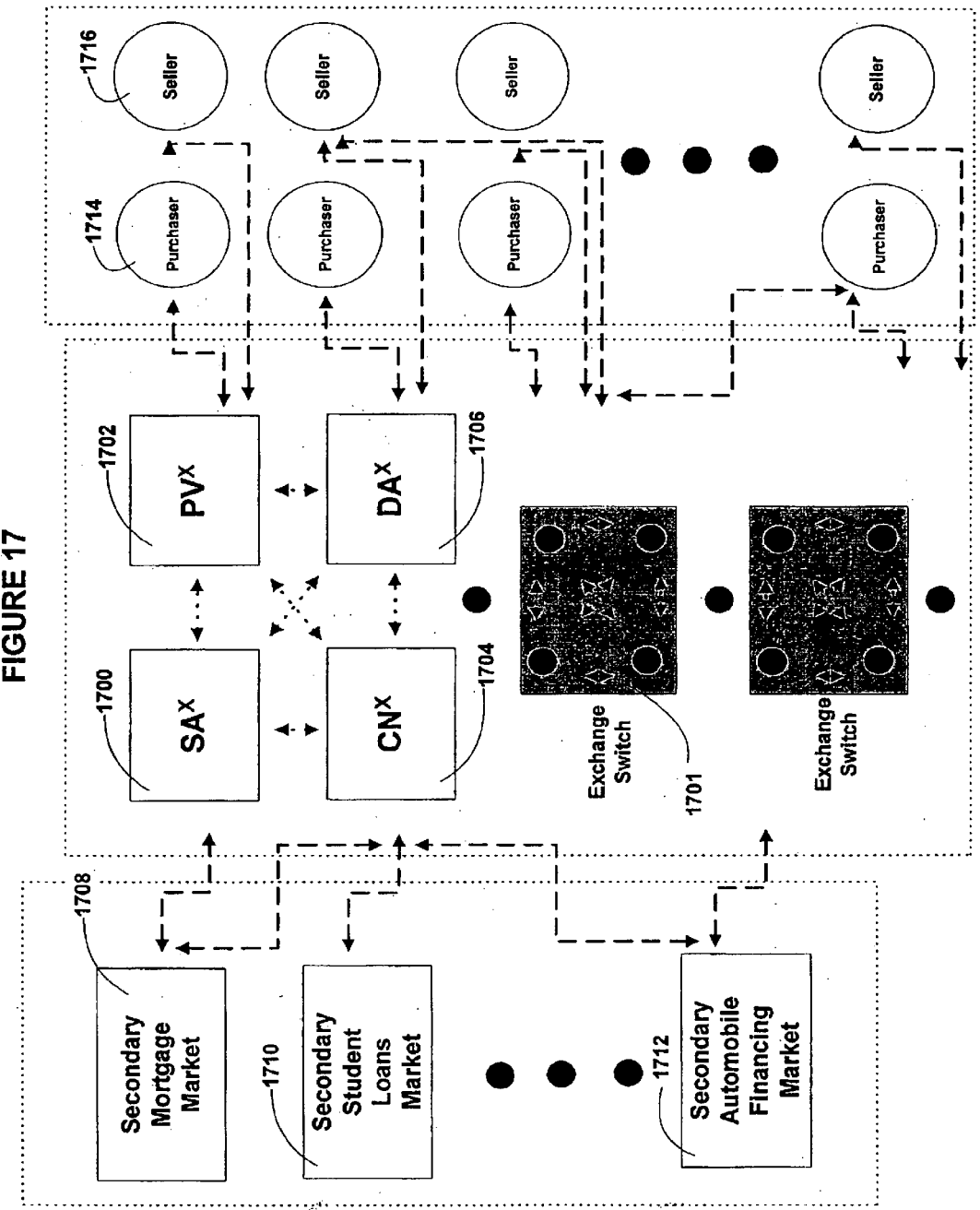
FIG. 17 illustrates the four sub-exchanges of FIG. 10 and their relationship to other sets of sub-exchanges and to multiple secondary markets.

FIG. 17 is a generalization of the opportunistic auction context as presented in FIGS. 10–17 in a single secondary market context, to a multiple market secondary market context. This arrangement is important because automatic back and forth cross-over of transactions between differing secondary markets has not previously been utilized. The exchange provides a platform independent mechanism whereby a portfolio purchaser or portfolio seller intending to conduct transaction in a specific secondary market ends up either transacting in another market or co-optimizing a portfolio turnover decision in multiple markets prior to making a bid in the original market.

As a specific example, consider a portfolio purchaser 1714 in the student loan market 1710, may be simultaneously examining yields in the secondary automobile financing 1712 and secondary mortgage marketing 1708 prior to accepting a sale offer from 1716. The purchaser's decision may entail usage of $PA^X$ services in 1702 to price the offer while using the $CN^X$ 1704 to actually contract and negotiate. To further continue the example, it may happen that on the $10^{th}$ day of transaction (after the purchase offer if first listed), a dramatic change in market conditions forces the portfolio purchaser to redirect purchase from the student loans market to the secondary mortgage market. The exchange automatically alerts him to opportunities not only in terms of service offerors as highlighted by FIGS. 10 and 11, but also opportunities in other markets. At a minimum, the exchange offers participants the ability to operate based on an exponentially expanded analytical decision space. Because the switch operates on "secondary market objects" that embody a generalization to "primary market objects", in terms of coupling to large number of external market variables, the instrument/portfolio price in multiple markets is highly optimized and accurately estimated. The exchange provides for opportunistic auctions where a transaction for a product or a services triggers auctions (both normal and reverse) for further objects or services on the same or different secondary markets (opportunistic auctions may also cross back and forth over multiple secondary markets).

The generalization is furthered since the ViaChanger™ switch is capable of sustaining and managing multiple transaction streams. The algorithmic method of FIGS. 16 and 17 is generalized and applies to providing spontaneous expansion of opportunity and alerts across multiple markets.

FIG. 18 details the steps by which a transaction for a portfolio offered on the exchange 1800 is completed. First, examining a purchaser initiated 1802 auction, the desired portfolio requirements 1804 are submitted to the exchange which then translates the terms into standard purchase offer terms format 1805 before placing the portfolio up for auction 1806. The auction next progresses in one of two ways depending on whether the purchaser at the portfolio requirements stage chooses to conduct an open or silent auction. In a silent auction, encrypted bidder-to-purchaser channels of communication 1808 are opened and each bid is individually evaluated by the purchaser 1810. In silent auctions, bids are not published. In an open auction, encrypted multiple-bidder-to-purchaser channels of communication 1809 are opened while bid data is publicized and the highest bid received by the exchange manager is visible to at least one (some variables can be hidden) potential purchasers. In addition to publicizing the bids received by the purchaser, the purchaser's counteroffers 1812 and the bidders' counter-counteroffers 1814 are disseminated to select bidders. When an offer is received that is suitable to the purchaser, an offer to purchase 1818 to the seller is generated. The process is completed with the negotiation of delivery and loan transfer agreements 1842.

In a seller initiated auction 1820, portfolio requirements 1822 which consist of the attributes of the portfolio to be sold are translated into exchange friendly purchase offer terms 1824 for listing in the auction 1826. Similar to the purchaser initiated auction 1806, the auction may be either an encrypted open auction 1828 or an encrypted silent auction 1830. The seller initiated open auction publishes counteroffers 1832 by the purchaser and counter-counteroffers 1834 by the bidders in response to said counteroffers. The seller in a seller initiated silent auction also evaluates bids 1836 individually. When an offer is received meeting the seller's requirements, an offer to sell the portfolio 1840 to the purchaser is sent to the winning bidder. The process is completed with delivery and loan transfer agreements 1842.

Figure 19:
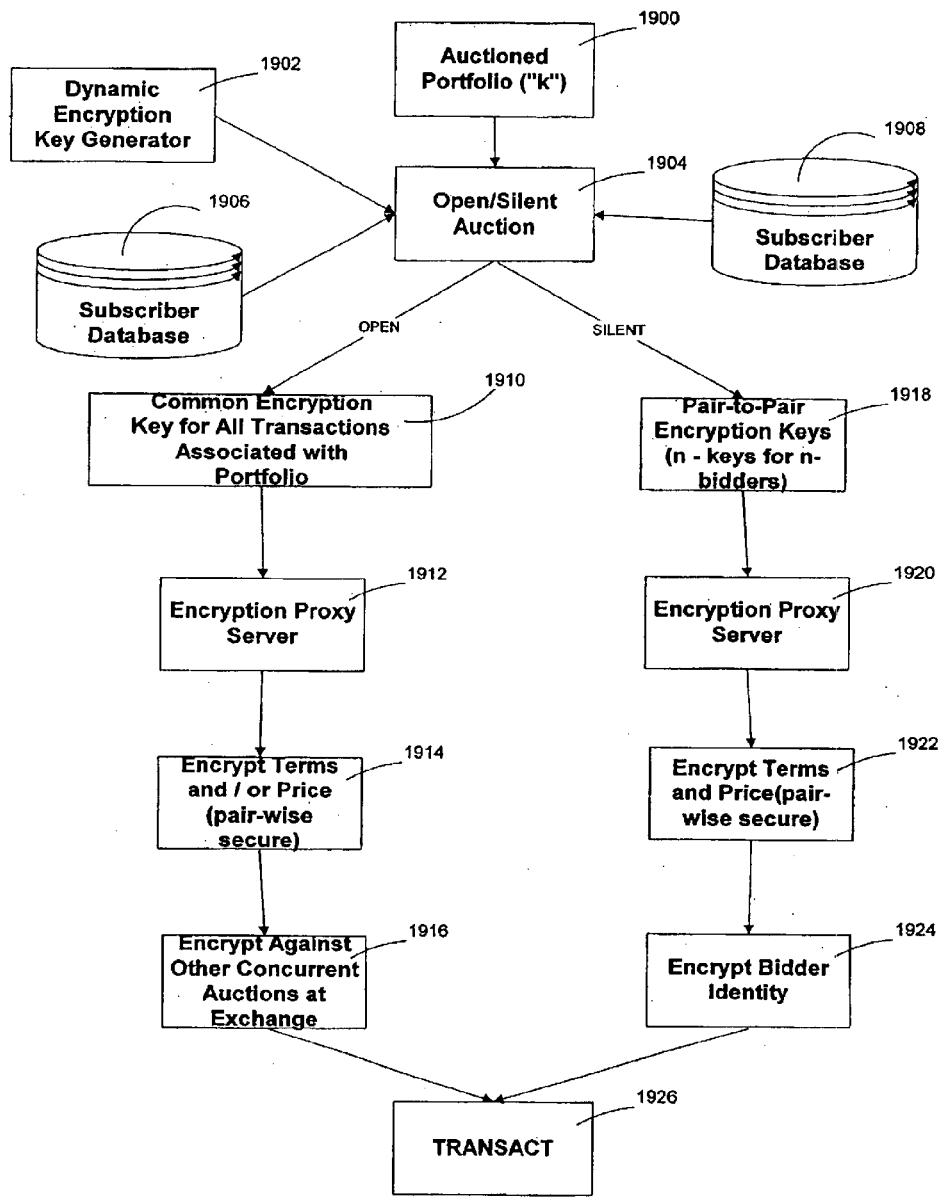
FIG. 19 illustrates the methods of encryption used to further various auction formats for auctions on the secondary market exchange of FIG. 8.

One feature of the preferred embodiment permits the exchange to open up various encrypted communication channels between various exchange participants on the exchange. As seen in FIG. 19, an auctioned portfolio 1900, listed on the exchange can be either offered for open or silent auction 1904. Encryption is used to implement the two auction mechanisms. By definition, all bid-related transactions (e.g. participant identity) associated with an open auction are disclosed to all participants of that auction. Some aspects of the auction may however still be maintained private, such as contract terms and contingencies. In a closed auction, all transaction and bidder information is compartmentalized, and the identity of some or all participants unknown. In an auction involving n participants, up to $^nC_2$ private communications may be progressing simultaneously. The exchange has a dynamic encryption key generator 1902 to further encrypt data transmissions between entities within the subscriber databases 1906, 1908. Optionally, the exchange may be linked to a third party secure server for the storage of both keys and keyrings. If an open auction mode is selected, a common encryption key for all transactions associated with the portfolio 1910 is provided to the various participants in the auction. Data transmissions to and from purchaser and seller are sent through an encryption proxy server 1912 that manages data transfers and encrypts and decrypts data depending on the transfer mechanism. The proxy server sends the encrypted terms 1914 so as to encrypt the terms against external transmission 1916 (the offered price may also be encrypted). The delivery terms are almost always encrypted because there is a high subjectivity to the process of accepting the bid, beyond price, lender rating, portfolio quality, etc. When seller and purchaser reach an agreement through the encrypted channels of communication, the result is a completed transaction.

When a silent auction 1904 is selected, the dynamic encryption service key generator 1902, whether it be internal or external to the exchange provides pair to pair encryption keys 1918 for the parties from the subscriber database 1906, 1908 (n-keys for n-bidders). The encryption proxy server 1920 as stated above acts as a go between for the various parties and encrypts and decrypts terms and price 1922 data transmissions accordingly. The encrypted data relating to finalization of the transaction is encrypted along with the encrypted bidder identity 1924 so as to facilitate a private means for completing the desired transaction 1926. The actual encryption process is transparent to the participating entities, be it people or computer software programs.

Figure 20:
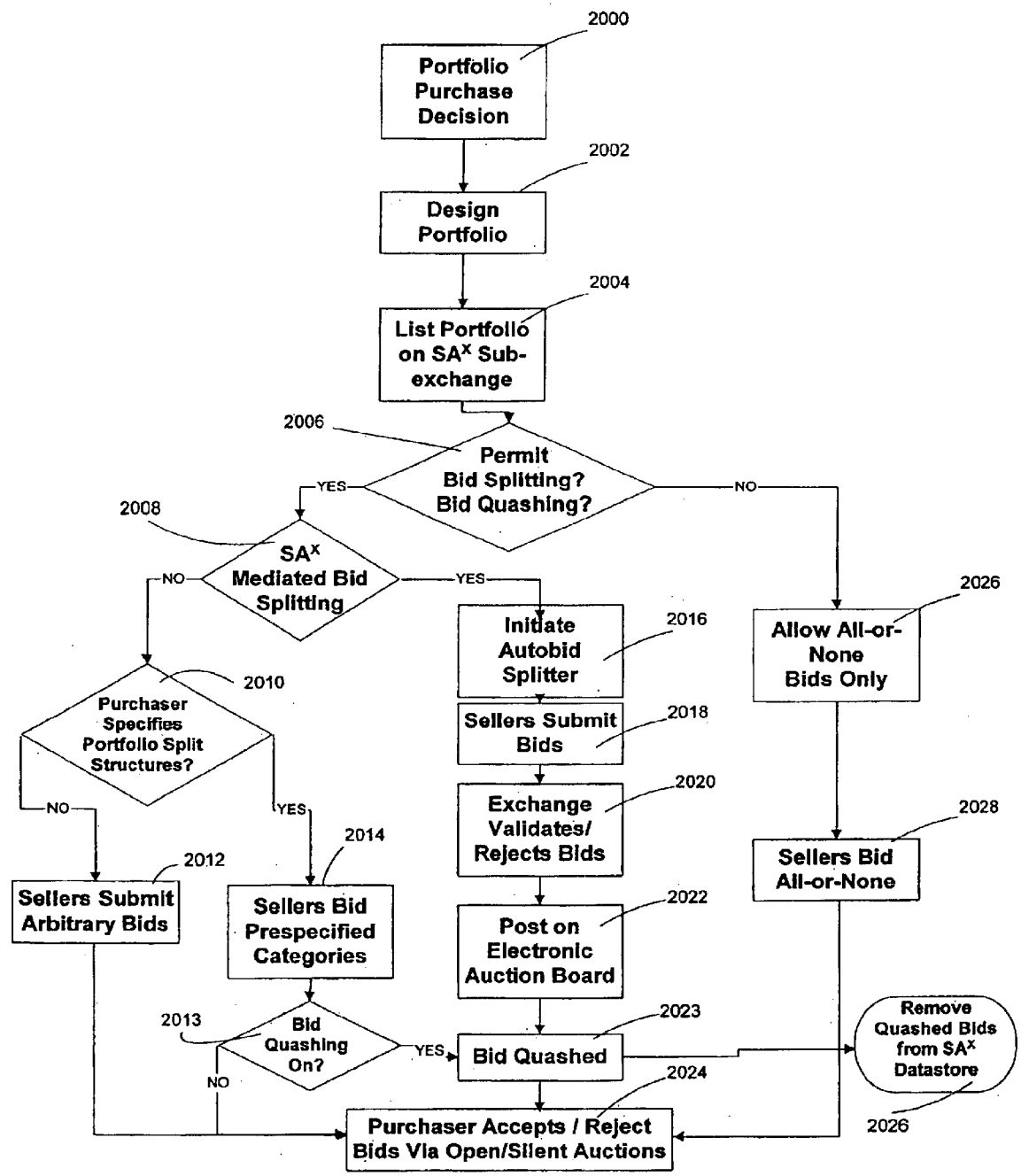
FIG. 20 illustrates a bid splitting feature of the secondary market exchange of FIG. 8 that permits portfolios for purchase listed on the exchange to be parsed into smaller components to further minimize market inefficiencies.

FIG. 20 presents the exchange ability to automatically and autonomously decompose large portfolio purchase offer and portfolio sale offers into smaller component offers without explicitly listing every possible sub-combination. The combinatorics of decomposition have made such portfolio packaging burdensome in the past. Consequently, offerors were limited to specifying a few combinations of acceptable bids against a large portfolio split into smaller portfolios. The $SA^X$ sub-exchange introduces three significant innovative capabilities. First, large portfolios may be automatically decomposed into smaller components. In the described embodiment, this is based on adaptation of forward GNS transformation described previously in steps 1608–1612. Second, the exchange provides the ability to accept a bid and automatically verify if it is a valid sub-bid against a large portfolio purchase or sale offer. The bid verification feature is implemented using inverse GNS constructor described previously in steps 1508–1510. Third, the exchange provides the capability to quash bids or the ability to supplant a cumulative bid combination with a larger equivalent portfolio construction. The quashing or replacing portfolio may be composed of a single bid or have a lesser number of components than the set being replaced. The quashing criteria is based on the cardinality of replacing sets in terms of the number of individual components in the two sets. The quashing capability is necessitated by inherent desires of sellers and purchasers to minimize time and money spent in negotiations and drafting loan transfer agreements required to offload a portfolio. However, the flexibility provided by the exchange bid splitting feature is useful in minimizing risks associated with offloading large portfolios. In this regard, the exchange may act as an intelligent full service broker.

FIG. 20 provides a purchaser view of the $SA^X$ sub-exchange capability to decompose large portfolio purchase requests into smaller requests. A portfolio purchaser desiring to purchase a portfolio with specific attributes may list a request for such a portfolio on the exchange as seen in FIG. 20. Initially, the purchaser must determine whether to initiate the process by making a portfolio purchase decision 2000 and to design a desired target portfolio 2002. Once the desired portfolio criteria are communicated to the $SA^X$ sub-exchange manager, the portfolio is listed on the secondary auction sub-exchange 2004. Purchasers listing portfolio requests have the option to permit bid splitting 2006. If the purchaser chooses bid splitting, the exchange further offers the quashing option, whereby a purchaser may choose to eliminate a more fragmented response to his offer 2007, prior to auction. By selecting the quashing feature, the purchaser precludes the possibility of receiving better terms from a more fragmented group of sellers than the replacing set with larger portfolio volume purchase offer. When bid splitting is not permitted, only all-or-none bids are allowed 2026 which requires a single all-or-none bid from a seller 2028 to be accepted or rejected by the purchaser via an open or silent auction 2024.

Figure 21:
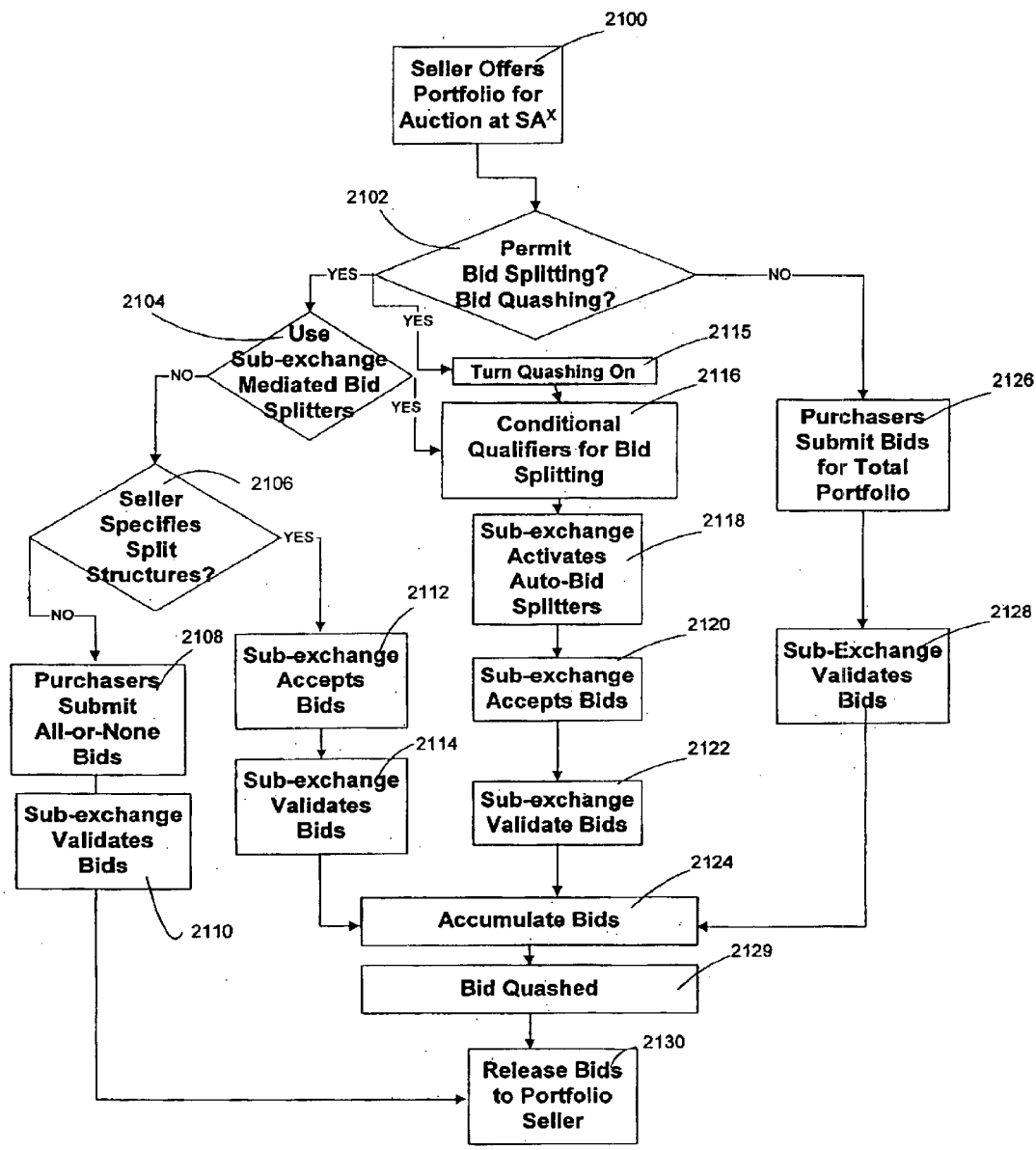
FIG. 21 illustrates a bid splitting feature of the secondary market exchange of FIG. 8 that permits portfolios for purchase listed on the exchange to be parsed into smaller components to further minimize market inefficiencies.

When bid splitting is permitted 2006, the purchaser has the option to use the exchange mediated algorithmic bid splitting 2008 feature to allow the exchange to parse desired portfolios into smaller components (known as initiating the auto-bid splitter, see reference 2106 in FIG. 21). The mathematics of one decomposition strategy is represented by 1608–1612 in FIG. 16. The permissible elements of the desired portfolio are then loosely listed whereupon sellers may submit bids 2018 and the exchange validates and/or rejects bids 2020 to ensure that they fit within reasonable parameters as compared to purchasers' desired portfolios. Validated bids are posted on an electronic auction board 2022 that is part of the exchange. While bids are being submitted, the $SA^X$ sub-exchange verifies incoming bids to determine if a more recently time-stamped bid can quash or replace a combination of previously submitted bids 2023. If such a condition arises, the $SA^X$ sub-exchange removes all quashed bids from the electronic auction floor, and informs the sellers of the decision. The quashing check is performed only when the purchaser selects the option in 2007. The following steps are involved in the quashing check:

(a) Determine whether each bid corresponds to a co-factor in the augmented forward GNS constructor used to implement portfolio decomposition;
(b) Determine whether each co-factor is associated with a geodeasic. A larger ordinal geodeasic implies a larger portfolio construction;
(c) Maintain bid responses and sort by time and geodeasic;
(d) Insert each new bid in the sorted bid pool;
(e) If the integrated geodesic of one or more pending bid sequence in the submitted pool matches the geodesic of a more recently time-stamped large bid than the former is replaced from the pending 2023 pool. The purchase is asked to verify before the bids are actually removed, if the purchaser has requested a notification;
(f) Resort the remaining pool; and
(g) Reapply step (e) to check whether another sequence may similarly be deleted.

Optionally, the quashing process may be manually implemented, with the purchaser initially rejecting all split bids in favor of fewer, larger bids. When the above enumerated process is employed in a closed auction, the quashing functions and their impact on the bid pool is not visible to the participants.

The auction mode allows for purchasers to accept or reject bids via open or silent auctions 2024. When bid splitting is permitted 2006, and the exchange mediated bid splitting 2008 is not chosen by the purchaser, it may utilize its own purchaser specified split structures 2010 to parse the desired portfolio into smaller components. By definition, quashing is not available when purchasers have selected to accept specific combinations of split bids because explicit specification of bid structures presupposes willingness on part of purchasers to accept responses. The pre-specified bid categories are then bid upon by sellers 2014 which permits purchasers to accept or reject bids via open or silent auctions. Steps 2012 and 2028 represent the electronic process of entering bidding information online and registering bids on the $SA^X$ sub-exchange.

Another feature of the preferred embodiment permits portfolio purchasers to conditionally request portfolios based on certain requirements (for which the variables involved can be in the hundreds and thousands) selected by the purchasers. For example, a portfolio purchaser may send a request to the exchange manager requesting a $50 million portfolio with a 5% annual yield with 20% of the loans coming from California, 30% coming from the Midwestern region of the United States and the remaining loans to come from the New England states with the risk level never dropping below a Grade B Mortgage.

Once the portfolio requirements are received by the exchange manager, a negotiating agent will negotiate with at least one seller in an attempt to partially fulfill the designated portfolio requirements. This may be done in toto from a single seller or the negotiating may send out a series of conditional offers to meet the desired portfolio requirements. Because the underlying objects for which negotiation is taking place are dynamically priced, the negotiating agent has the capability of dynamically altering its offers based on the changing prices. Optionally, the portfolio requirements submitted to the negotiating agent may be dynamic and thus, dependent on external market variables.

With reference to FIG. 21, a seller offering a portfolio for auction 2100 may also have the option of permitting bid splitting 2102 (i.e., portfolio purchasers can offer to buy a fragment of the offered portfolio, when listing a portfolio on the secondary auction exchange). If bid splitting is not selected for the portfolio, prospective purchasers submit bids for the entire portfolio 2126 (rather than components or fragments) that are then validated by the exchange 2128. When bid splitting is permitted 2104, the seller has the option of using exchange mediated bid splitting 2104 or utilizing its own seller specified split structures 2106. The exchange auto-bid splitter formulates conditional qualifers (e.g., "not smaller than 50M", "all loans in midwestern states to be traded together") for bid splitting 2116. When the augmented forward GNS constructor, specified in steps 1508–1512 (see FIG. 15), is applied, these conditional qualifiers serve as conditionals on the cofactor design.

Once conditional qualifiers are established, the sub-exchange activates auto-bid splitters 2118 and parses the portfolio into smaller components for listing. The exchange can then accept bids 2120 for those smaller portfolio components while validating bids 2122 before they are accumulated 2124. $SA^X$ sub-exchange bid validation verifies that the submitted bids meet conditional split criteria. This verification check is implemented using computational steps 1508–1512 (see FIG. 15). Because bids are conditional, an additional relational check is performed to determine whether the criteria specified in 2116 are met. To ease implemention and validation, the lingusitic conditionals are also published with the portfolio purchase and sale offers. If seller specified split structures rather than the exchange mediated bid splitting is selected, the sub-exchange accepts bids 2112 according to the sellers bid structures and the sub-exchange validates the bids 2114 to ensure that the bids are within the applicable parameters selected by the seller. When bids are accumulated for a certain period of time, they are released to the portfolio seller 2130.

Another feature of the invention available in seller dictated auctions is the "bid quashing" capability discussed in conjunction with FIG. 20. The "bid quashing" as implied in seller dictated auctions is the exact analog of that implied in purchase led auctions. Bid quashing in a seller dictated auction results in a larger portfolio purchase offer that will overwrite and replace fragmented smaller offers. The computational implementation, replacement logic and the transactional processes used to implement this feature within the $SA^X$ sub-exchange is identical to those discussed in FIG. 21.

Figure 22:
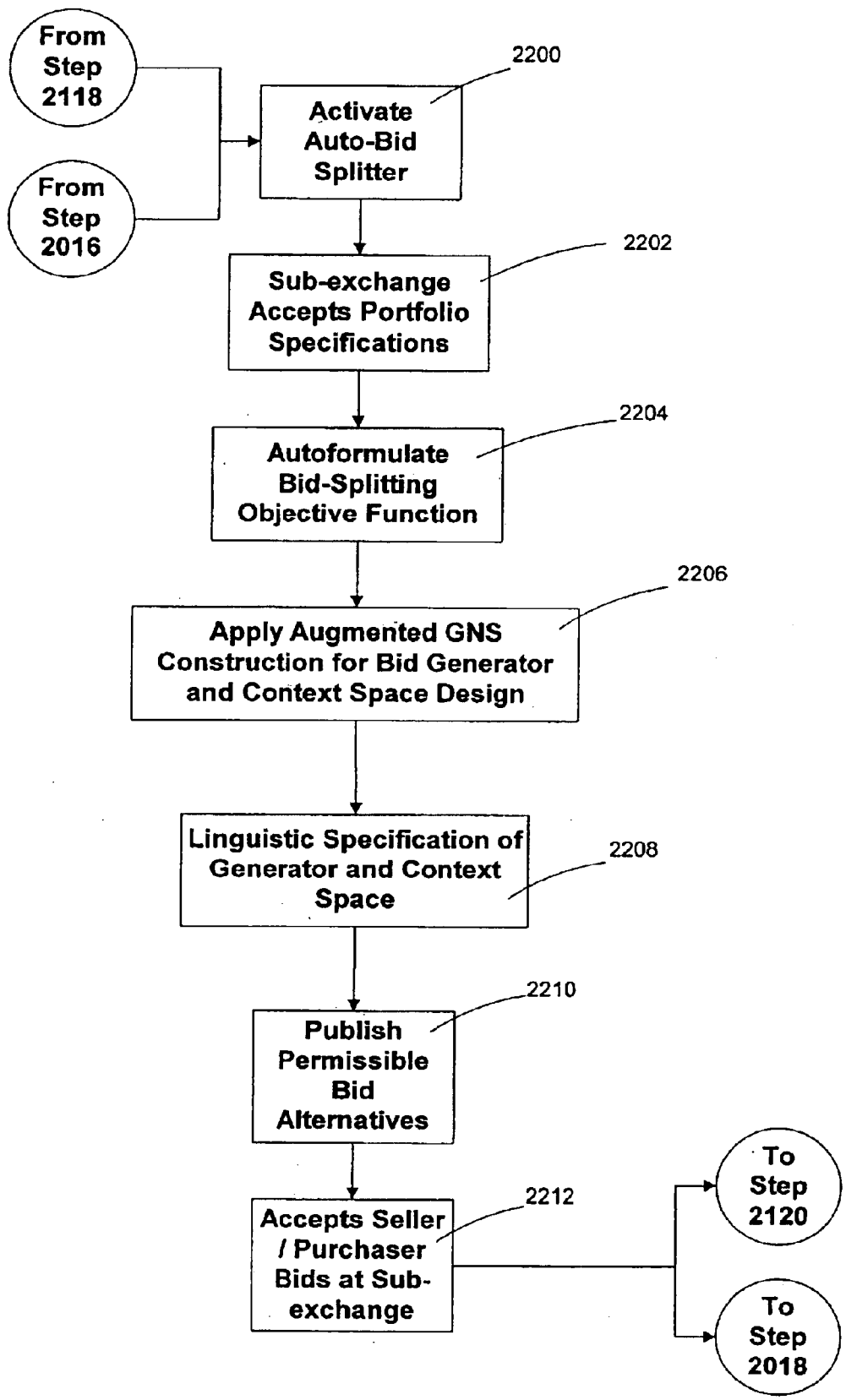
FIG. 22 details an algorithmic process by which the secondary market exchange of FIG. 8 conducts auto-bid splitting.

FIG. 22, details the algorithmic process by which the exchange manager accepts or rejects and then applies various commands relating to auto-bid splitting, which in the exemplary embodiment is implemented using an augmented forward GNS constructor. Specific usage and associated mathematical implementations of this algorithmic embodiment have been described in FIGS. 15, 16, 20 and 21. If the portfolio lister (seller or purchaser) activates auto-bid splitting 2200, the sub-exchange must accept the portfolio specifications 2202 (this is true for both actual portfolios being sold by the seller or portfolio composition requests from a purchaser) as long as they comply with exchange requirements. For example, a split bid request for a portfolio comprising 20% of the loans from California, 40% from Alaska, and 50% from Hawaii will be rejected because the sum of percentages exceeds 100%. Similarly, a split bid request containing up to 20% of the loans from California, up to 40% from Alaska, and up to 50% from Hawaii will be accepted. Once a split bid request conforms with exchange requirements, the following mathematical transformations are applied to implement step 2204 (known as autoformulation):

(1) S group-theoretic generator of the form: $e^{-Bx}$ where B is a portfolio yield specific parameter is considered;
(2) The portfolio is expressed via $V=k[e^{-Bx}]$ and $H=U(k)=k[p]$ where U is a unitary operator that retains constant or lower bounded B;
(3) The closed form for the decomposition (bicrossproduct with action) is then given by $$V(1-e^{-Bx})e^{-Bx}$$

and $\Delta e^{-Bx} = e^{-Bx} \otimes e^{-Bx}$ (4) After autoformulation, the exchange applies an augmented GNS construction for bid generator and context space design 2206 that mathematically constructs the auto-bid information to further verify that the combinations requested were acceptable.

Once conditions within the split bid request are completely verified, the linguisitic specification of generator and context space 2208 translates the computer data into a human readable (user-friendly) display format delineating all of the portfolio attributes and thereafter the portfolio is placed on the exchange. When the portfolio is listed on the exchange, a list of permissible bid alternatives is published 2210 which state the parameters (tolerances) in which bids may be placed. When all of the portfolio's parameters are enumerated online, the previously explained method by which bids are accepted and rejected at the sub-exchange 2212 is conducted.

Figure 23:
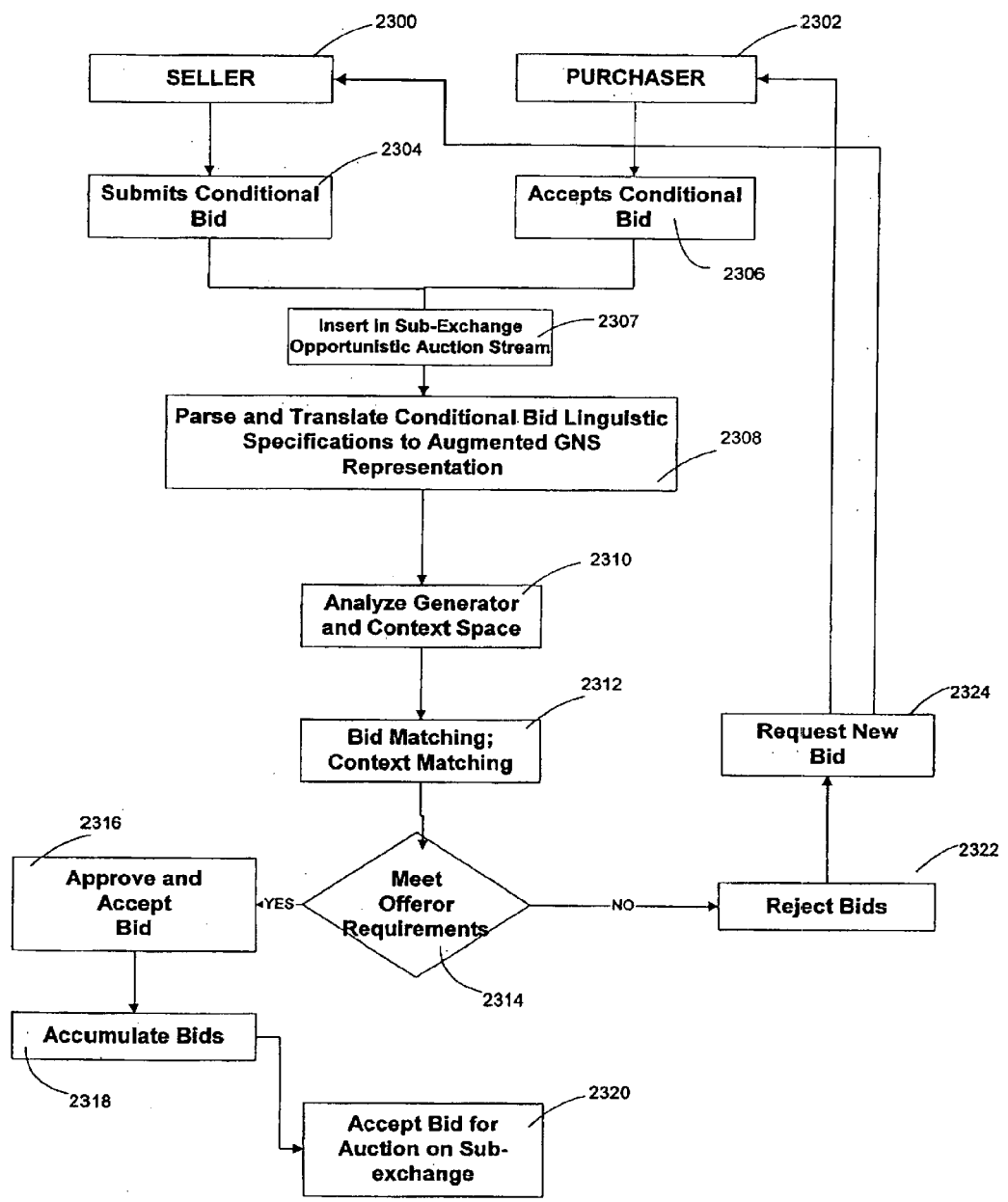
FIG. 23 illustrates a conditional bid feature of the secondary market exchange of FIG. 8.

In FIG. 23, the process by which conditional bids are introduced to the exchange is illustrated. In response to an auction posting, a seller may offer a conditional bid 2304 and a purchaser may accept a conditional bid 2306 which is then parsed and translated from conditional bid linguistic bid specifications to augmented GNS ("AGNS") representation 2308. The AGNS step entails taking a natural language specification for a bid response to a pending auction and converting it into the SAX sub-exchange representation for downstream trading. The specific form of the cofactor is modulated by the objective function specified in Step 2202 (see FIG. 22). The exchange manager next takes AGNS converted conditional bids and matches them into an analysis generator and context space 2312 where conditional sales may be accumulated or partial sales meeting the portfolio requirements may be located. Each of these bids and their contexts are matched 2312 to determine if the bid responses are valid in the context of pending auction offers. If bids do not meet the conditional auction requirements of the offeror 2314, the bids are rejected 2322 and new bid request 2324 are sent to the bidding agent (either the purchaser 2302 or the seller 2300). If received bids meet the conditional auction requirements, the bids may be approved and accepted 2316 and accumulated bids 2318 tallied which may result in the bids being accepted for auction on the sub-exchange 2320.

Extensive validation and transformation capabilities are necessitated within the $SA^X$ sub-exchange because not all bids entered are direct responses to auction offers. The bulk of bid traffic is generated from opportunistic capabilities and mechanisms implemented and offered by the exchange, in the form of auto-alerts, conditional alerts, auto bid splitting and auto bid poolers. Elaborate autonomous transaction mechanisms such as bid quashing and bid pooling further catalyze cross-overs from one auction stream to another. Consequently, the exchange generates a lot of electronic bid traffic which must be validated before appropriate auction stream crossovers and insertions are allowed. It is important to note, that from an implementation standpoint, the mathematical and computational apparatus embodied in the ViaChange™ switch operates in a participant transparent manner. Participants are only alerted after all validation and cross-validation has taken place, unless they have selected completely autonomous modes for all features offered by the exchange.

Figure 24:
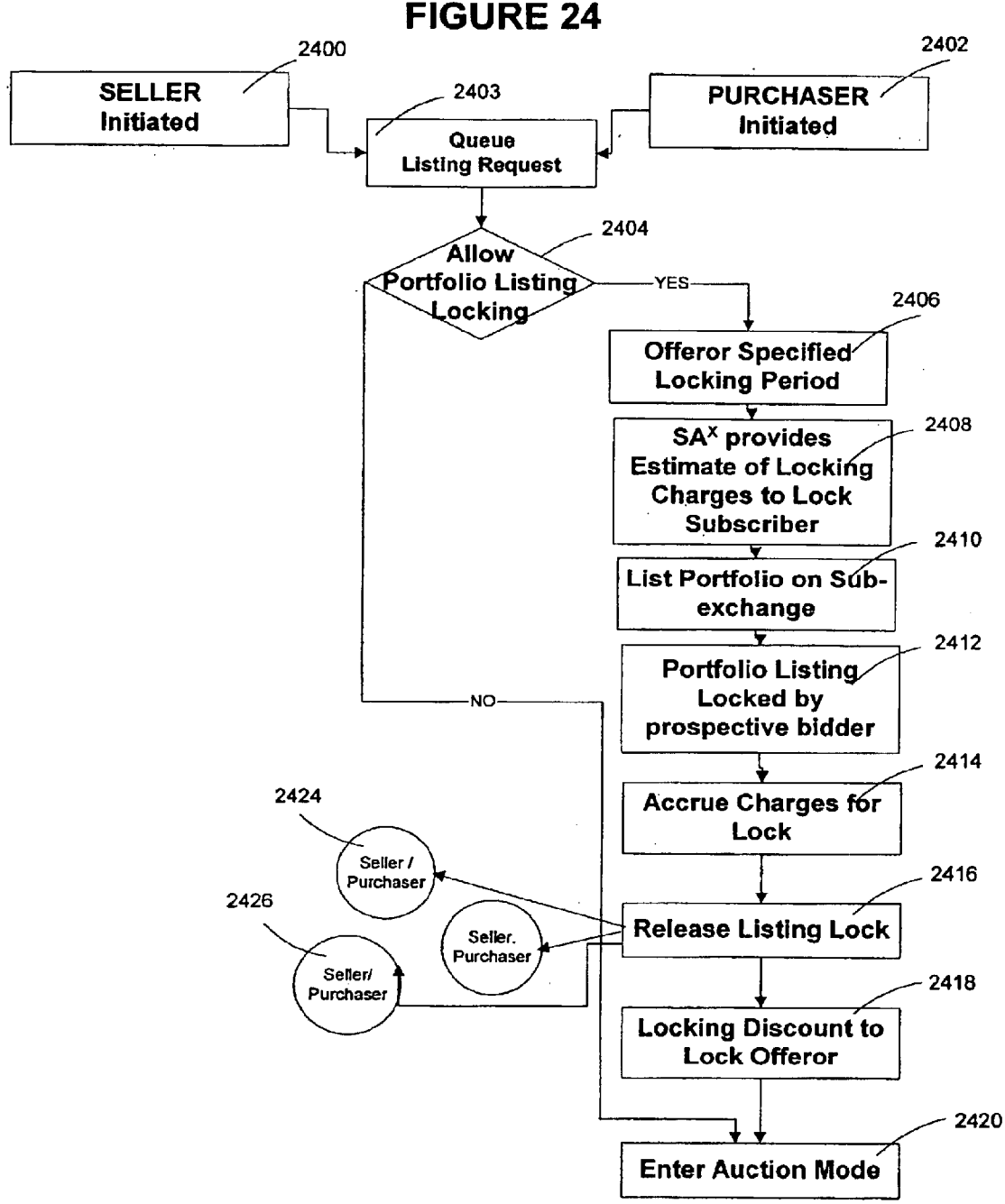
FIG. 24 illustrates a process by which the secondary market exchange of FIG. 8 permits listed portfolio locking.

Another innovative feature of the exemplary embodiment as illustrated in FIG. 24, is bid locking. A bid (or escrow) lock permits a lock subscriber (a lock subscriber can be either a purchaser or a seller) to buy an option to purchase a secondary market object or service for a certain period of time. While the lock is in effect, other purchasers may still see the price of the product or service, but are unable to place bids on it. Because of the dynamic nature of secondary markets, bid locking does not prevent the price of the locked object or service from changing while it is being held. The lock merely prevents other parties from bidding on the object or service during its duration.

Bid locks can be valuable tools permitting the lock subscriber (or purchaser) to exclude other purchasers while it determines whether to purchase the underlying object or service. Alternatively, the lock subscriber may also be a seller for a competing object or service and by locking a competitor, the subscriber is able to receive a better price for their object or service. The key objective to a lock subscriber is to maximize returns while offsetting the expenses associated with a lock.

The process by which bid locks are distributed and granted may also be a competitive bidding process that is further dynamically linked to the price of the underlying object and external markets. The exchange specifies a base price for using locks, which may be increased (but not decreased) by the lock offeror. If a lock subscriber does not exercise the option to buy the underlying object or services within the bid lock duration, the object becomes open once again for competing bids from other potential lock subscribers and may be repurchased by either the same party or a third party. Fees generated from the sale of locks are preferably distributed between the exchange and the seller (offeror) of the underlying object or service.

With further reference to FIG. 24, in particular, bid locking may be either seller initiated 2400 or purchaser initiated 2402 with similar consequences occurring with either scenario. When bid locking is activated 2404, the listing agent may enumerate a specific locking period 2406 in which the object or service on the exchange can be locked. The sub-exchange then estimates the costs of the lock 2408 and provides cost estimates to the listing agent. Optionally, the listing agent may use exchange defaults to determine and set the locking period and the costs associated with the purchase of a lock. Once the bid time period and associated costs are established, the bid is listed 2410 and multiple potential purchasers bid on the lock (see further discussion below). The auction for the lock may be either silent or open and may last for a pre-determined time period. When a lock subscriber has been established, the bid is locked 2412 and the charges for holding the lock (which may or may not be linear) begin to accrue 2414 until the lock is released 2416. While the lock is active, the lock subscriber can exclusively offer bids to the seller 2418 that may or may not meet the required criteria. In addition, dealings between the lock subscriber and the seller may also be completed off the exchange. If no bid is received, the underlying object or service may be subjected to open bidding 2420 or a new bid lock auction among other seller/purchasers 2424, may be conducted for the underlying object or service. If none of the submitted bids meet the seller's criteria after evaluation 2422 within the duration of the lock, the exchange manager may then resubmit a lock for auction or it may convert the auction into an open auction without locks depending on the seller's instructions. Once the lock is released, the sub-exchange immediately computes and credits the monies owed/discount from the listing agent's portion of the revenues created from the cost of the lock.

Figure 25:
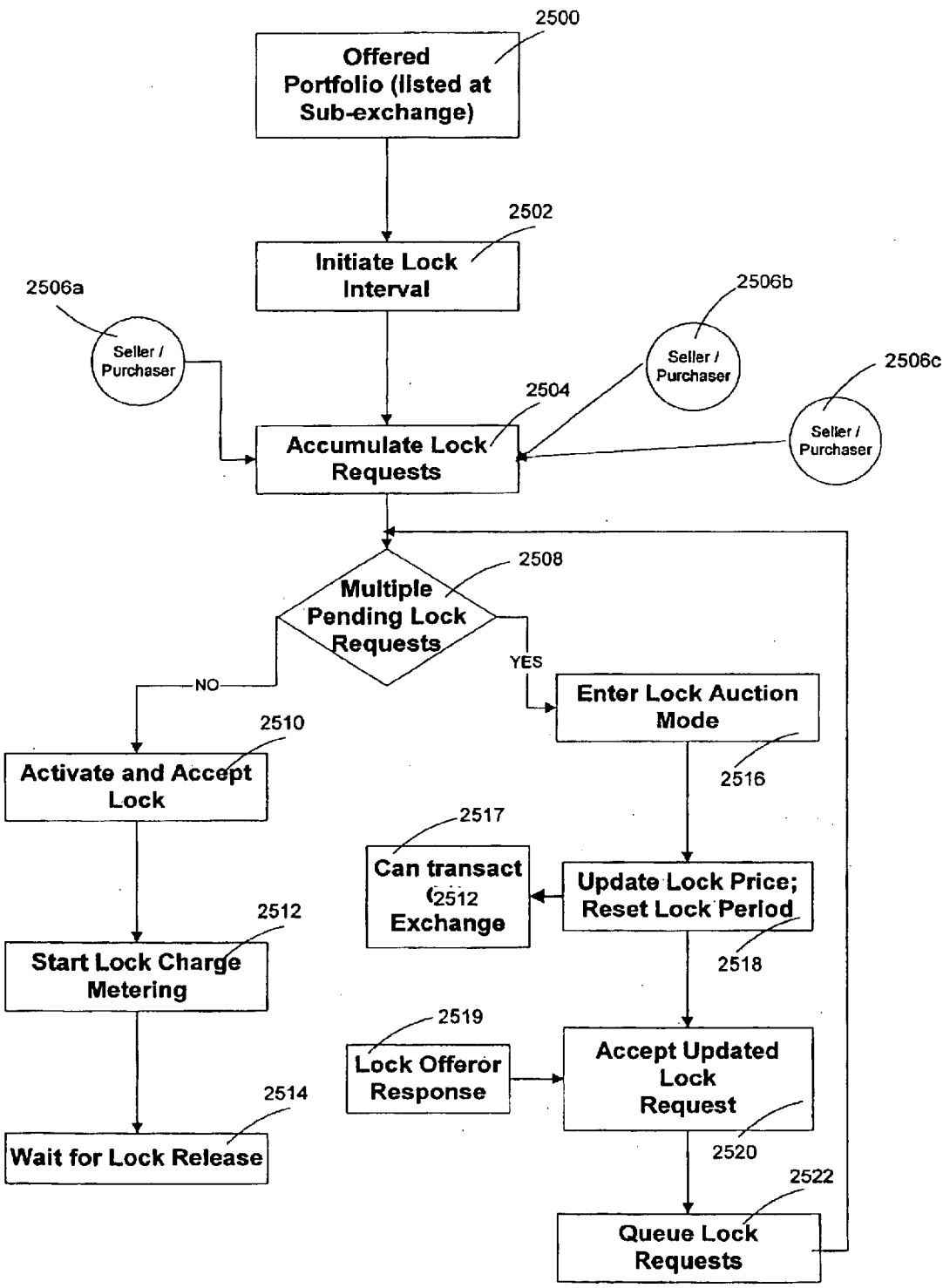
FIG. 25 illustrates a process of ranking multiple competitive lock bids and associated fees for the listed portfolio locking process of FIG. 24.

Situations may arise where multiple parties bid for the same right to lock an object or service on the exchange and so the invention incorporates a multiple lock resolution mechanism. With reference to FIG. 25, an offered portfolio 2500 listed for auction initiates a lock interval 2502 which determines the length of time that bidding for the right to use a particular lock on the portfolio for sale will last (the typical range is from 10 minutes to 48 hours). While an item is locked, the sub-exchange will queue and hold additional bid requests off the electronic auction floor. At the expiration of a lock wait period (defined by a discrete time period where lock bids are accumulated), if no locks are received, the exchange will transfer pending bids to an auction pool. In an open auction, the offered portfolio is fully visible to all the queues and electronic pools. In a closed auction, only the offeror has full auction visibility. When lock request bidding is activated, multiple potential lock subscribers 2506 actively bid on the ability to lock in either the open or silent auction formats as previously discussed and the bids are accumulated 2504. If multiple lock bids are not present 2508, the single lock request is activated and accepted 2510 by the exchange manager. The activation of the lock starts lock charge metering 2512 which accumulates (linearly or non-linearly) depending on the duration of the lock. The single lock subscriber may then submit purchase offer bids 2514 to the seller of the object or services.

If multiple lock bids 2508 are present, the lock auction mode is entered 2516 which consists of an auction for the right to hold a particular lock. As potential lock purchasers 2506 competitively bid for the lock, the lock price is updated and the lock auction period (duration) may be reset 2518. Lock periods are flexible to ensure that advantage of market volatility is not lost to portfolio offerors by allowing indefinite period locks held by some participants. The lock auction mode requires either the exchange or the offeror 2517 to update the price and time window associated with the lock for the next round. Alternatively, the subscriber offers another (higher) price 2519. Once the lock price and time window. are updated, it is offered for auction to a lock subscriber. The exchange then accepts the updated lock request 2520. If the initial lock subscriber is unable to finalize a transaction for the offered portfolio 2500, the exchange may grant the right to lock to the next highest bidder in the queued lock requests 2522 or it may resubmit the lock for auction among the multiple bidders or trigger the process in FIG. 26 described below.

Figure 26:
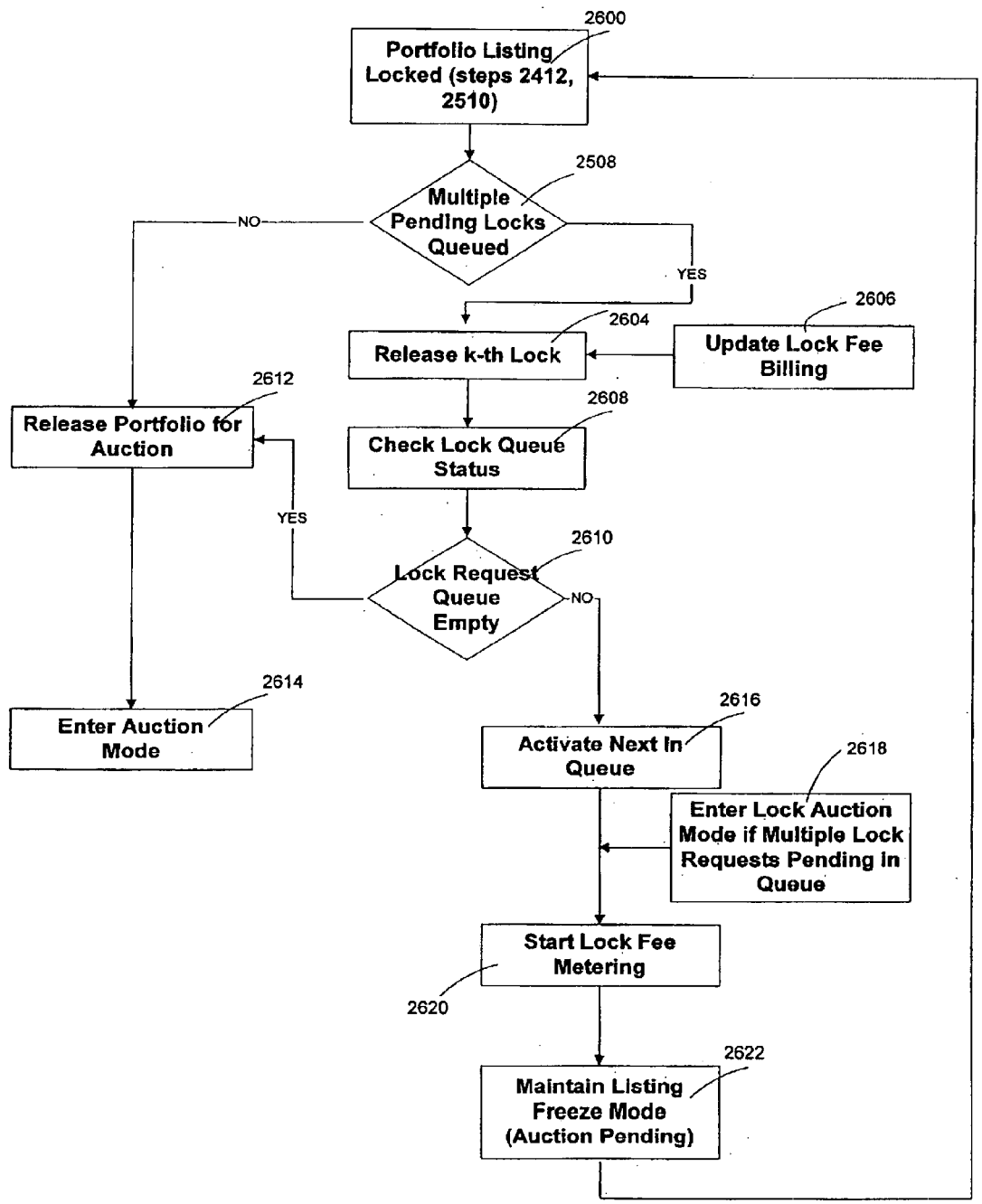
FIG. 26 further illustrates the process of ranking multiple competitive lock bids and the associated fees for the listed portfolio locking process of FIG. 25.

FIG. 26 details the asynchronous process whereby locks are released and re-granted in a pending secondary portfolio auction. When a portfolio has been locked 2600 and the lock is released or it is about to expire, the exchange manager determines whether there were multiple pending locks queued 2508 prior to the current lock. The process of how multiple locks are dealt with was discussed in FIG. 25. While the lock remains active, the exchange manager continually computes the amount of time the lock has been held and the costs associated with holding the lock 2604 and if either the time expires or the revenues are removed, resulting in the lock being released 2604, a command is sent to release the lock. Optionally, a party selling a lock on a listing may sell tiered locks that are automatically triggered by senior parties releasing their locks. Once released, the exchange manager checks the lock queue 2608 status to determine if there are any potential lock subscribers waiting for an opportunity to lock the underlying object or service. If the lock request queue 2610 is empty, the portfolio is released for auction 2612 and the auction mode 2614 is entered for the underlying object or service. If there is at least one lock request in the lock queue, the next ranked lock request in the queue will be activated 2616. Optionally, the portfolio offeror may allow for the lock to enter a lock auction mode if multiple lock requests are pending in the queue 2618. When a lock is given to a lock subscriber, the metering of the lock fee begins 2620. The activation of the lock also maintains a freeze mode for the listing 2622 while the auction is pending, preventing other participants from placing bids.

Figure 27:
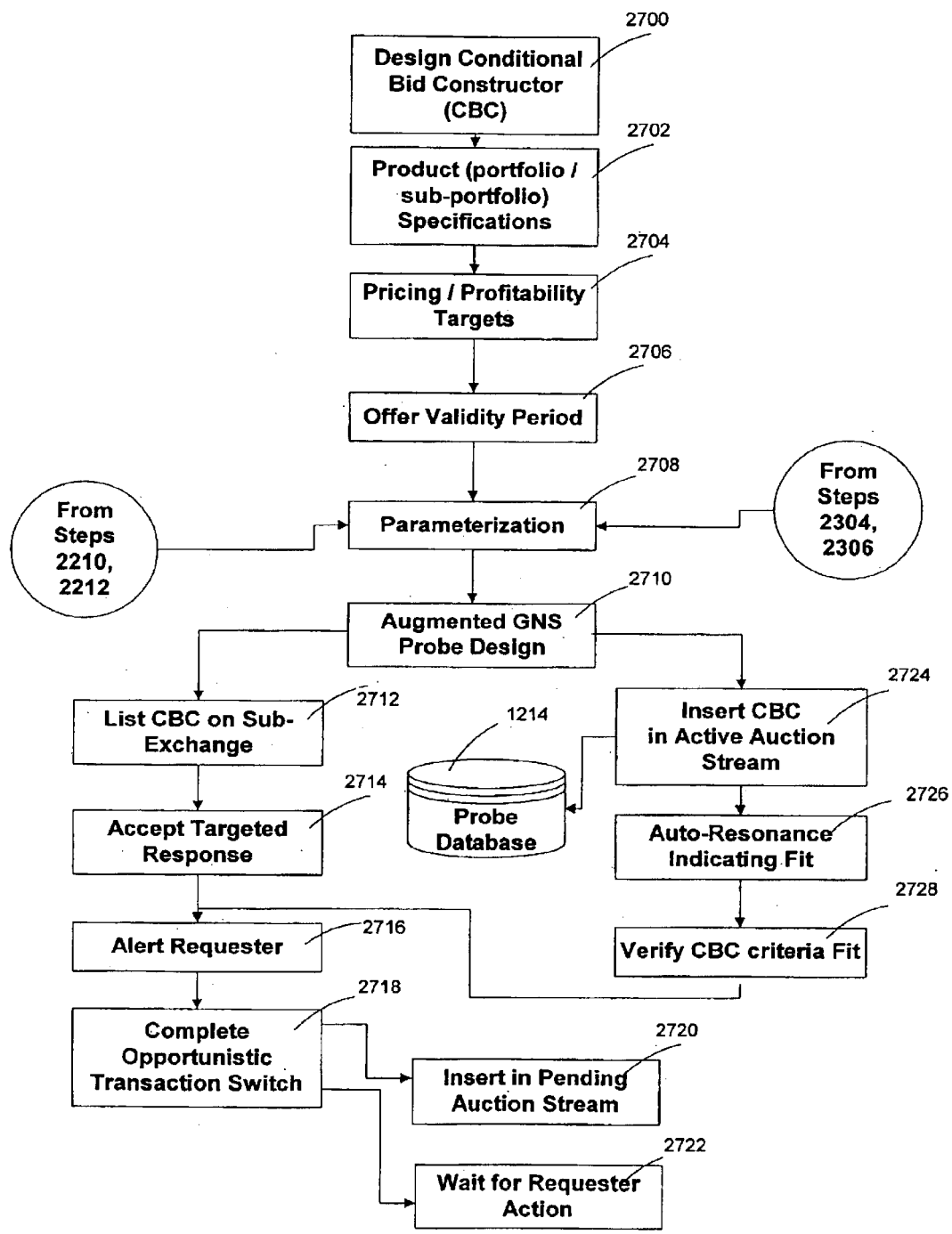
FIG. 27 illustrates a process by which potential purchasers or sellers of services place conditional bids for products or services for which there are no currently existing underlying pending transaction opportunities on the secondary market exchange of FIG. 8.

The high level of exchange automation allows potential purchasers (or sellers of services) to place conditional bids for products or services for which there are no currently existing underlying pending transaction opportunities. FIG. 27 illustrates an exemplary flow diagram for implementing this feature. The bid offeror begins the process by entering the product or service desired into the design conditional bid constructor ("CBC") 2700 template offered by the exchange. Not only may an offeror, offer to buy an object or service which falls within its product specifications 2702, it may also offer to sell an object or service if a need or request for such object or services arises. The exchange provides a unique capability to seek out opportunity targets within potentially pre-specified profitability profiles 2704. The exchange with its sophisticated embedded portfolio valuation and profitability analysis capabilities can implement this as background computational transaction streams. The bid offeror must also specify an offer validity period 2706 for which the offered bid is to remain active. Once all of the necessary information is received from the bid offeror, said information is parameterized 2708. Steps used to implement this parameterization are given by 2202–2210 (See FIG. 22). The parameterized information is next transformed into an augmented GNS (AGNS) probe design (using steps 2304–2308, see FIG. 23). The AGNS is then inserted into various active auction streams. Depending on the sub-exchange impacted or under consideration, a record (one for each probe) is stored in the active probe-set database associated with the relevant sub-exchange. (See the discussion associated with sub- exchange internals given by 1214 in FIG. 12).

The CBC can be inserted into an active auction stream whereupon if auto-resonance suggesting a fit 2726 (meaning a suitable match is found for the pre-specified product specifications) is detected and verified 2726, the exchange alert requester 2716 alerts the bid offeror of the auction matching the desired criteria. See FIG. 23 for details concerning the match criteria.

Alternatively, the CBC 2700 may be listed on a particular sub-exchange 2712 permitting it to accept targeted responses 2714 from other sub-exchange subscribers for transactions not yet actually posted on that sub-exchange. Similar to insertion into an active auction stream 2724 router, an alert requester alert 2716 is sent to the bid offeror notifying it of an exchange member (participant) with capabilities or needs matching the desired criteria. The alert request may then allow for the parties to communicate and finalize a transaction through an encrypted channel. Once an opportunity is detected and a match made between a set of service offerors and a service requestor or a potential service user, the sub-exchange informs the parties. If no explicit subscription to opportunistic services is employed, the sub-exchange still applies the applicable computations, but it does not alert the potential beneficiaries. If a subscription request exists, the CBC may either be inserted into a pending auction stream 2720 or the CBC may wait for requestor action 2722.

Figure 28:
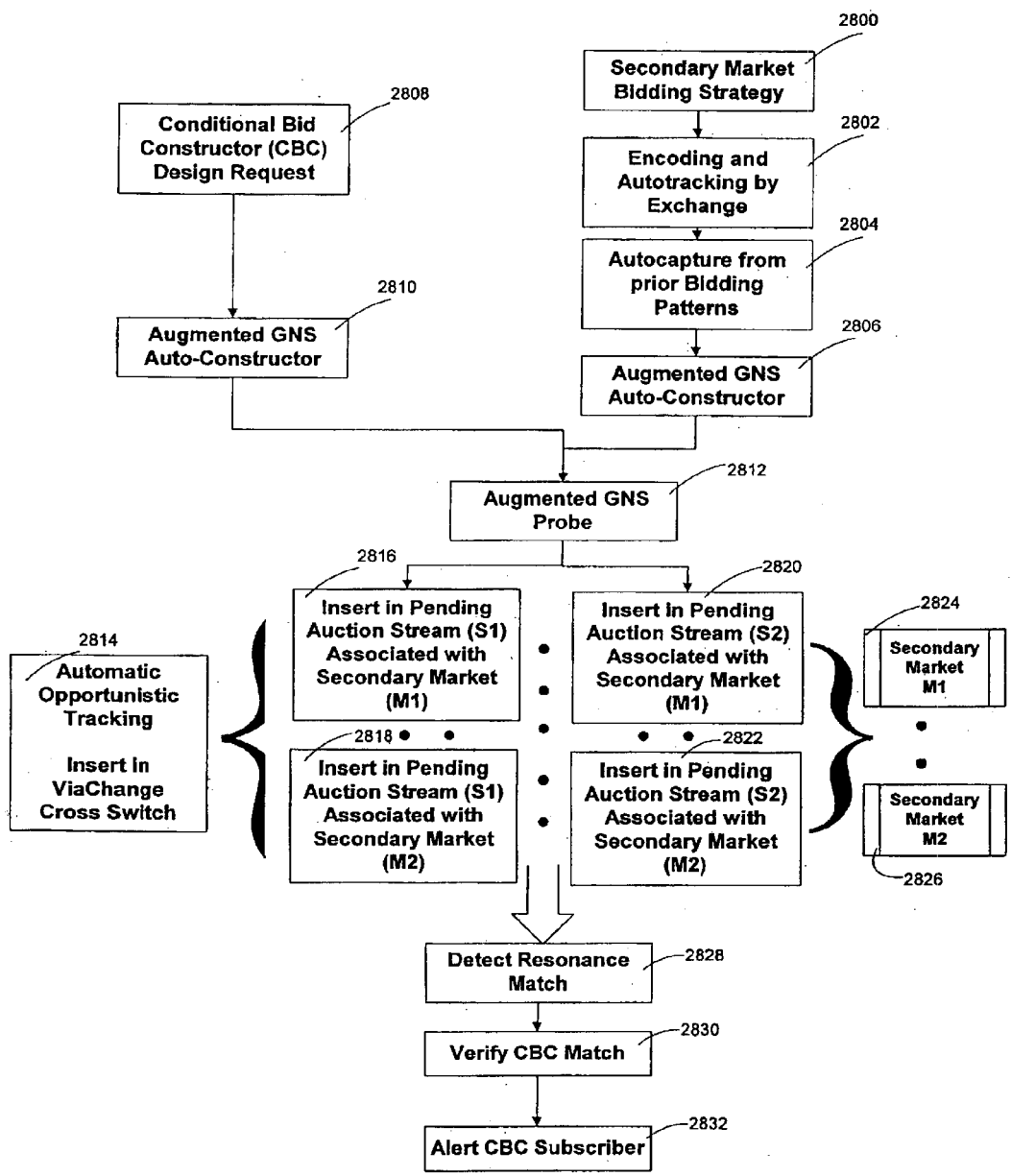
FIG. 28 illustrates a process for injecting the conditional bid constructors of FIG. 27 into pending auction streams.

FIG. 28 presents a broad transactional generalization to the process discussed in the context of a single secondary market in FIG. 27 to multiple secondary markets. The cross-market opportunistic auction mechanism implemented by the ViaChange™ switch permits hopping and cross-movement between different secondary markets if requested by the exchange subscribers. The exchange analyzes the transactional traffic and opportunities in multiple linked secondary markets, while maintaining an elaborate pool of opportunities and opportunities probes. When suitable opportunities are recognized by the exchange, the participating entities are inserted in the appropriate streams. The specific nonlinear mathematical constructs used to implement this feature have been discussed in the connection with FIGS. 15, 16, 21, 22, 23, 24 and 27. Conventionally, opportunistic components have been implemented in very limited contexts of electronic trading, futures and commodities exchange using simple relational database logic or simple conditional logic (based on boolean algebra) and graph-theoretic models. Emphasis within conventional methods has been more on information management aspects of the transactions as opposed to the invention where actual intelligent computation of dynamically tracking opportunity across products and services in multiple secondary offerings and across markets is provided.

Once the exchange subscriber has explicitly requested an alert service and designed a CBC 2808 (using method discussed in FIG. 27), which is then loaded into an AGNS probe template 2812 using AGNS constructor logic 2810, the probe is inserted in the appropriate auto-probes database component of the sub-exchange shown in 1218 (See FIG. 12). Independently, the markets represent a contiuum of transactional states and streams as embodied by 2814, 2816–2822, 2824–2826. The AGNS probes are appropriately inserted in all active market streams generally identified above. Also, as discussed in relation to FIG. 23, the AGNS match detector is always active to facilitate spontaneous recognition of opportunities using the method detailed in FIG. 23. Once correct matches are made, the affected participants are electronically alerted using steps 2830 and 2832. The alert may be implemented using conventional means such as email, paging, phone, written confirmation, etc.

Figure 29:
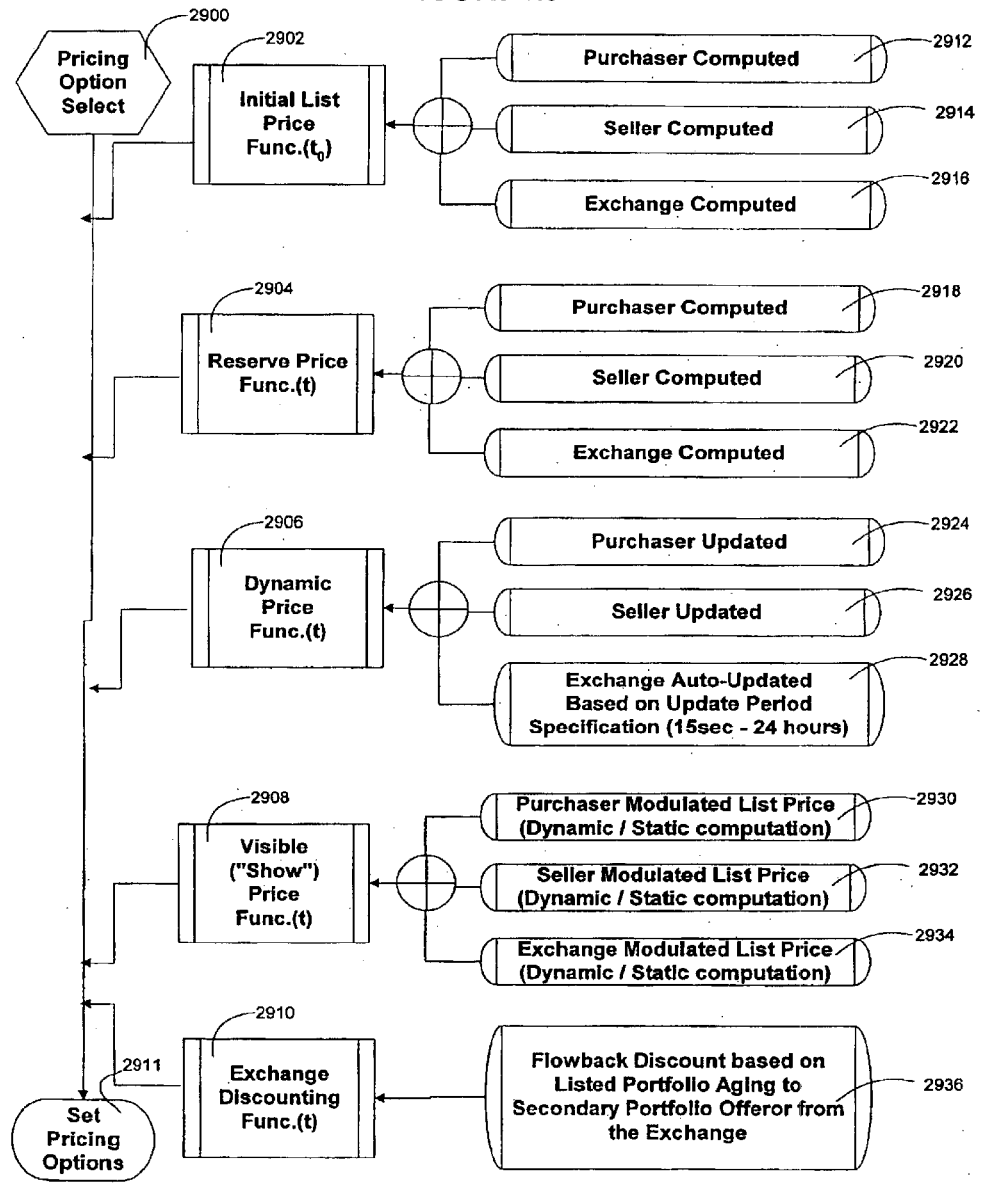
FIG. 29 illustrates a various pricing functions and their source for use on the secondary market exchange of FIG. 8.

FIG. 29 illustrates the pricing flow diagram of the preferred embodiment. Both sellers of portfolios and potential portfolio purchasers (offerors) have the option of using a pricing service 2900 offered by the pricing and valuation sub-exchange $PV^X$ or by an outside vendor in determining the value of an object or service to be listed on the exchange. The initial list price 2902 may be purchaser computed 2912 in the case of a portfolio offeror, it may be computed by the seller 2914 of a portfolio, or the exchange may compute 2916 the initial list price of the object or service on the exchange. Similarly, the reserve price 2904 may be purchaser computed 2918, seller computed 2920 or exchange computed 2922.

The dynamic price 2906 for the pricing option select 2900 may be periodically updated by the purchaser 2924, the seller 2926, or the auto-update feature 2928 of the exchange may be employed. The exchange auto-update feature periodically updates the price of the underlying object or service depending on the interval chosen by the listing entity. Situations may arise where the listing entity does not list the price received from a pricing service but rather lists a modulated version visible to auction participants. The exchange permits visible price to be an analytical function of the purchaser's modulated dynamic list price 2930, the seller's modulated dynamic list price 2932 or the exchange's modulated dynamic list price 2934. In addition, the exchange discounting model 2910 (to be described below) is a function of the flowback discount based on listed portfolio aging to secondary portfolio offeror from the exchange 2936.

Another feature of the exemplary embodiment provides a time-value for the $SA^X$ sub-exchange auction listing services. $SA^X$ sub-exchange subscribers may either pay a flat commission as a percentage of the transaction value to list a portfolio or request, or the subscriber may be charged fees using an aging based commission, whereby the $SA^X$ sub-exchange subscriber pays no commission if no bid or lock is received within a number of days denoted by "X" (say 30 days). All commissions are waived after that period. Conversely, commission is higher if the bid/lock is received on the first days. The formula used to calculate the aging discounted commission then is:

$$\begin{cases} 0 \\ BP + LC * \left(\dfrac{x-k}{x}\right) \\ BP + BC * \left(\dfrac{y-k}{y}\right) \end{cases}$$

no bids or lock received for x days
lock received on the $k^{th}$ days, when lock recived first
bid received on the $j^{th}$ day, when bid received first
where BP is a preset base commission amount, LC is an increment for locking premium and BC is the commission premium for receiving early bids. Typically, BC>LC>BP, and x is an exchange specified number of days. This formula implies uniform reduction in commission over time. Accelerated, exponentially or sub-exponentially weighted discounting may be used as well to implement the step 2936. A key component for aging-based commission discounting model suggests that portfolio offers show initial terms within broad limits derived and provided by the exchange. In other words, the exchange can put restrictions on listings that prevent a subscriber from ridiculously setting prices or terms and thereafter accepting responses. It is recognized that any discounting model may be employed in conjunction with a listing on an exchange. Commissions can be altered so as to vary non-linearly and can increase or decrease over time.

Figure 30:
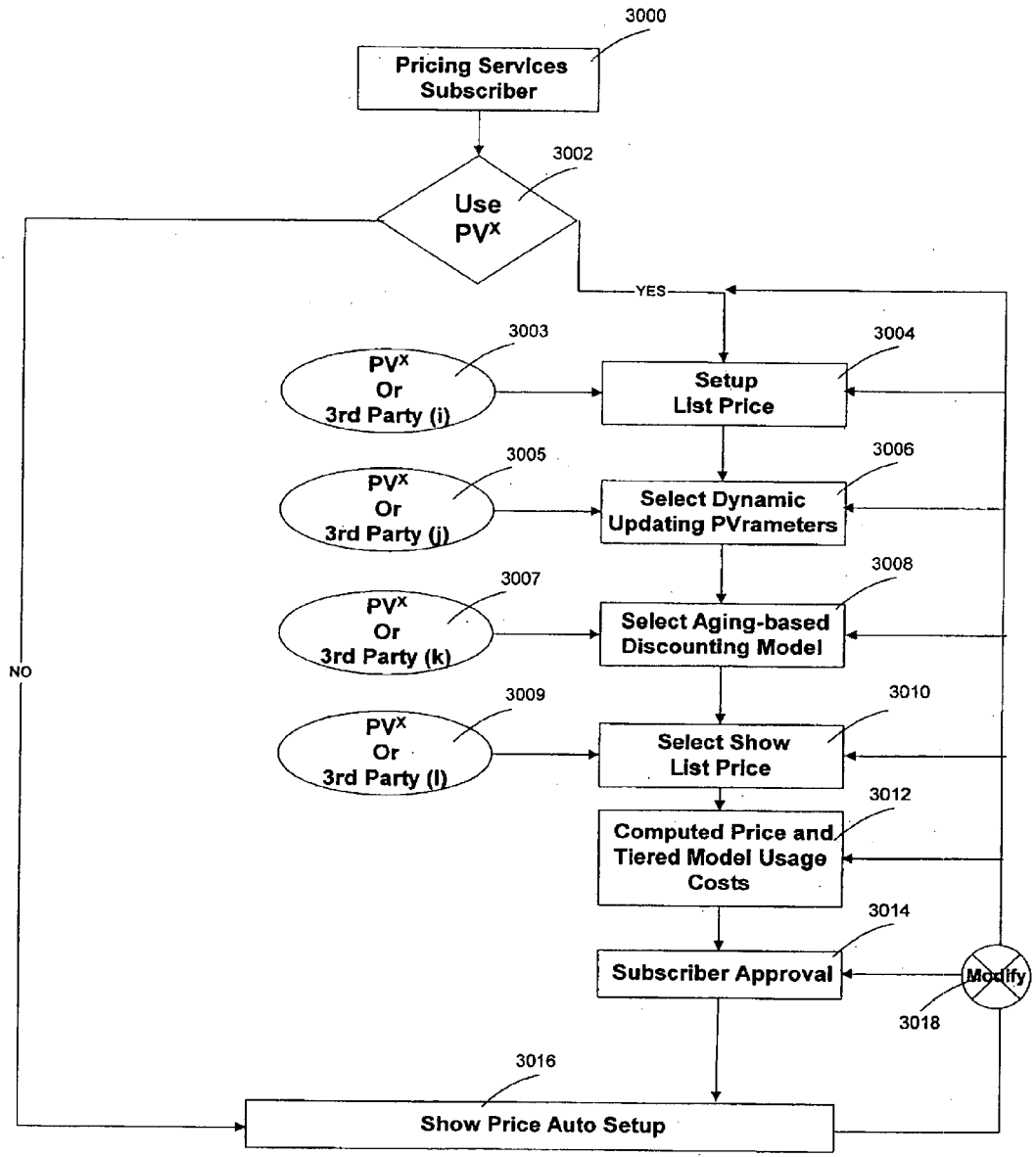
FIG. 30 illustrates an exemplary flow chart for determining the costs associated with listing an object or an offer to buy an object on the secondary market exchange of FIG. 8.

The exchange payback model is detailed with reference to FIG. 30. A pricing services subscriber 3000, which could be a potential purchaser of a portfolio, a seller of a portfolio uses the secondary portfolio pricing auction sub-exchange 3003. A subscriber communicates a setup list price 3004 for the portfolio to the exchange that can be either be determined (1) by the subscriber; (2) by the pricing and valuation services exchange; or (3) by a third party 3003. Next, the dynamic updating parameters 3006 that determine the frequency at which a portfolio price is updated and the number of variables used is submitted to the exchange. The dynamic updating parameters may also be provided: (1) by the subscriber; (2) by the pricing and valuation sub-exchange; or (3) by a third party 3005. The pricing services subscriber has the option to choose from a library of aging-based discount models 3008 (to be discussed below) which may be provided (1) by the subscriber; (2) the pricing and valuation services sub-exchange; or (3) by a third party 3007. The subscriber next submits the method by which the list price is selected 3010 to the exchange and similar to the above enumerated features of the exchange, the list price may be determined (1) by the subscriber; (2) by the pricing and valuation services sub-exchange; or (3) by a third party 3009. The exchange then computes an estimate for the price for all of the above modeling costs 3012 which is then subject to subscriber approval 3014. If the subscriber does not approve of the cost, it can go back to any of the above listed steps and enter new modeling information. If the subscriber approves the price, the auto setup price is displayed 3016. The actual price as listed on the exchange ("show price") and visible to all the auction participants may by arbitrarily modulated by the sub-exchange subscriber, wherein it uses the exchanges computations as mere advisory or calibration guidelines.

Figure 31:
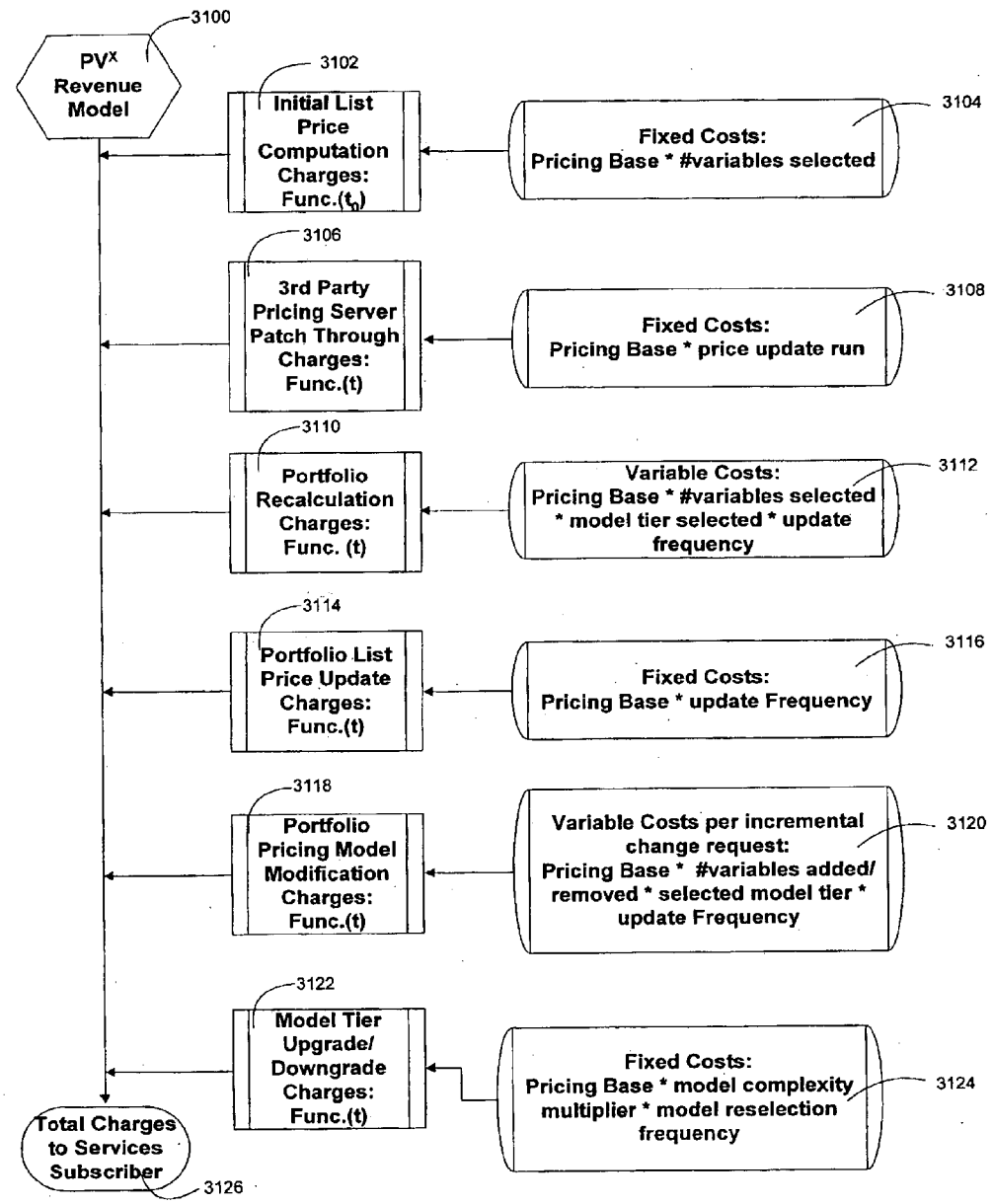
FIG. 31 illustrates the basis for various fees that may be charged by the secondary market exchange of FIG. 8.

The exchange may generate revenue in any combination of manners listed in FIG. 31. Alternatively, the exchange may not charge for one or any of these services. All pricing computations refer to a pricing base which may be one of the following: (i) zero, (ii) a constant amount, (iii) based on a percentage of portfolio listed, (iv) linked to other external variables, or (v) based on a weighted piece-wise discontinuous pricing schedule (e.g., like a tax table). The exchange revenue model 3100 is based on charging fees for the use of the various exchange features. The "initial list" computation charges 3102 may be a function of the initial pricing base for the object or service and the number of variables selected to reach that pricing base 3104. The exchange charges fees to third parties for patching their pricing services 3106 which would be a function of the pricing base and the price update run 3108. The price update run pertains to the frequency or some multiple of frequency at which the sub-exchanges subscriber uses an external third party pricing calculation that is dynamically offered on the exchange. In other words, external vendors may make their proprietary models available at the $PV^X$ sub-exchange. Every time an auction uses or accesses an external model to update the price or a purchase offer, the sub-exchange may charge an associated fee. Such fees are in addition to any amount that portfolio offerors and bidders are paying to third parties for use of modeling services. If at any time an exchange participant requires a recalculation of the portfolio charges 3100, the exchange may charge a fee based on (1) the pricing base; (2) the variables selected; (3) the complexity or tier of the selected model; and/or (4) the update frequency 3112. A fee may be assessed for updating the portfolio list price 3114 based on the pricing base and the frequency at which the price is to be updated 3116. Portfolio pricing model modifications 3118 may also be charged variable costs per the incremental change requests based on (1) the pricing base; (2) the number of variables added or removed; (3) the selected model tier; and/or (4) the update frequency 3120. Finally, parties may also wish to upgrade or downgrade the sophistication of the models used and as such, they may be charged a associated fee for any restructuring of the pricing models, and so the portfolio listers may be charged a fee for (1) upgrading or downgrading their model tiers 3122 based on the pricing base and (2) the multiplier update frequency 3124 where the multiplier pertains to a constant increment to the price charge for to all the update and recalculation charges when using a different tier for the same "x" variable model configuration. Once all of the desired services and features are selected, the total charges to the services subscriber 3126 can be determined.

Computationally-induced stratification secondary portfolio valuation and pricing is a major component of the exemplary embodiment. The underlying business model of the invention as embodied by the opportunistic auction switch and auction stream cross-over, heavily leverages complexity and stochasticity in the sensitivity of time-dependent coupling between secondary markets, external variables to differentially price and value portfolio. The computation is made visible to the subscribers for a premium and non-disclosure commitment. Models may or may not be sold by the exchange. Similarly, right to in-house use may or may not be granted by the exchange. Thus, the trading mechanism relies not upon knowing how the computations are actually computed, but instead on which agent is using a certain model at an unknown time.

Selective use of different pricing and valuation models will lead to a different price and profitability profile for the same portfolio. Thus, different trading entities and participants at the exchange, using (differentially-priced) different pricing models can arrive at differing conclusions regarding an identical portfolio.

Figure 32:
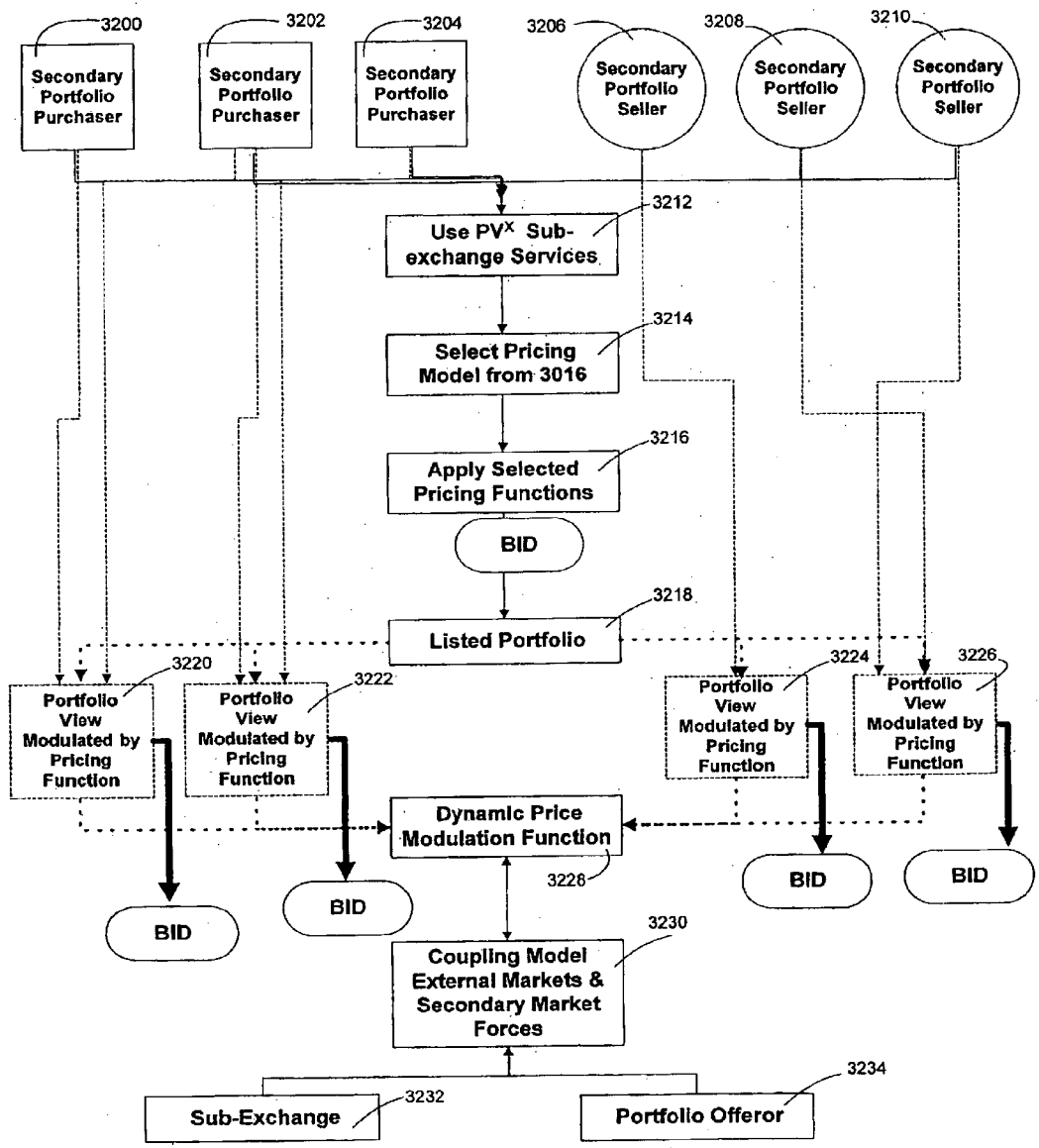
FIG. 32 illustrates a computationally stratified pricing diagram of the secondary market exchange of FIG. 8.

FIG. 32 is illustrative of the computationally stratified pricing flow diagram of the preferred embodiment. A series of secondary portfolio purchasers 3200, 3202, 3204 and a series of secondary portfolio sellers 3206, 3208, 3210 have the option of utilizing pricing services offered by the exchange or they may use pricing services offered by a third party on the pricing and valuation sub-exchange 3212. The pricing model selected 3214 by the lister and the selected pricing functions applied 3216 to the portfolio all affect the listed portfolio 3218. For example, the listed portfolio 3218, offered by the secondary purchaser on the exchange 3232, may be listed based on one set of pricing decisions 3220. On the other hand, sellers 3206 and 3208, by virtue of using different models and strategies may see the portfolio differently, 3224, 3226 respectively. So the same physical entity (offered portfolio for sale or purchase) takes on a different financial view depending on the underlying models. When considered in conjunction with the auto-bid splitting and auto bid pooling mechanisms discussed earlier, the likelihood of differing physical views of the portfolio increase.

In the context of the exchange and the intrinsic complexity of the secondary object itself, the visible or "show price" is further modulated by time-dependent automatic coupling between secondary objects and external forces. The exchange 3232 and the portfolio offeror 3234 are inextricably coupled to external markets and secondary markets 3230 which in turn are bilaterally linked to the dynamic price modulation function 3228 which affect the portfolio views. In the actual bidding process, for both silent and open auctions, it is difficult to isolate the driving forces behind bid and offer prices.

Another feature of the invention allows the exchange to internally store applicable transaction tracing information. The traceability footprint can be made available to the auction participants, at the auction initiator's request and approval.

Another key feature of the preferred embodiment is a variable time dependent commission system (discounting model) for secondary market objects and services placed on the secondary market exchange. This was briefly discussed in relationship to FIG. 29. The discount model and its differentiation from current person-to-person e-commerce business models is an important component in the invention's secondary revenue models provided by locking, lock auctions, etc. An additional e-commerce innovation provided by the invention is apportionment mechanisms that allocate revenue between the exchange, sub-exchanges and service offerors and exchange subscribers. This allocation provides for development of downstream derivative products and instruments directly off the ViaChange™ switch transactional state. For example, the exchange manager may (linearly or non-linearly) adjust the commission rate as time passes which in turn may lower the selling price resulting in quicker transactions. The seller may make the commission component of the offered secondary object visible to buyers which may in turn take that information into account in their personalized buying models. Optionally, the exchange manager may reduce the commission rate to zero depending on the advancement of time and other variables such as customer status etc. Again, $SA^X$ sub-exchange subscribers are offered two pricing choices: (1) flat trading/auction/secondary portfolio sales commission as a percentage of the transaction value; and (2) aging based commission, whereby the $SA^X$ sub-exchange subscriber pays no commission if no bid or lock is received within a number of days denoted by "X" (say 15, 30, or 60 days). All sales-related commissions are waived after that period. The subscribers and offerors are still charged a fee for the use of exchange services. Conversely, the commission level is greater if the bid/lock is received on the first days. The formula used to calculate the aging discounted commission then is $$\begin{cases} 0 \\ BP + LC * \left( \frac{x-k}{x} \right) \\ BP + BC * \left( \frac{y-k}{y} \right) \end{cases}$$

no bids or lock received for x days lock received on the $k^{th}$ days, when lock received first bid received on the $j^{th}$ day, when bid received first where BP is a preset base commission amount, LC is an increment for locking premium and BC is the commission premium for receiving early bids. Typically, BC>LC>BP, and x is an exchange specified number of days ranging from 0 to a period negotiated between portfolio offeror and SAX sub-exchange. This formula implies uniform reduction in commission over time. Accelerated, exponentially or sub-exponentially weighted discounting may be used as well. A key criteria for aging-based commission discounting model implies that portfolio offers shows initial terms within broad limits derived and provided by the exchange. In other words, a subscriber cannot ridiculously price or set terms and accept a serious response or any response.

The exchange manager may employ rational calculation models to limit portfolio pricing within certain parameters. Such a calculation model can insure that a seller wishing to avoid paying commission on an object such as a mortgage bundle does not intentionally overprice the portfolio so as to make it initially unattractive to buyers.

Figure 33:
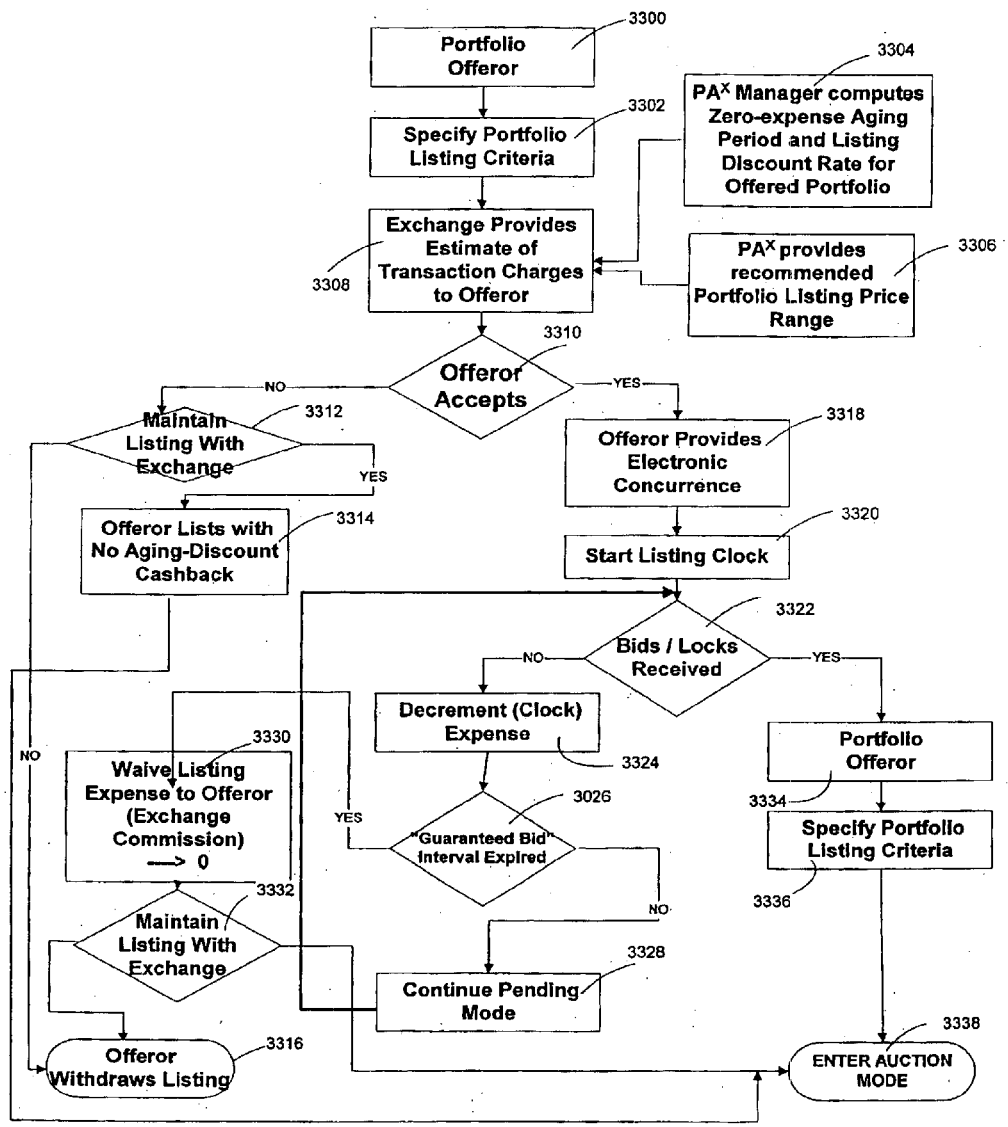
FIG. 33 illustrates a commission discounting model employed by the secondary market exchange of FIG. 8.

The process by which the exchange's discounting models are triggered is seen in FIG. 33. A portfolio offeror 3300 listing a portfolio on the exchange specifies the portfolio listing criteria 3302. From this criteria, the exchange provides the offeror an estimate of the transaction charges 3308 associated with listing the portfolio. This estimate is a function of the exchange manager's computation of the zero-expense aging period and the listing discount rate for the offered portfolio 3304 and the exchange provided recommended portfolio listing price range 3306. The exchange manager utilizes the price interval restriction to prevent offerors from listing their portfolios at prices outside the interval to circumvent the need for paying full listing commission.

If the exchange provided cost estimate to the offeror is rejected by the offeror 3310, the transaction can then be terminated if desired, or the portfolio listing can be maintained 3312 on the exchange without the discounting model 3314 (the offeror must then pay the full listing costs and the full commission when a transaction is completed). If the exchange provided cost estimate is acceptable to the offeror and projected listing price falls within the price interval, the offeror provides electronic concurrence 3318 which starts the listing clock 3320 (which is the basis for the discounting model calculations).

When portfolios are listed on the exchange, associated listing commissions will become fixed once a bid is received or the portfolios are locked 3322. At this point, the listing commission for the time period for which a specific portfolio was listed is calculated, the updated offeror expenses are billed to the offeror 3334 and the portfolio with its specific portfolio listing criteria 3336 enters traditional auction mode 3338. The commission preferably ceases when a bid is received rather than when a transaction is completed because of the uncertainty of transaction completion and the length of time needed to finalize the specifics of the transaction. Optionally, the commission discounting model can be tied to either the amount of time a portfolio is listed before receiving a bid and/or the amount of time required to complete a transaction.

If a listed portfolio 3300 is not receiving any bids or locks, the commission discounting model may decrement listing expenses 3324 (commission can also increase or vary non-linearly) to zero when a guaranteed bid interval expires 3026. If the guaranteed bid interval has yet to expire, the pending mode continues 3238 and the exchange manager waits for any bids or locks. When the guaranteed list bid interval expires, listing commissions in the preferred embodiment are zero 3330. Although the exchange will not generate any commission revenue, the portfolio continues to be listed 3332 and can receive bids. A portfolio which has been listed for a period longer than the guaranteed bid interval is removed from the auction either by the offeror withdrawing the listing 3316 or by the completion of a commission free transaction 3338.

Another feature of the exemplary embodiment as described above allows the exchange to offer modeling services to potential buyers and sellers of secondary market objects. Buyers or sellers without personalized external modeling capabilities may employ models offered by the exchange manager to complete their transactions. Modeling service purchasers may select from individual variables and or individual models upon which to price the object for sale and to complete the transactions necessary to effect a transfer of a secondary object. The exchange may further permit outside parties to offer their own modeling services on the exchange for a fee.

Optionally, the exchange manager may further tailor the modeling services to permit modeling purchasers to suppress a certain service for a specific object listed on the exchange. Lock suppression may even be extended to such a high level where no other party is able to use a modeling service for a specific secondary market object. One motivation for a suppression purchaser to buy such services is that they do not believe that the competing purchasers will be able to determine an accurate price using their own models.

Figure 34:
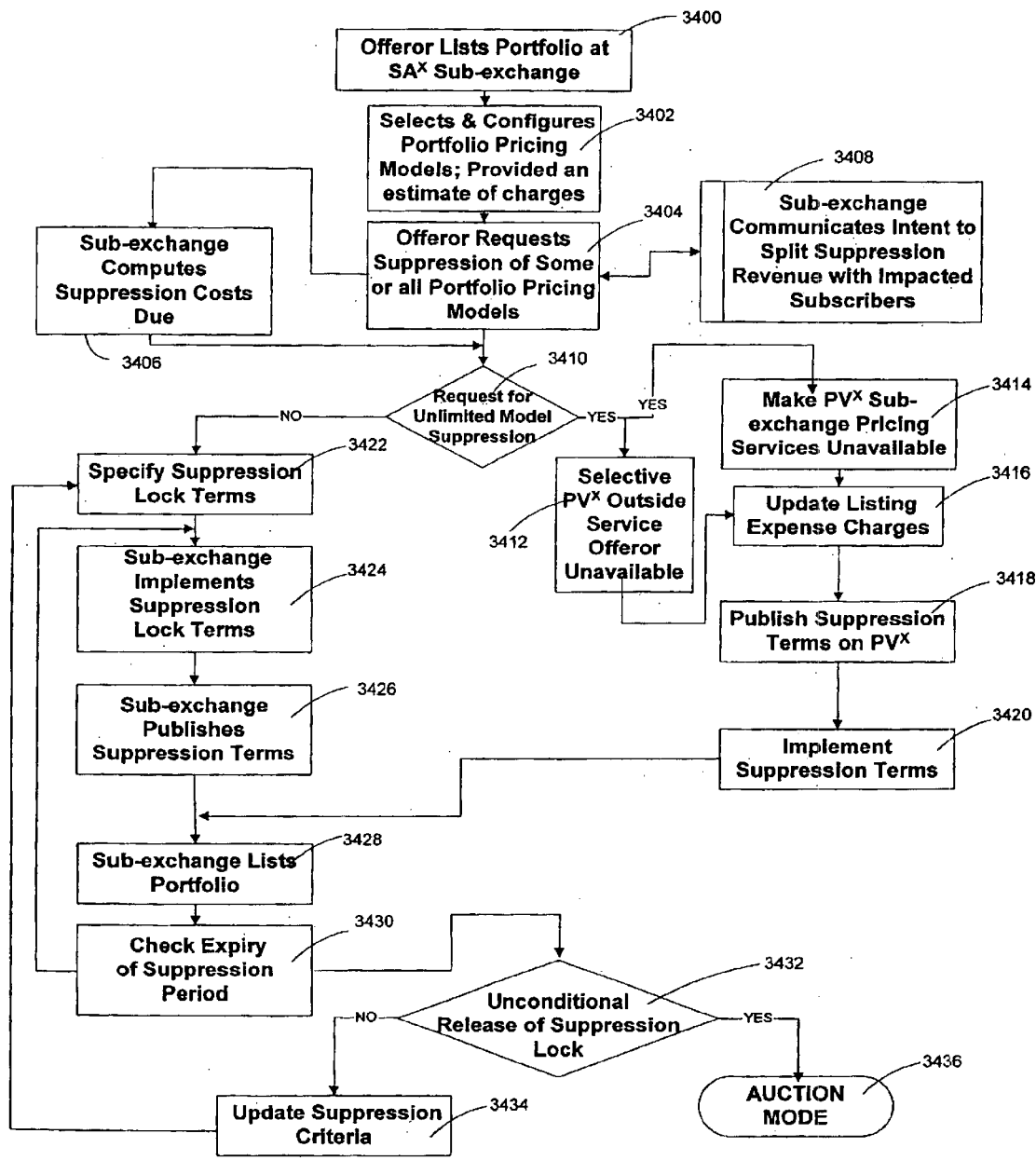
FIG. 34 illustrates a process permitting exchange participants to selectively suppress modeling services relating to objects on the secondary market exchange of FIG. 8.

Suppression of any or all service offerings is a feature of the exchange. The exchange also offers any exchange participant the ability to lock or suppress the use of any of the stratification models whether they come from the exchange library or from an outside vendor. This suppression is completely flexible and customizable and (1) it can extend to the use of all stratification variables; (2) it can suppress the use of a particular vendor or the exchange; or (3) it can suppress individual variables from all or a partial list of vendors. FIG. 34 demonstrates a sample flow diagram for the method of selectively suppressing stratification services on the exchange. Initially, an offeror lists a portfolio on the secondary portfolio auction sub-exchange 3400. The pricing visible to the potential purchasers and the updating frequency of the dynamic price are then selected. After the specifics of the portfolio are listed on the exchange, an exchange participant which may include the offeror can request the exchange to suppress pricing (also known as a lock) and information relating to the exchange costs for suppression will be provided 3402. The entity purchasing suppression services is known as a suppression subscriber. After being provided all pricing information relating to the locking of various services, the suppression subscriber must request suppression of specific portfolio pricing models 3404. Optionally, the exchange may communicate the intent to split suppression revenue with impacted subscribers 3408. The suppression mechanism is identical to the lock, lock arbitration, lock auction, lock release and apportionment of lock revenue mechanisms discussed in FIGS. 23, 24 and 25. The exchange then computes the suppression costs due 3406 for the specific portfolio models suppressed.

It is important to note that consummation of a sale, lock or suppression requires explicit consent from both offerors and subscribers. In other words, each is an auctionable object and the applicable auction mechanisms are used to implement them. So the response to any request is acceptance, a price/term counter offer, refusal and selective refusal with premiums associated with each. In each case, revenues are shared in a pre-determined manner between exchange and offeror.

At this point, the suppression subscriber must choose whether the lock or suppression is unlimited (until the transaction is completed) 3410. When locking is unlimited, the exchange makes pricing and valuation services sub-exchange pricing services unavailable 1314. The subscriber may instead or in addition to limiting the exchange services selectively, make pricing and valuation service exchange outside parties (third party vendors) services unavailable 3412. Acting so as to make services unavailable requires that the listing expense charges be updated 3416. Unlimited locking is a fixed state and as such, expenses to lock subscribers are immediately tabulated and updated to the lock subscriber's bill. When suppression terms are finalized, they are published on the pricing and valuation services sub-exchange 3418 and then implemented by the sub-exchange 3420 resulting in the exchange listing the portfolio 3428.

If an unlimited lock transaction is not desired by the lock subscriber, the costs associated with maintaining active lock status are variable and dependent on the amount of time suppression restrictions are active. If the unlimited option is not chosen, then specific lock terms must be determined and communicated to the exchange 3422. As stated above, the lock may suppress linking of a single variable or multiple variables to a single or multiple vendors and/or the exchange. After lock terms are designated, specific restrictions are implemented on the exchange 3424 and thereafter published on the exchange 3426 resulting in the portfolio being listed.

After the restricted portfolio is listed on the exchange, the exchange continually monitors for expiration of the suppression period 3430 whether it be voluntary or due to the expiration of the time interval. If the suppression period has not expired, suppression terms continue to be implemented 3424. If there is an unconditional release of the suppression lock 3432 (whether it be by expiration of the lock or a voluntary withdrawal) the portfolio enters auction mode 3436. If the release is only applicable to certain variables and or models, the suppression criteria 3434 is withdrawn and suppressed services will become available to other participants and changes are implemented on the exchange. Suppression subscribers may partially withdraw locks because of the increasing cost of holding a lock that is not unlimited. It is possible for specific suppression of various variables and services that would result in partial locks being returned to the participant pool while services continue to be at least partially suppressed.

Figure 35:
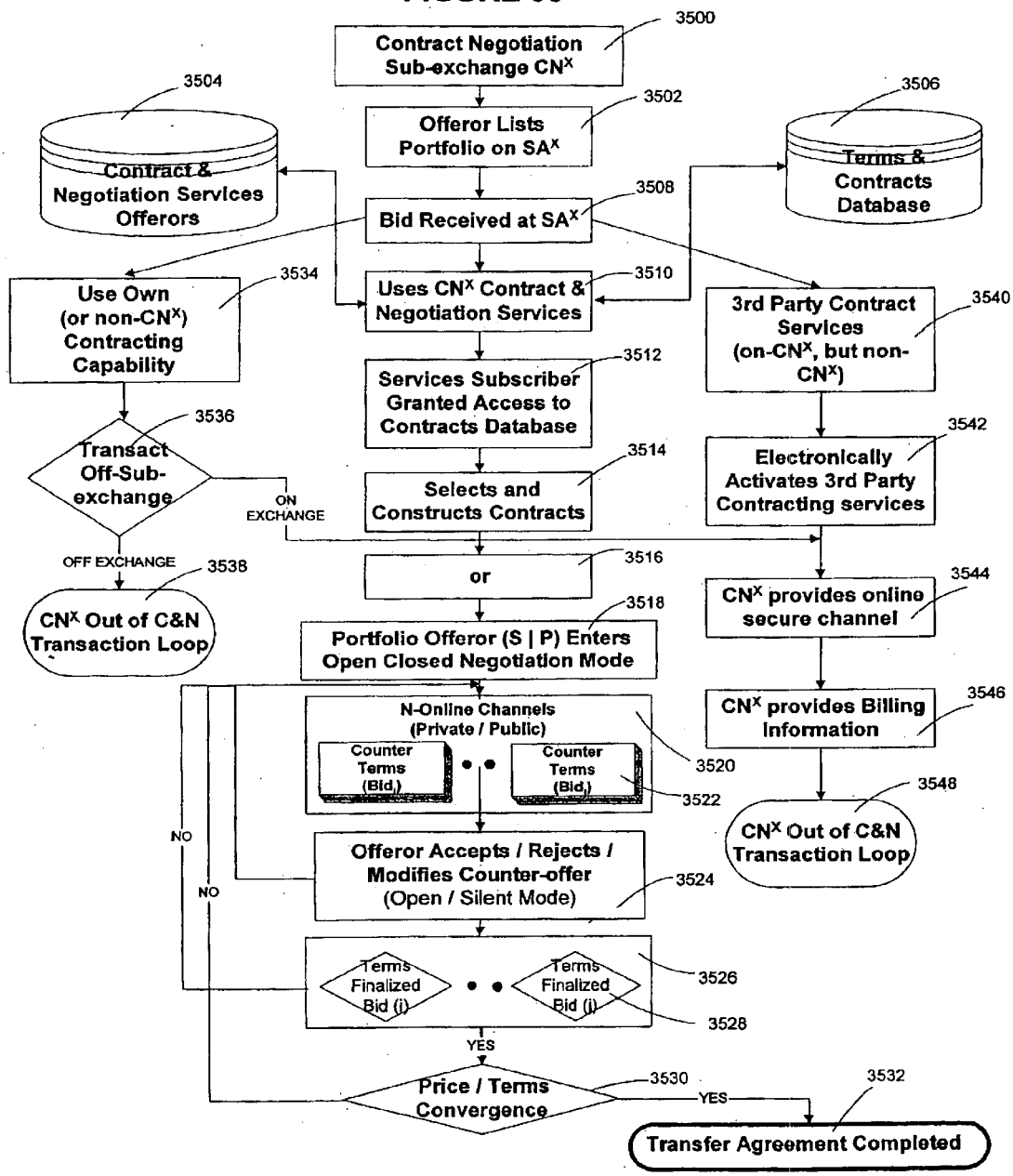
FIG. 35 details a contract negotiation service sub-exchange pictured in FIG. 10.

Another unique feature of the invention is the contract negotiation services as delineated in FIG. 35. This feature is available on the contract negotiation sub-exchange ("$CN^{X}$") 3500 from the exchange and from outside vendors for both transactions listed on the exchange and transactions occurring outside of the exchange environment. A portfolio offeror lists a portfolio on the secondary portfolio auction sub-exchange 3502 with the contract criteria provided by either the offeror, a third party contract and negotiation services offeror 3504 (which includes the sub-exchange contract and negotiation service), or the portfolio offeror constructs a contract from a terms and contracts database 3506. When the offeror's contract specifications are employed, the negotiation may take place either on or off the exchange. When negotiation is conducted off the exchange, the transaction is terminated from the exchange. When negotiation is conducted on the exchange, the exchange provides an online channel for such negotiation (see below).

Portfolios listed on the secondary portfolio auction sub-exchange 3502 receive bids on the sub-exchange 3508 and depending on the specific contract negotiation method employed, the negotiations may progress in one of three ways. First, when the portfolio offeror or potential purchaser uses its own (or from a party not listing on the contract and negotiations sub-exchange) contracting capability 2534 the transaction may be taken off the sub-exchange 3536 taking the contract and negotiations sub-exchange out of the contract and negotiations loop 3538. Alternatively, the transaction may remain on the sub-exchange with a secure online channel provided by the sub-exchange 3544.

Second, the portfolio offeror or potential purchaser may employ third party contract negotiation services from vendors both on and off the contract and negotiations sub-exchange 3540. When third party contracting services are selected, the sub-exchange sends an electronic alert to the third party allowing them to activate their contracting services 3542. The sub-exchange then provides an online secure channel 3544 for the parties to negotiate within while the sub-exchange provides billing information 3546 to the parties for use of the secure online channel. At this point, the $CN^X$ sub-exchange is out of the contract and negotiations transaction loop 3548 and further transactions between the parties are conducted off the sub-exchange.

Third, the portfolio offeror or potential purchaser may utilize contract and negotiations sub-exchange contract and negotiation services 3510 to further completion of a transaction. The services subscriber (the party purchasing the contract and negotiation services) is granted access to the contracts database 3512 and selects terms and conditions to construct a complete contract 3516. Once the proposed contract is complete, the contract terms are listed 3516 whereas the portfolio offeror enters the open closed negotiation mode 3516. N-online online channels both public and private 3520 are opened to facilitate communications between the parties. Depending on the type of transaction, the negotiations may be in either an open or silent mode. An open mode is utilized in open mortgage portfolio auctions where there are multiple potential purchasers simultaneously bidding on the portfolio and the online channels are public. The silent mode uses private online channels because there are only two parties communicating at any given time with each other.

An initially proposed set of terms are sent to the other party or parties involved in the transaction through the online channels. The party receiving the terms may accept them in whole or in part, reject them in whole or in part, or offer counter terms in whole or in part 3524, 3522. If a counter-offer is proposed or the terms are rejected the other party may either accept the counteroffer or they may make a new counter-offer. When accepted 3526, a reiterative process used to finalize the terms 3528 so that there is a convergence between the various parties' prices and/or terms 3530. If convergence is reached, then a transfer agreement can be completed, if not, the process of exchanging counter-offers is repeated. Because bids are not absolute monetary values but rather a complex set of terms and conditions tied to the monetary value, the exchange contract negotiation service will work towards a convergence for each proposed term and condition for each individual bidder and publicize the progression of such negotiations.

The coupling of various aspects of the invention is illustrated in FIG. 36. There are at least three coupled streams which have interplay with the completion of a transaction at all levels after a portfolio is offered on the exchange 3600, namely, the pricing and valuation sub-exchange 3602, the contract negotiation services sub-exchange 3604, and the profitability analysis in the pricing and valuation service sub-exchange 3606. For example, the initial terms for a portfolio contract 3610 are a function of portfolio list price 3608 and expected portfolio profitability 3612. When terms are updated or modified 3616, listing price and expected profitability will in turn be affected resulting in a reprice of the portfolio 3614 and an updated profitability estimate 3618. Negotiations pertaining to finalizing a transaction 3622 can alter the terms so as to affect all of the downstream closing prices 3626, the terms of the closing transaction and the closing profitability estimates 3630. Any alteration of the portfolio contract terms will affect the price of the offered portfolio and the profitability estimates further creating revenue generating avenues for the pricing and valuation sub-exchange through further pricing models 3620, 3624. It is only when the negotiation transaction is completed 3628 that the pricing and valuation sub-exchange no longer has the possibility of any revenue creating possibilities.

With reference to FIG. 37, the delivery and auditing sub-exchange is illustrated. Both the delivery and auditing service providers 3700 (whether it be the sub-exchange itself or a third party) and the secondary market exchange as a whole 3702 are part of the auction stream 3708 which contains the emergence of the opportunistic stream 3704 and the requested stream 3706. The transaction entry points in $DA^X$ 3708, again, akin to the ViaChange™ switch result from (1) an explicit request for service at the sub-exchange (3714); (2) a pre- or focal-attentive opportunistic services auction stream, resulting from transactions within a different sub-exchange in the same secondary market (3712); or (3) an opportunistic alert from a secondary transaction in a related but nonetheless different secondary market (3702).

The opportunistic stream is a function of previously pending CBC requests 3710 as well as current alerting 3712 associated with any new CBC alert requests 3712. The resulting commercial services opportunity for "managing tracking and verifying compliance of price, contracts and agreement" previously negotiated at $CN^X$ in FIG. 35 is identified and posted for bids shown by output of 3708. The actual mechanism for bidding and acquiring services, compliance tracking rights is highly simplified within the $DA^X$ sub-exchange. The services offeror makes a bid for service opportunity 3724, specifying his bid terms and price 3726. If the bid is accepted 3730, the $DA^X$ sub-exchange provides mechanisms for completing the transaction 3732. Alternately, the portfolio offeror 3716 specifies terms for servicing rights and tracking deliveries. The services offer may counter with its own terms 3718. Once the process converges, the bidding process is closed 3720 and $DA^X$ sub-exchange completes the transaction. In the background a exchange capture server notationally represented as 3722, 3728 is continuously capturing the bidding transactions for traceability and refinement of opportunistic search probes permitting the exchange to learn from participants.

The invention as applied to auctions in portfolio products and value-added services in complex coupled secondary markets is a powerful transaction enabler providing value to purchasers, sellers and services offerors. While the current model and discussion of opportunistic e-commerce auctions captured in FIGS. 10–37 uses an embodiment with four sub-exchanges ($SA^X$, $PV^X$, $CN^X$, $DA^X$) and cross-streams, the actual sub-exchange decomposition is very general, and one of ordinary skill in the art could create a differing embodiment designed around N- sub-exchange functional decomposition. This is accomplished because the granularity of decomposition can be arbitrarily and dynamically modified. Modifying opportunistic auctions in secondary markets using 2, 3, 4, 5, . . . , N sub-exchange models is an extension within the skill of one of ordinary skill in the art of the concepts introduced by this invention and discussed in detail in the context of a 4-subexchange decomposition.

Although the invention has been described in detail with reference only to an exemplary embodiment, various modifications can be made without departing from the invention. Accordingly, the invention is defined with reference to the following claims.

I claim:

1. A system for transferring an ownership interest in a secondary market object comprising:
    a user input device for receiving information regarding the secondary market objects;
    a database coupled to said user input device for storing the information regarding the secondary market objects;
    a marketplace coupled to said database, accessible by a plurality of users, for the transfer of ownership interests in the secondary market objects; and
    one or more sub-exchanges coupled to said marketplace each providing services complimentary to the transfer of the ownership interest in the secondary market objects, wherein said sub-exchanges are chosen from the group comprising: an auction sub-exchange; a valuation services sub-exchange; a contract negotiation services sub-exchange; and a delivery and auditing services sub-exchange.

2. The system of claim 1 wherein secondary portfolio auction sub-exchange includes means for accessing an auto-probes database storing information pertaining to a plurality of conditional alert subscriptions and conditional portfolio purchase/sale offers; and means for arbitrating among conflicting conditional alert subscriptions and conditional portfolio purchase/sale offers.

3. The system of claim 1 wherein said pricing and valuation services sub-exchange includes:

means for modeling revenue using subscriber-provided models; and means for modeling revenue using exchange-provided models.

4. The system of claim 1 wherein the said electronic contract negotiation services includes:

an augmented Gelfand-Naimark Segal (GNS) construction unit for communicating transaction data; and dynamic bid state means for storing information pertaining to most recent bids offered by subscribers.

5. The system of claim 4 further including portfolio encoding means for parameterizing portfolio sale or purchase offers provided by subscribers for storage by the transaction data storage means.

6. The system of claim 4 further including means for identifying object and service transaction opportunities based upon the transaction information maintained by said sub-exchanges, said means for identifying including logic switch means for selectively controlling information flow among said sub-exchanges based upon said transaction information so as to exploit information maintained in separate sub-exchanges.

7. The system of claim 6 wherein said means for identifying transaction opportunities operates to input a conditional alert from an external source identifying a possible opportunity; and wherein said logic switching means operates as a focal attentive switch to activate information flow between selected sub-exchanges based upon the explicit conditional alert to identify additional transaction opportunities.

8. The system of claim 6 wherein said logic switching means operates as a pre-attentive switch to activate information flow between selected sub-exchanges based upon transaction information maintained by the sub-exchanges.

9. The system of claim 6 wherein information maintained by a sub-exchanges includes portfolio requirements received from external sources representative of transactions that participants to the sub-exchange wish to consummate; and wherein said logic switch means include means for converting portfolio requirements maintained by the plurality of sub-exchanges into active auto-probes and means for comparing a plurality of auto-probes to identify transaction opportunities.

10. The system of claim 9 wherein the means for converting and electronically manipulating the portfolio requirements into active auto-probes employs a Gelfand-Naimark-Segal (GNS) construction.

11. An automated exchange system for controlling the exchanging of ownership interests in objects on at least one secondary market, wherein the objects have a dynamic value affected by time-varying external factors, said exchange system including:

a plurality of sub-exchange means for maintaining information representative of secondary market transactions and for controlling said transactions; and means for identifying transaction opportunities based upon the transaction information maintained by said sub-exchange means, said means for identifying including logic switch means for selectively controlling information flow among said sub-exchange means based upon said transaction information so as to exploit information maintained in the separate sub-exchanges.

12. The system of claim 11 wherein said means or identifying transaction opportunities operates to input a conditional alert from an external source identifying a possible opportunity; and wherein said logic switching means operates as a focal attentive switch to activate information flow between selected sub-exchange means based upon the explicit conditional alert to identify additional transaction opportunities.

13. The system of claim 12 wherein said external source identifying a possible opportunity identified by said means for identifying transaction opportunities is a different secondary market.

14. The system of claim 11 wherein said logic switching means operates as a pre-attentive switch to activate information flow between selected sub-exchange means based upon transaction information maintained by the sub-exchanges.

15. The system of claim 11 wherein information maintained by a sub-exchange means includes portfolio requirements received from external sources representative of transactions that participants to the sub-exchange wish to consummate; and wherein said logic switch means include means for converting portfolio requirements maintained by the plurality of sub-exchange means into active auto-probes and means for comparing a plurality of auto-probes to identify transaction opportunities.

16. The system of claim 15 wherein the means for converting the portfolio requirements into active auto-probes employs a Gelfand-Naimark-Segal (GNS) construction.

17. A system for controlling an auction directed to secondary market objects, said system comprising:

an input unit for inputting parameters from a participant in the auction identifying an object to be sold, said object being a secondary market object having a dynamic value affected by time-varying external factors;

a dynamic value updating unit for inputting parameters representative of the external factors;

a valuation unit for estimating a value of the secondary object based on the external factors;

a selective information unit configured to permit the participant to selectively suppress the estimate of the value to third party users of the auction based on criteria determined by the participant; and an auction unit for auctioning the object among the participants.

18. The system of claim 17 wherein the secondary market object is selected from a group including commercial real estate loans, automobile leases, credit card financing, individual direct financing, corporate direct financing, home mortgages, equipment leases, bankruptcy debt, delinquent debt, and student loans.

19. The system of claim 17 wherein the external factors are selected from a group including securitization factors, primary market factors, bond yields, coupon rates, money supply factors, the prime rate, currency exchange rates, economic indicators, housing starts, and consumer debt.

20. The system of claim 17 wherein said valuation unit is configured to provide a current estimate of the value.

21. The system of claim 17 wherein said valuation unit is configured to provide a projection of the future value of the object as a function of time.

22. The system of claim 17 wherein said valuation unit includes:

means for estimating the value based upon a sub-set of a total set of factors affecting the value of the object;

means for inputting a selection from a participant in the auction of a particular sub-set of factors for use in the estimation; and means for providing the estimate based upon the sub-set to only the participant making the selection.

23. The system of claim 17 wherein said selective information unit includes means for assessing a fee to each participant receiving the estimate.

24. The system of claim 17 wherein means for selectively providing the estimate of the value to participants in the auction includes means for assessing a fee to each participant receiving the estimate.

25. The system of claim 17 further including means for assessing an exchange commission if the object is sold.

26. The system of claim 25 wherein an amount of said commission is based upon a total amount of time the object is presented for auction before a bid is received.

27. The system of claim 26 wherein said amount of said commission is reduced to zero after a pre-determined amount of time.

28. The system of claim 17 further including means for permitting a participant to place an escrow lock on said object.

29. The system of claim 28 further including means for assessing a fee to the participant placing the escrow lock on the object.

30. The system of claim 17 further including means for permitting a participant to place a lock on said means for estimating the value of the object.

31. The system of claim 30 further including means for assessing a fee to the participant placing a lock on the means for estimating the value of the object.

32. The system of claim 17 further including means for inputting parameters representative of an object to be purchased from a participant in the auction; and means for determining whether there are any objects offered for sale that conform to the parameters.

33. The system of claim 32 wherein said parameters representative of an object to be purchased are selected from a group consisting of current value, geographic location, yield, risk rating, term.

34. The system of claim 32 wherein the means for determining whether there are any objects offered for sale that conform to the parameters includes means for periodically estimating the values of all objects offered for sale; and means for alerting the participant when an object is identified that conforms to the requirements of the participant.

35. The system of claim 17 further comprising auditing means for auditing said auctioned object.

36. The system of claim 35 wherein said auditing means are provided by an outside party.

37. The system of claim 17 further comprising delivery means for transferring the auctioned object to the purchaser.

38. The system of claim 37 wherein said delivery means are provided by an outside party.

39. The system of claim 17 further comprising servicing means for servicing any post-auction requirements for said auctioned object.

40. The system of claim 39 wherein said servicing means are provided by an outside party.

41. The system of claim 17 wherein the means for estimating a value of the secondary object includes an electronic interface permitting third parties to receive information pertaining to the secondary object to value the secondary object and to convey the value to the participant.

42. The system of claim 41 wherein said third parties may charge the participant a fee for valuing the secondary object.

* * * * *